US012382187B2

United States Patent
Xiao et al.

(10) Patent No.: US 12,382,187 B2
(45) Date of Patent: Aug. 5, 2025

(54) IMAGE PROCESSING METHOD AND ELECTRONIC DEVICE FOR IMPROVING DISPLAY EFFECTS IN PHOTOGRAPHING OR VISUAL RECORDING

(71) Applicant: HONOR DEVICE CO., LTD., Shenzhen (CN)

(72) Inventors: Bin Xiao, Shenzhen (CN); Hantao Cui, Shenzhen (CN); Yu Wang, Shenzhen (CN); Congchao Zhu, Shenzhen (CN); Tao Shao, Shenzhen (CN); Shuhong Hu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/923,459

(22) PCT Filed: Apr. 29, 2022

(86) PCT No.: PCT/CN2022/090630
§ 371 (c)(1),
(2) Date: Nov. 4, 2022

(87) PCT Pub. No.: WO2023/010912
PCT Pub. Date: Feb. 9, 2023

(65) Prior Publication Data
US 2025/0080862 A1 Mar. 6, 2025

(30) Foreign Application Priority Data

Jul. 31, 2021 (CN) .............................. 202110877402

(51) Int. Cl.
*H04N 23/84* (2023.01)
*H04N 23/611* (2023.01)
(Continued)

(52) U.S. Cl.
CPC ........... *H04N 23/84* (2023.01); *H04N 23/611* (2023.01); *H04N 23/617* (2023.01); *H04N 23/632* (2023.01); *H04N 23/633* (2023.01)

(58) Field of Classification Search
CPC .... H04N 23/84; H04N 23/611; H04N 23/617; H04N 23/632; H04N 23/633
(Continued)

(56) References Cited

U.S. PATENT DOCUMENTS

| 10,847,073 B2 | 11/2020 | Huang et al. |
| 2006/0274386 A1 | 12/2006 | Wakazono et al. |

(Continued)

FOREIGN PATENT DOCUMENTS

| CN | 105323456 A | 2/2016 |
| CN | 107820020 A | 3/2018 |

(Continued)

*Primary Examiner* — Usman A Khan
(74) *Attorney, Agent, or Firm* — Fish & Richardson P.C.

(57) ABSTRACT

This application relates to the field of photographing technologies, and discloses an image processing method and an electronic device, so as to dynamically adjust LUTs in a process of photographing or visual recording, and enrich display effects of photographing or visual recording. The electronic device obtains a first image, where the first image is an image captured by a camera of the electronic device, and the first image includes a first shot object; the electronic device determines a first scenario corresponding to the first image, where the first scenario is used to identify a scenario corresponding to the first shot object; the electronic device determines a first LUT based on the first scenario; and the electronic device processes the first image based on the first LUT to obtain a second image, and displays the second image, where a display effect of the second image corresponds to the first LUT.

19 Claims, 55 Drawing Sheets

(51) Int. Cl.
*H04N 23/617* (2023.01)
*H04N 23/63* (2023.01)

(58) Field of Classification Search
USPC .................................................. 348/222.1
See application file for complete search history.

(56) References Cited

U.S. PATENT DOCUMENTS

| | | | |
|---|---|---|---|
| 2012/0062593 A1* | 3/2012 | Kojima | G06F 3/0488 |
| | | | 345/629 |
| 2016/0037046 A1* | 2/2016 | Nashizawa | H04N 23/741 |
| | | | 348/229.1 |
| 2019/0124308 A1* | 4/2019 | Wang | H04N 9/3182 |
| 2019/0205929 A1 | 7/2019 | Snibbe et al. | |
| 2020/0128173 A1 | 4/2020 | Lee et al. | |
| 2021/0081093 A1* | 3/2021 | Yun | G06F 3/0482 |

FOREIGN PATENT DOCUMENTS

| | | |
|---|---|---|
| CN | 104299187 B | 8/2018 |
| CN | 109068056 A | 12/2018 |
| CN | 109741288 A | 5/2019 |
| CN | 110611776 A | 12/2019 |
| CN | 110648296 A | 1/2020 |
| CN | 111163350 A | 5/2020 |
| CN | 111416950 A | 7/2020 |
| CN | 108701439 | 2/2021 |
| CN | 112948048 A | 6/2021 |
| WO | 2021052292 A1 | 3/2021 |
| WO | 2021136091 A1 | 7/2021 |

\* cited by examiner

IMAGE PROCESSING METHOD AND ELECTRONIC DEVICE FOR IMPROVING DISPLAY EFFECTS IN PHOTOGRAPHING OR VISUAL RECORDING

CROSS-REFERENCE TO RELATED APPLICATIONS

This application is a National Stage of International Application No. PCT/CN2022/090630, filed Apr. 29, 2022, which claims priority to Chinese Patent Application No. 202110877402.X, filed on Jul. 31, 2021, both of which are incorporated herein by reference in their entireties.

TECHNICAL FIELD

This application relates to the field of photographing technologies, and in particular, to an image processing method and an electronic device.

BACKGROUND

Existing mobile phones generally have functions of photographing and visual recording, and more and more people use mobile phones to shoot photos and videos to record bits and pieces of life. Currently, during shooting (such as photographing and visual recording) by a mobile phone, only a color lookup table (Lookup Table, LUT) pre-configured before shooting, an LUT selected by a user, or an LUT determined by recognizing a preview image may be used to process the preview image. In this way, the mobile phone may shoot only photos or videos with a style or display effect corresponding to the foregoing pre-configured or selected parameters, and the photos or videos shot by the mobile phone only have a single style or display effect.

SUMMARY

This application provides an image processing method and an electronic device, so as to dynamically adjust LUTs in a process of photographing or visual recording, and enrich display effects obtained by photographing or visual recording.

According to a first aspect, this application provides an image processing method. In this method, an electronic device may obtain a first image. The first image is an image captured by a camera of the electronic device, and the first image includes a first shot object. Then, the electronic device may determine a first scenario corresponding to the first image, where the first scenario is used to identify a scenario corresponding to the first shot object. Then the electronic device may determine a first LUT based on the first scenario. Finally, the electronic device may process the first image based on the first LUT to obtain a second image, and display the second image. A display effect of the second image corresponds to the first LUT.

In this solution, the electronic device may dynamically adjust LUTs in a process of photographing or visual recording based on each image frame obtained by the electronic device. In this way, in the process of photographing or visual recording, display effects or styles corresponding to different LUTs may be presented, and the display effects obtained by photographing or visual recording may be enriched.

In a possible design method of the first aspect, after the electronic device displays the second image, the electronic device may capture a third image, where the third image is an image captured by the camera of the electronic device, and the third image includes a second shot object. The electronic device may determine a second scenario corresponding to the second image, where the second scenario is used to identify a scenario corresponding to the second shot object; the electronic device determines a second LUT based on the second scenario; and the electronic device processes the third image based on the second LUT to obtain a fourth image, and displays the fourth image, where a display effect of the fourth image corresponds to the second LUT.

That is, when the camera of the electronic device captures images of different shot objects, the electronic device may use different LUTs to process the images in the method according to this application. In this way, display effects or styles corresponding to different LUTs may be presented, and the display effects obtained by photographing or visual recording may be enriched.

In another possible design method of the first aspect, that the electronic device determines a first LUT based on the first scenario may include: The electronic device determines a third LUT corresponding to the first scenario among a plurality of third LUTs as a first LUT of the first image.

In this design method, the electronic device may recognize a shooting scenario (that is, a first scenario) corresponding to the first image, and determine a first LUT based on the shooting scenario. The plurality of third LUTs are pre-configured in the electronic device, and are used to process an image captured by the camera of the electronic device to obtain images with different display effects, and each first LUT corresponds to a display effect in one scenario.

In another possible design method of the first aspect, that the electronic device determines a first LUT based on the first scenario may include: The electronic device determines a third LUT corresponding to the first scenario among the plurality of third LUTs as a fourth LUT of the first image; and the electronic device calculates a weighted sum of the fourth LUT of the first image and a first LUT of a fifth image to obtain the first LUT. The fifth image is a previous image frame of the first image, and a third LUT of a previous image frame of a first image frame captured by the electronic device in this shooting process is a preset LUT. The plurality of third LUTs are pre-configured in the electronic device, and are used to process an image captured by the camera of the electronic device to obtain images with different display effects, and each third LUT corresponds to a display effect in one scenario.

In this design method, when the electronic device determines a final LUT, reference is made to a current image frame, and reference is further made to a final LUT of a previous image frame. In this way, in the process of changing LUTs, smooth transition of display effects or styles corresponding to different LUTs may be implemented, display effects of a plurality of preview image frames presented by the electronic device may be optimized, and visual experience of a user in the process of photographing or visual recording is improved.

In another possible design method of the first aspect, that the electronic device calculates a weighted sum of the fourth LUT of the first image and a first LUT of a fifth image to obtain the first LUT may include: The electronic device calculates the weighted sum of the fourth LUT of the first image and the first LUT of the fifth image by using a pre-configured first weighting coefficient and second weighting coefficient, to obtain the first LUT. The first weighting coefficient is a weighting coefficient of the fourth LUT of the first image, the second weighting coefficient is a weighting coefficient of the first LUT of the fifth image, and a sum of the first weighting coefficient and the second weighting coefficient is equal to 1.

A smaller first weighting coefficient indicates a larger second weighting coefficient and a smoother transition effect of a plurality of second-image frames. In this design method, the foregoing first weighting coefficient and second weighting coefficient may be preset weights pre-configured in the electronic device.

In another possible design method of the first aspect, the first weighting coefficient and the second weighting coefficient may be set by the user in the electronic device.

Specifically, before that the electronic device calculates the weighted sum of the fourth LUT of the first image and the first LUT of the fifth image by using a pre-configured first weighting coefficient and second weighting coefficient, to obtain the first LUT, the electronic device may display a first setting item and a second setting item in response to a first preset operation. The first setting item is used to set the first weighting coefficient, and the second setting item is used to set the second weighting coefficient. Then, in response to a setting operation of the user on the first setting item and/or the second setting item, the electronic device may use the first weighting coefficient set by the user as a weighting coefficient of the fourth LUT of the first image, and use the second weighting coefficient set by the user as a weighting coefficient of the first LUT of the fifth image.

The first preset operation is a tap operation on a first preset control displayed by the electronic device, and the first preset control is used to trigger the electronic device to set weights of the fourth LUT of the first image and the first LUT of the fifth image; or the first preset operation is a tap operation of the user on a first physical key of the electronic device.

In another possible design method of the first aspect, a preset artificial intelligence (artificial intelligence, AI) model (such as a preset AI model b) is pre-configured in the electronic device. The preset AI model b is capable of recognizing the first image and a scenario detection result of the first image, and outputting a weight of each third LUT among a plurality of third LUTs. The electronic device may obtain the weight of each third LUT by using the preset AI model b, and then calculate a weighted sum of the plurality of third LUTs to obtain a first LUT.

Specifically, that the electronic device determines a first LUT based on the first scenario may include: The electronic device runs the preset AI model by using indication information of the first scenario and the first image as inputs, to obtain a plurality of third weighting coefficients of a plurality of third LUTs; and the electronic device calculates a weighted sum of the plurality of third LUTs by using the plurality of third weighting coefficients, to obtain the first LUT. A sum of the plurality of third weighting coefficients is 1, and the plurality of third LUTs are in a one-to-one correspondence with the plurality of third weighting coefficients.

In this design method, for a complex shooting scenario, when the electronic device determines a first LUT of the first image, reference is made to a third LUT corresponding to the first scenario of the first image, and reference is further made to third LUTs corresponding to shooting scenarios other than the first scenario among a plurality of third LUTs. In this way, display effects of the electronic device may be improved.

Specifically, in another possible design method of the first aspect, that the electronic device determines a first LUT based on the first scenario may include: The electronic device runs the preset AI model by using indication information of the first scenario and the first image as inputs, to obtain a plurality of third weighting coefficients of a plurality of third LUTs; the electronic device calculates a weighted sum of the plurality of third LUTs by using the plurality of third weighting coefficients, to obtain a fourth LUT of the first image; and the electronic device calculates a weighted sum of the fourth LUT of the first image and a first LUT of a fifth image to obtain the first LUT. The fifth image is a previous image frame of the first image, and a third LUT of a previous image frame of a first image frame captured by the electronic device in this shooting process is a preset LUT. A sum of the plurality of third weighting coefficients is 1, and the plurality of third LUTs are in a one-to-one correspondence with the plurality of third weighting coefficients.

In this design method, when the electronic device determines a final LUT, reference is made to a current image frame, and reference is further made to a final LUT of a previous image frame. In this way, in the process of changing LUTs, smooth transition of display effects or styles corresponding to different LUTs may be implemented, display effects of a plurality of preview image frames presented by the electronic device may be optimized, and visual experience of a user in the process of photographing or visual recording is improved.

In another possible design method of the first aspect, before the electronic device obtains the weight of each third LUT by using the preset AI model, the electronic device may train the preset AI model b first, so that the preset AI model b is capable of recognizing the first image and a scenario detection result of the first image, and outputting a weight of each third LUT among a plurality of third LUTs.

Specifically, the electronic device may obtain a plurality of groups of data pairs, where each group of data pairs includes a sixth image and a seventh image, and the sixth image is an image that is obtained by processing the seventh image and that meets a preset condition. Then, the electronic device may recognize the seventh image, and determine a third scenario corresponding to the seventh image. Finally, the electronic device may train the preset AI model by using the seventh image, the sixth image, and indication information for recognizing the third scenario as input samples, so that the preset AI model is capable of determining a weight that is used to obtain a weighted sum of the plurality of third LUTs, so as to obtain an LUT that is used to process the seventh image to obtain a display effect of the sixth image.

It should be noted that the preset AI model b differs from the foregoing preset AI model a in that the indication information of the third scenario corresponding to the seventh image is added as an input sample. A training principle of the preset AI model b is trained is the same as the training principle of the foregoing preset AI model. The difference is that the indication information of the third scenario corresponding to the seventh image may more clearly indicate a shooting scenario corresponding to the seventh image.

It should be understood that if it is recognized that the shooting scenario of the seventh image is the third scenario, it indicates that the seventh image is more likely to be an image of the third scenario. Then, setting a weighting coefficient of a third LUT corresponding to a shot object to a larger value improves display effects. It may be learned that the indication information of the third scenario may play a guiding role in the training of the preset AI model b, and guide the training of the preset AI model b in a direction close to the third scenario. In this way, convergence of the preset AI model b may be accelerated, to reduce training times of the second preset AI model.

According to a second aspect, this application provides an image processing method. In the method, an electronic device may obtain a first image, where the first image is an image captured by a camera of the electronic device, and the first image includes a first shot object. Then, the electronic device may run a preset AI model (such as a preset AI model a) by using the first image as an input, to obtain a plurality of third weighting coefficients of a plurality of third LUTs. A sum of the plurality of third weighting coefficients is 1, and the plurality of third LUTs are in a one-to-one correspondence with the plurality of third weighting coefficients. The electronic device calculates a weighted sum of the plurality of third LUTs by using the plurality of third weighting coefficients, to obtain a first LUT. The electronic device processes the first image based on the first LUT to obtain a second image, and displays the second image, where a display effect of the second image corresponds to the first LUT.

In this solution, the electronic device may dynamically adjust LUTs in a process of photographing or visual recording based on each image frame obtained by the electronic device. In this way, in the process of photographing or visual recording, display effects or styles corresponding to different LUTs may be presented, and the display effects obtained by photographing or visual recording may be enriched.

In addition, when the electronic device determines a first LUT of the first image, reference is made to a third LUT corresponding to the first scenario of the first image, and reference is further made to third LUTs corresponding to shooting scenarios other than the first scenario among a plurality of third LUTs. In this way, display effects of the electronic device may be improved.

In a possible design method of the second aspect, that the electronic device calculates a weighted sum of the plurality of third LUTs by using the plurality of third weighting coefficients, to obtain a first LUT includes: The electronic device calculates a weighted sum of the plurality of third LUTs by using the plurality of third weighting coefficients, to obtain a fourth LUT of the first image; and the electronic device calculates a weighted sum of the fourth LUT of the first image and a first LUT of a fifth image to obtain the first LUT, where the fifth image is a previous image frame of the first image, and a third LUT of a previous image frame of a first image frame captured by the electronic device in this shooting process is a preset LUT.

In this design method, when the electronic device determines a final LUT, reference is made to a current image frame, and reference is further made to a final LUT of a previous image frame. In this way, in the process of changing LUTs, smooth transition of display effects or styles corresponding to different LUTs may be implemented, display effects of a plurality of preview image frames presented by the electronic device may be optimized, and visual experience of a user in the process of photographing or visual recording is improved.

In another possible design method of the second aspect, before the electronic device runs a preset AI model by using the first image as an input, to obtain a plurality of third weighting coefficients of a plurality of third LUTs, the electronic device may train the preset AI model a. A method in which the electronic device trains the preset AI model a includes: The electronic device obtains a plurality of groups of data pairs, where each group of data pairs includes a sixth image and a seventh image, and the sixth image is an image that is obtained by processing the seventh image and that meets a preset condition; and the electronic device trains the preset AI model by using the seventh image and the sixth image as input samples, so that the preset AI model is capable of determining a weight that is used to obtain a weighted sum of the plurality of third LUTs, so as to obtain an LUT that is used to process the seventh image to obtain a display effect of the sixth image.

In another possible design method of the first aspect or the second aspect, the user may adjust an output weight of the foregoing preset AI model a or preset AI model b. The method according to this application may further include: The electronic device displays a plurality of third setting items in response to a second preset operation of the user, where each third setting item corresponds to one third LUT, and is used to set a third weighting coefficient of the third LUT; and the electronic device updates corresponding third weighting coefficients in response to a setting operation of the user on one or more third setting items among the plurality of third setting items. The electronic device calculates a weighted sum of the plurality of third LUTs by using a plurality of updated third weighting coefficients.

The foregoing second preset operation is a tap operation of the user on a second preset control, and the second preset control is used to trigger the electronic device to set weights of the plurality of third LUTs; or the second preset operation is a tap operation of the user on a second physical key in the electronic device.

In this design method, the user may adjust the output weight of the foregoing preset AI model a or preset AI model b. In this way, the electronic device may adjust LUTs based on a user requirement, so that an image that achieves higher user satisfaction can be shot.

In another possible design method of the first aspect or the second aspect, the user may further add LUTs in the electronic device. The method according to this application further includes: The electronic device displays one or more fourth setting items in response to a third preset operation of the user, where the third preset operation is used to trigger the electronic device to add a display effect, each fourth setting item corresponds to one fifth LUT, each fifth LUT corresponds to a display effect in one shooting scenario, and the fifth LUT is different from the third LUT; and in response to a selection operation of the user on any fourth setting item on a preview interface, the electronic device saves the fifth LUT corresponding to the fourth setting item selected by the user.

In another possible design method of the first aspect or the second aspect, the foregoing fourth setting item includes a preview image obtained through processing by using a corresponding fifth LUT, which is used to present a display effect corresponding to the fifth LUT. In this way, the user may confirm whether a satisfactory LUT is obtained based on adjusted display effects presented by the electronic device. In this way, efficiency of setting an added LUT by the user can be improved.

In a possible design method of the first aspect or the second aspect, that the electronic device obtains a first image may include: The electronic device captures the first image on a preview interface for photographing by the electronic device, a preview interface before visual recording by the electronic device, or a framing interface for visual recording being performed by the electronic device. That is, the method may be applied to a photographing scenario, a scenario in which visual recording is being performed, and a scenario before visual recording in a visual recording mode for the electronic device.

In a possible design method of the first aspect or the second aspect, the first image may be an image captured by the camera of the electronic device. Alternatively, the first image may be a preview image obtained from an image captured by the camera of the electronic device.

According to a third aspect, this application provides an electronic device, where the electronic device includes a memory, a display, one or more cameras, and one or more processors. The memory, the display, and the camera are coupled to the processor. The camera is configured to capture an image, the display is configured to display the image captured by the camera or an image generated by the processor; and the memory stores computer program code, the computer program code includes computer instructions, and when the computer instructions are executed by the processor, the electronic device is enabled to perform the method according to any one of the first aspect or the second aspect or the possible design methods of the first aspect or the second aspect.

According to a fourth aspect, this application provides an electronic device, where the electronic device includes a memory, a display, one or more cameras, and one or more processors. The memory, the display, and the camera are coupled to the processor. The memory stores computer program code, the computer program code includes computer instructions, and when the computer instructions are executed by the processor, the electronic device is enabled to perform the following steps: obtaining a first image, where the first image is an image captured by the camera of the electronic device, and the first image includes a first shot object: determining a first scenario corresponding to the first image, where the first scenario is used to identify a scenario corresponding to the first shot object; determining a first color lookup table LUT based on the first scenario; and processing the first image based on the first LUT to obtain a second image, and displaying the second image, where a display effect of the second image corresponds to the first LUT.

In a possible design method of the fourth aspect, when the computer instructions are executed by the processor, the electronic device is enabled to further perform the following steps: after the displaying the second image, capturing a third image, where the third image is an image captured by the camera of the electronic device, and the third image includes a second shot object; determining a second scenario corresponding to the second image, where the second scenario is used to identify a scenario corresponding to the second shot object; determining a second LUT based on the second scenario; and processing the third image based on the second LUT to obtain a fourth image, and displaying the fourth image, where a display effect of the fourth image corresponds to the second LUT.

In another possible design method of the fourth aspect, when the computer instructions are executed by the processor, the electronic device is enabled to further perform the following step: capturing the first image on a preview interface for photographing by the electronic device, a preview interface before visual recording by the electronic device, or a framing interface for visual recording being performed by the electronic device.

In another possible design method of the fourth aspect, the first image is an image captured by the camera of the electronic device; or the first image is a preview image obtained from an image captured by the camera of the electronic device.

In another possible design method of the fourth aspect, when the computer instructions are executed by the processor, the electronic device is enabled to further perform the following step: determining a third LUT corresponding to the first scenario among a plurality of third LUTs as a first LUT of the first image. The plurality of third LUTs are pre-configured in the electronic device, and are used to process an image captured by the camera of the electronic device to obtain images with different display effects, and each first LUT corresponds to a display effect in one scenario.

In another possible design method of the fourth aspect, when the computer instructions are executed by the processor, the electronic device is enabled to further perform the following steps: determining a third LUT corresponding to the first scenario among the plurality of third LUTs as a fourth LUT of the first image, where the plurality of third LUTs are pre-configured in the electronic device, and are used to process an image captured by the camera of the electronic device to obtain images with different display effects, and each third LUT corresponds to a display effect in one scenario; and calculating a weighted sum of the fourth LUT of the first image and a first LUT of a fifth image to obtain the first LUT, where the fifth image is a previous image frame of the first image, and a third LUT of a previous image frame of a first image frame captured by the electronic device in this shooting process is a preset LUT.

In another possible design method of the fourth aspect, when the computer instructions are executed by the processor, the electronic device is enabled to further perform the following step: calculating the weighted sum of the fourth LUT of the first image and the first LUT of the fifth image by using a pre-configured first weighting coefficient and second weighting coefficient, to obtain the first LUT. The first weighting coefficient is a weighting coefficient of the fourth LUT of the first image, the second weighting coefficient is a weighting coefficient of the first LUT of the fifth image, and a sum of the first weighting coefficient and the second weighting coefficient is equal to 1. A smaller first weighting coefficient indicates a larger second weighting coefficient and a smoother transition effect of a plurality of second-image frames.

In another possible design method of the fourth aspect, when the computer instructions are executed by the processor, the electronic device is enabled to further perform the following step: before the calculating the weighted sum of the fourth LUT of the first image and the first LUT of the fifth image by using a pre-configured first weighting coefficient and second weighting coefficient, to obtain the first LUT, displaying a first setting item and a second setting item in response to a first preset operation, where the first setting item is used to set the first weighting coefficient, and the second setting item is used to set the second weighting coefficient; and in response to a setting operation of the user on the first setting item and/or the second setting item, using the first weighting coefficient set by the user as a weighting coefficient of the fourth LUT of the first image, and using the second weighting coefficient set by the user as a weighting coefficient of the first LUT of the fifth image. The first preset operation is a tap operation on a first preset control displayed by the electronic device, and the first preset control is used to trigger the electronic device to set weights of the fourth LUT of the first image and the first LUT of the fifth image; or the first preset operation is a tap operation of the user on a first physical key of the electronic device.

In another possible design method of the fourth aspect, when the computer instructions are executed by the processor, the electronic device is enabled to further perform the following steps: running a preset AI model by using indication information of the first scenario and the first image as inputs, to obtain a plurality of third weighting coefficients of a plurality of third LUTs, where a sum of the plurality of third weighting coefficients is 1, and the plurality of third LUTs are in a one-to-one correspondence with the plurality of third weighting coefficients; and calculating a weighted sum of the plurality of third LUTs by using the plurality of third weighting coefficients, to obtain the first LUT.

In another possible design method of the fourth aspect, when the computer instructions are executed by the processor, the electronic device is enabled to further perform the following steps: running a preset AI model by using indication information of the first scenario and the first image as inputs, to obtain a plurality of third weighting coefficients of a plurality of third LUTs, where a sum of the plurality of third weighting coefficients is 1, and the plurality of third LUTs are in a one-to-one correspondence with the plurality of third weighting coefficients; calculating a weighted sum of the plurality of third LUTs by using the plurality of third weighting coefficients, to obtain a fourth LUT of the first image; and calculating a weighted sum of the fourth LUT of the first image and a first LUT of a fifth image to obtain the first LUT, where the fifth image is a previous image frame of the first image, and a third LUT of a previous image frame of a first image frame captured by the electronic device in this shooting process is a preset LUT.

In another possible design method of the fourth aspect, when the computer instructions are executed by the processor, the electronic device is enabled to further perform the following steps: before the determining a first LUT based on the first scenario, obtaining a plurality of groups of data pairs, where each group of data pairs includes a sixth image and a seventh image, and the sixth image is an image that is obtained by processing the seventh image and that meets a preset condition; recognizing the seventh image, and determining a third scenario corresponding to the seventh image; and training the preset AI model by using the seventh image, the sixth image, and indication information for recognizing the third scenario as input samples, so that the preset AI model is capable of determining a weight that is used to obtain a weighted sum of the plurality of third LUTs, so as to obtain an LUT that is used to process the seventh image to obtain a display effect of the sixth image.

In another possible design method of the fourth aspect, when the computer instructions are executed by the processor, the electronic device is enabled to further perform the following steps: displaying a plurality of third setting items in response to a second preset operation of the user, where each third setting item corresponds to one third LUT, and is used to set a third weighting coefficient of the third LUT; and updating corresponding third weighting coefficients in response to a setting operation of the user on one or more third setting items among the plurality of third setting items, where the electronic device calculates a weighted sum of the plurality of third LUTs by using a plurality of updated third weighting coefficients.

The second preset operation is a tap operation of the user on a second preset control, and the second preset control is used to trigger the electronic device to set weights of the plurality of third LUTs; or the second preset operation is a tap operation of the user on a second physical key in the electronic device.

In another possible design method of the fourth aspect, when the computer instructions are executed by the processor, the electronic device is enabled to further perform the following steps: displaying one or more fourth setting items in response to a third preset operation, where the third preset operation is used to trigger the electronic device to add a display effect, each fourth setting item corresponds to one fifth LUT, each fifth LUT corresponds to a display effect in one shooting scenario, and the fifth LUT is different from the third LUT; and in response to a selection operation of the user on any fourth setting item, saving the fifth LUT corresponding to the fourth setting item selected by the user.

In another possible design method of the fourth aspect, the foregoing fourth setting item includes a preview image obtained through processing by using a corresponding fifth LUT, which is used to present a display effect corresponding to the fifth LUT.

According to a fifth aspect, this application provides an electronic device, where the electronic device includes a memory, a display, one or more cameras, and one or more processors. The memory, the display, and the camera are coupled to the processor. The memory stores computer program code, the computer program code includes computer instructions, and when the computer instructions are executed by the processor, the electronic device is enabled to perform the following steps: obtaining a first image, where the first image is an image captured by the camera of the electronic device, and the first image includes a first shot object; running a preset artificial intelligence AI model by using the first image as an input, to obtain a plurality of third weighting coefficients of a plurality of second color lookup table LUTs, where a sum of the plurality of third weighting coefficients is 1, and the plurality of third LUTs are in a one-to-one correspondence with the plurality of third weighting coefficients; calculating a weighted sum of the plurality of third LUTs by using the plurality of third weighting coefficients, to obtain a first LUT; and processing the first image based on the first LUT to obtain a second image, and displaying the second image, where a display effect of the second image corresponds to the first LUT.

In another possible design method of the fifth aspect, when the computer instructions are executed by the processor, the electronic device is enabled to further perform the following steps: calculating a weighted sum of the plurality of third LUTs by using the plurality of third weighting coefficients, to obtain a fourth LUT of the first image; and calculating a weighted sum of the fourth LUT of the first image and a first LUT of a fifth image to obtain the first LUT, where the fifth image is a previous image frame of the first image, and a third LUT of a previous image frame of a first image frame captured by the electronic device in this shooting process is a preset LUT.

In another possible design method of the fifth aspect, when the computer instructions are executed by the processor, the electronic device is enabled to further perform the following steps: before the running a preset AI model by the electronic device by using the first image as an input, to obtain a plurality of third weighting coefficients of a plurality of third LUTs, obtaining a plurality of groups of data pairs, where each group of data pairs includes a sixth image and a seventh image, and the sixth image is an image that is obtained by processing the seventh image and that meets a preset condition; and training the preset AI model by using the seventh image and the sixth image as input samples, so that the preset AI model is capable of determining a weight that is used to obtain a weighted sum of the plurality of third LUTs, so as to obtain an LUT that is used to process the seventh image to obtain a display effect of the sixth image.

According to a sixth aspect, this application provides a computer-readable storage medium, where the computer-readable storage medium includes computer instructions, and when the computer instructions are run on an electronic device, the electronic device is enabled to perform the method according to any one of the first aspect or the second aspect or the possible design methods of the first aspect or the second aspect.

According to a seventh aspect, this application provides a computer program product, where when the computer program product runs on a computer, the computer is enabled to perform the method according to any one of the first aspect or the second aspect or the possible design methods of the first aspect or the second aspect. The computer may be the foregoing electronic device.

It can be understood that, for the beneficial effects that can be achieved by the electronic device according to any one of the second aspect or the third aspect or the possible design methods of the second aspect or the third aspect, the computer storage medium according to the fourth aspect, and the computer program product according to the fifth aspect that are described above, reference may be made to the beneficial effects of any one of the first aspect or the possible design methods thereof. Details are not described herein again.

DESCRIPTION OF EMBODIMENTS

Hereinafter, the terms "first" and "second" are used for description only and cannot be construed as indicating or implying relative importance or implying the quantity of indicated technical features. Therefore, the features defined with "first" and "second" may explicitly or implicitly include one or more of the features. In the description of this embodiment, unless otherwise stated, "a plurality of" means two or more.

For ease of understanding, terms involved in the embodiments of this application are described herein in this embodiment of this application:

(1) Red green blue (Red Green Blue, RGB): Three primary colors RGB include red (Red), green (Green), and blue (Blue). A variety of colors may be obtained by mixing light of the three colors in different proportions.

An image captured by a camera is composed of pixels, and each pixel is composed of red sub-pixels, green sub-pixels, and blue sub-pixels. It is assumed that a value range of R, G. and B is 0-255. For example, RGB (255, 0, 0) represents pure red, Green (0, 255, 0) represents pure green, and Blue (0, 0, 255) represents pure blue. In short, a variety of colors may be obtained by mixing the three colors in different proportions.

(2) Color lookup table (LUT): This may also be referred to as an LUT file or an LUT parameter, and is a red green blue (Red Green Blue, RGB) mapping table.

An image includes many pixels, and each pixel is represented by an RGB value. A display of an electronic device may display the image based on the RGB value of each pixel in the image. That is, these RGB values determine how the display emits light, so as to mix into various colors and present the colors to a user. A color (or a style, or an effect) of the image may be changed by adjusting the RGB values.

Figure 1:
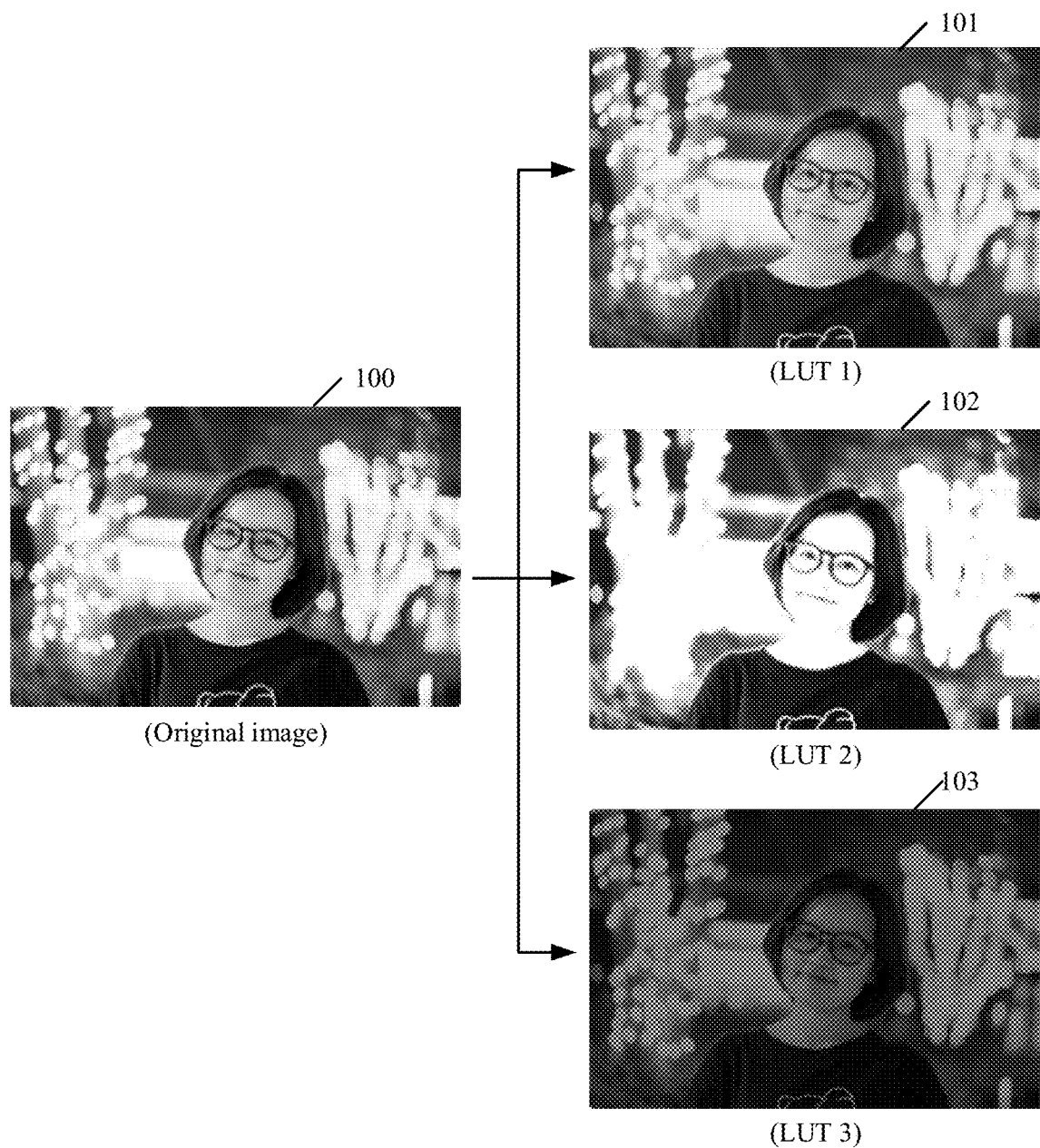
FIG. 1 is a schematic diagram of display effects or styles corresponding to a plurality of LUTs.

An LUT is an RGB mapping table, and is used to represent a correspondence between RGB values before and after adjustment. For example, FIG. 1 shows an example of an LUT.

TABLE 1

| Original value | | | Output value | | |
|---|---|---|---|---|---|
| R | G | B | R | G | B |
| 14 | 22 | 24 | 6 | 9 | 4 |
| 61 | 34 | 67 | 66 | 17 | 47 |
| 94 | 14 | 171 | 117 | 82 | 187 |
| ... | ... | ... | ... | ... | ... |
| 241 | 216 | 222 | 255 | 247 | 243 |

An original RGB value of (14, 22, 24) is mapped by an LUT shown in Table 1 to output an RGB value of (6, 9, 4). An original RGB value of (61, 34, 67) is mapped by an LUT shown in Table 1 to output an RGB value of (66, 17, 47). An original RGB value of (94, 14, 171) is mapped by an LUT shown in Table 1 to output an RGB value of (117, 82, 187). An original RGB value of (241, 216, 222) is mapped by an LUT shown in Table 1 to output an RGB value of (255, 247, 243).

It should be noted that, for a same image, a display effect of the image that is not processed by using an LUT and a display effect of the image that is processed by using an LUT are different; and display effects with different styles may be achieved if different LUTs are used to process a same image. The "display effect" of the image in this embodiment of this application means an image effect that can be observed by human eyes after the image is displayed on a display.

For example, an LUT 1, an LUT 2, and an LUT 3 shown in FIG. 1 are different LUTs. When the LUT 1 is used to process an original image 100 captured by a camera, an image 101 shown in FIG. 1 may be obtained. When the LUT 2 is used to process the original image 100, an image 102 shown in FIG. 1 may be obtained. When the LUT 3 is used to process the original image 100, an image 103 shown in FIG. 1 may be obtained. By comparing the image 101, the image 102, and the image 103 shown in FIG. 1, it may be learned that display effects of the image 101, the image 102, and the image 103 are different.

In a conventional technology, during shooting (such as photographing and visual recording) by a mobile phone, only an LUT pre-configured before shooting, an LUT selected by a user, or an LUT determined by recognizing a preview image may be used to process the preview image.

Figure 2A:
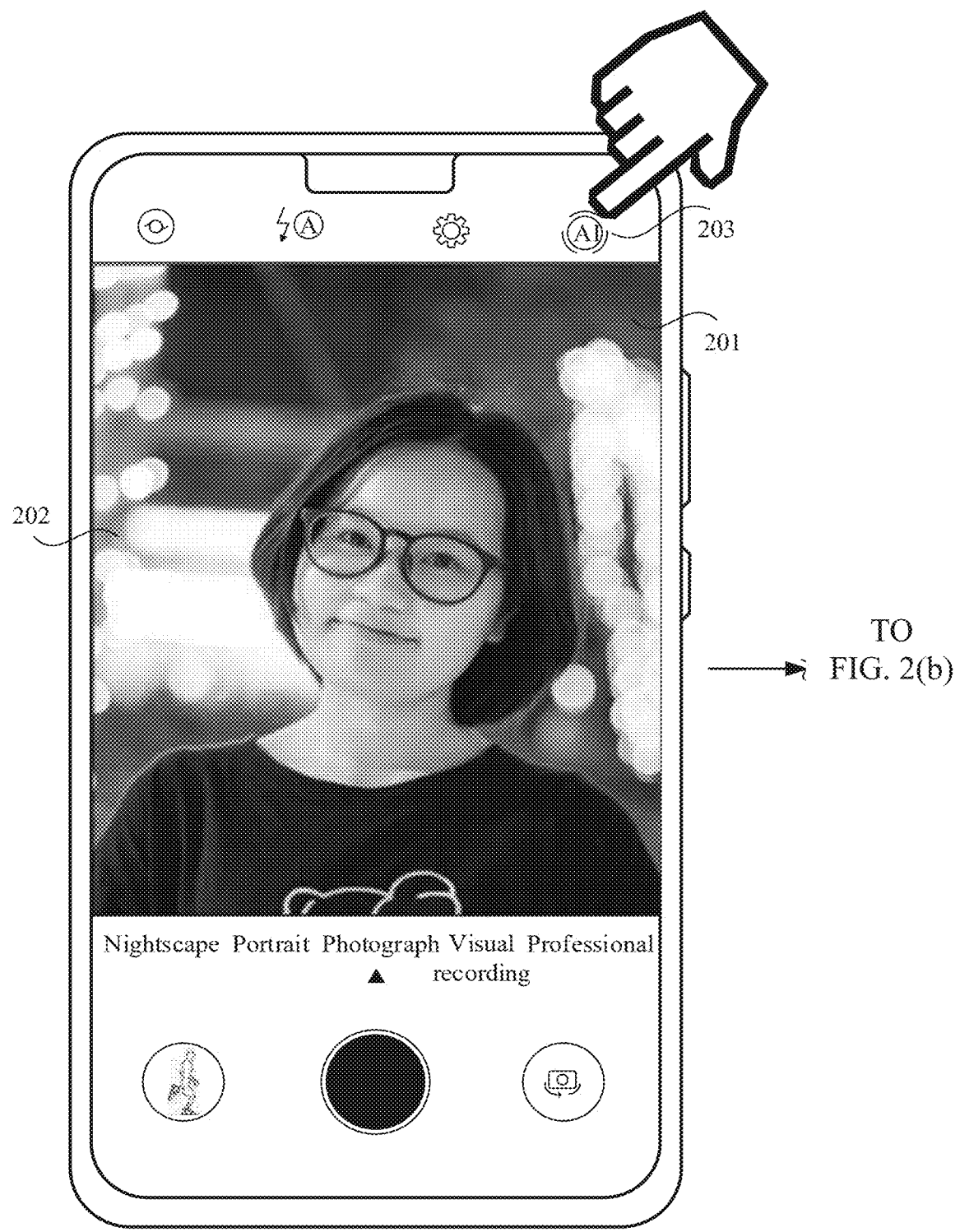
FIG. 2(a) and FIG. 2(b) are a schematic diagram of a framing interface for photographing by a mobile phone.

For example, in a photographing scenario, in response to a tap operation of the user on an icon of a camera application, the mobile phone may display a framing interface 201 for photographing shown in FIG. 2(a). The framing interface 201 for photographing may include a preview image 202 captured by the camera and an AI shooting switch 203. The preview image 202 is an image that is not processed by an LUT. The AI shooting switch 203 is configured to trigger the mobile phone to recognize a shooting scenario corresponding to the preview image 202. The mobile phone may receive a tap operation of the user on the AI shooting switch 203. In response to the tap operation of the user on the AI shooting switch 203, the mobile phone may recognize a shooting scenario (such as a portrait scenario) corresponding to the preview image 202.

The mobile phone may save a plurality of preset LUTs, and each preset LUT corresponds to one shooting scenario. For example, the mobile phone may save a preset LUT corresponding to a portrait scenario, a preset LUT corresponding to a food scenario, a preset LUT corresponding to a plant scenario, a preset LUT corresponding to an animal scenario, a preset LUT corresponding to a sea scenario, and the like. It should be noted that using an LUT corresponding to each shooting scenario to process an image of the shooting scenario may improve a display effect in the shooting scenario.

Figure 2B:
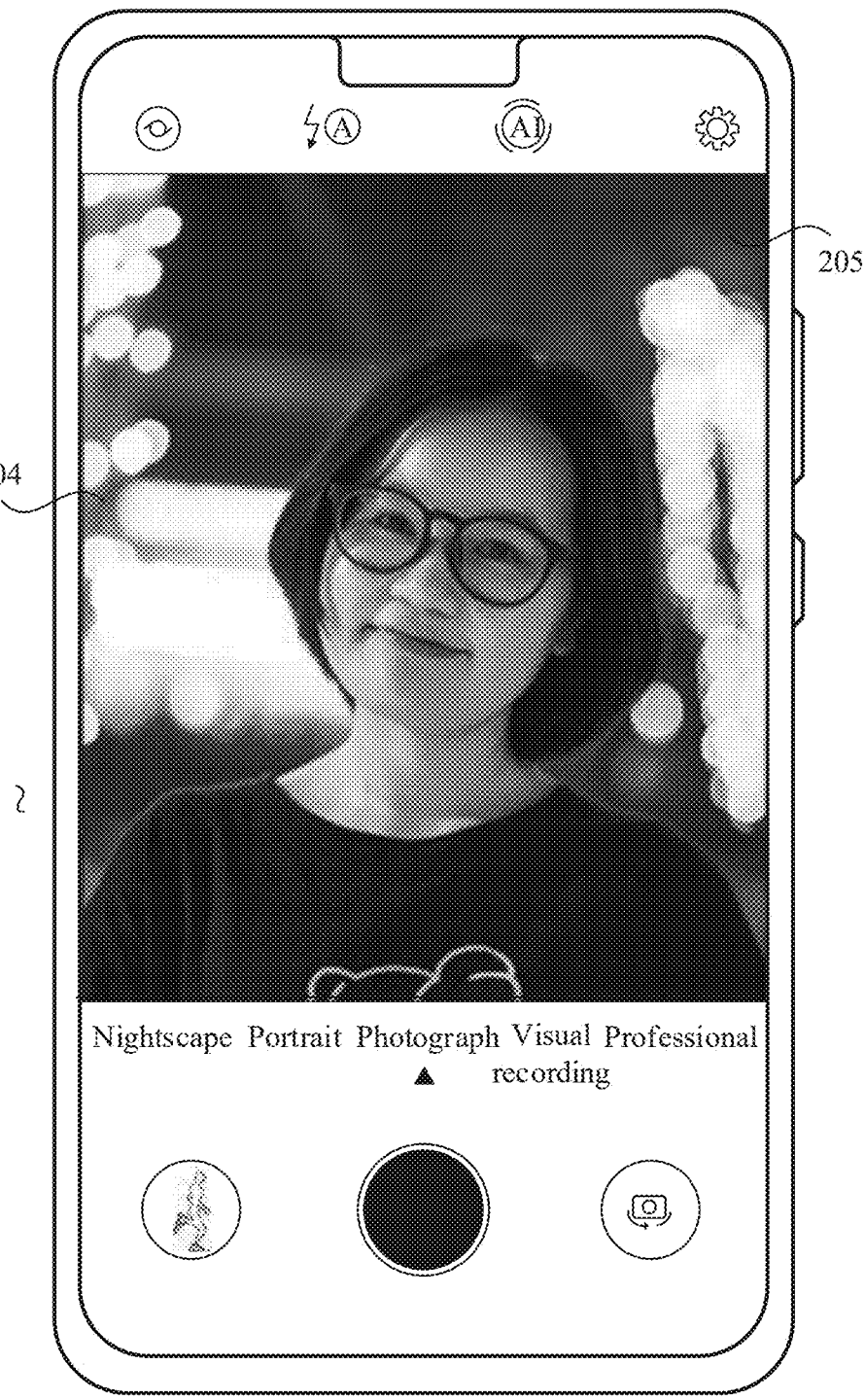

Then, the mobile phone may process the preview image 202 by using the preset LUT corresponding to the recognized shooting scenario. For example, the mobile phone uses the preset LUT corresponding to the foregoing shooting scenario to process the preview image 202, so that a preview image 205 shown in FIG. 2(b) may be obtained. Specifically, in response to the tap operation of the user on the AI shooting switch 203, the mobile phone may display a framing interface 204 for photographing shown in FIG. 2(b). The framing interface 204 for photographing includes the preview image 205.

Figure 3A:
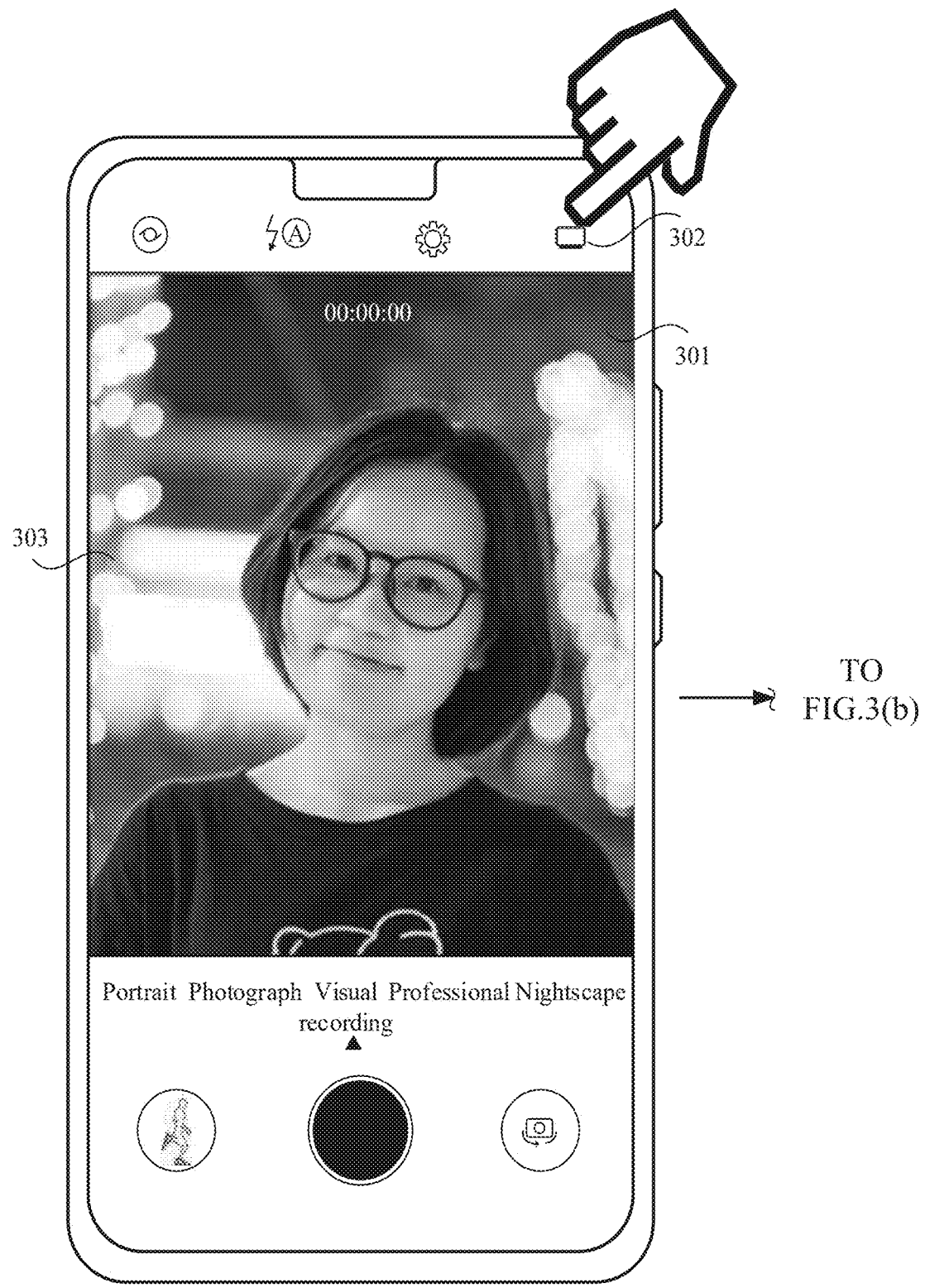
FIG. 3(a)-FIG. 3(c) are a schematic diagram of a framing interface for visual recording by a mobile phone.

For example, in a visual recording scenario, the mobile phone may display a framing interface 301 for visual recording shown in FIG. 3(a). The framing interface 301 for visual recording may include a preview image 303 captured by the camera and a shooting style option 302. The preview image 303 is an image that is not processed by an LUT.

Then, the mobile phone may receive a tap operation of the user on the shooting style option 302. In response to the tap operation of the user on the shooting style option 302, the mobile phone may display a style selection interface 304 shown in FIG. 3(b). The style selection interface 304 is used to prompt the user to select a shooting style/effect of visual recording. For example, the style selection interface 304 may include prompt information "Please select your desired shooting style/effect" 304. The style selection interface 304 may further include options for a plurality of styles, such as an option for an original image, an option for a ** style, an option for a ##style, and an option for a && style. The option for each style is used for a preset LUT, and is used to trigger the mobile phone to use the corresponding preset LUT to process a preview image for visual recording.

For example, the foregoing plurality of styles (such as the ** style, the ##style, and the && style) may include: a natural style, a gray tone style, an oil painting style, a monochrome style, a travel style, a food style, a landscape style, a portrait style, a pet style, or a still life style, and the like.

Figure 3B:
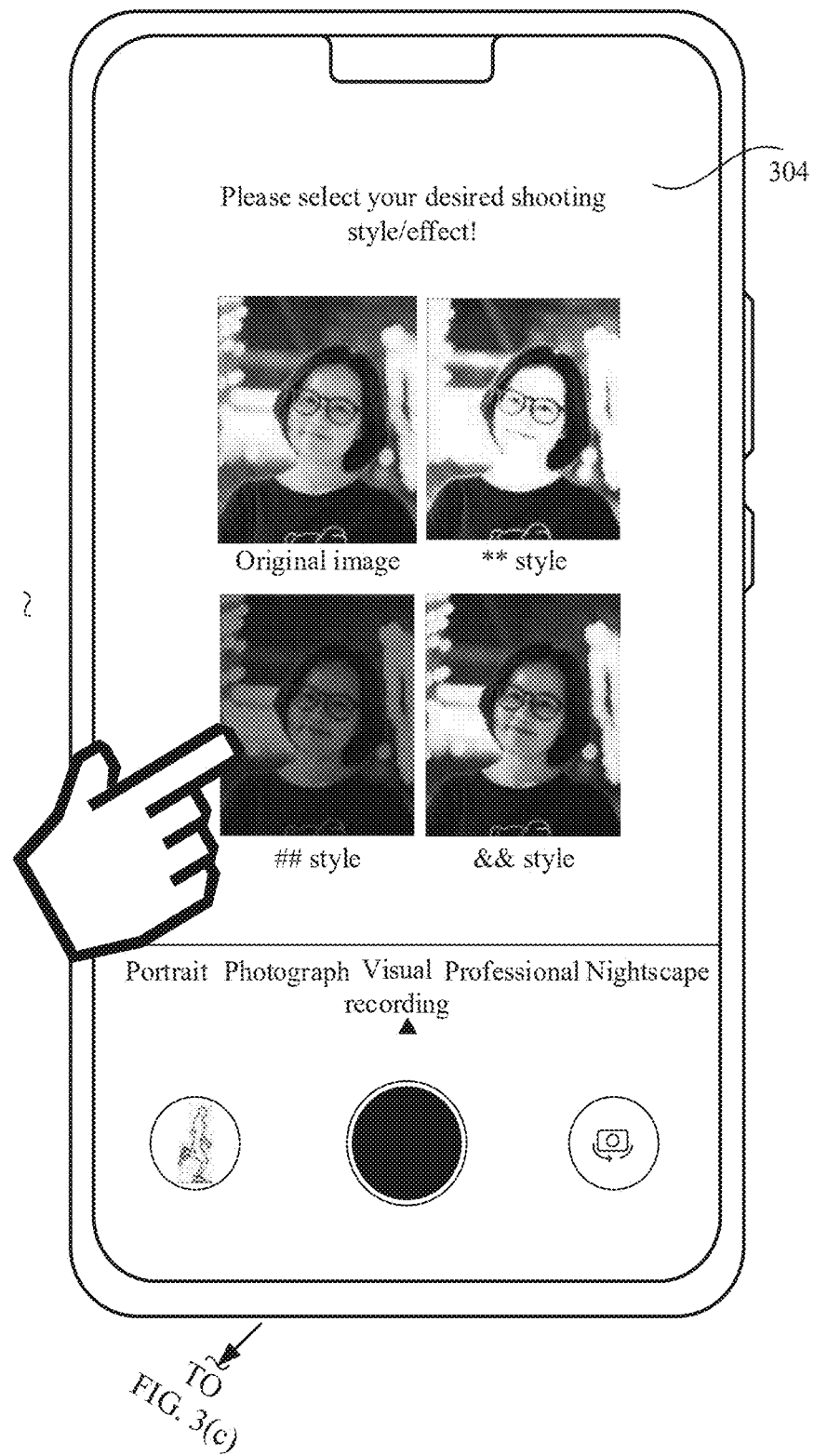
Figure 3C:
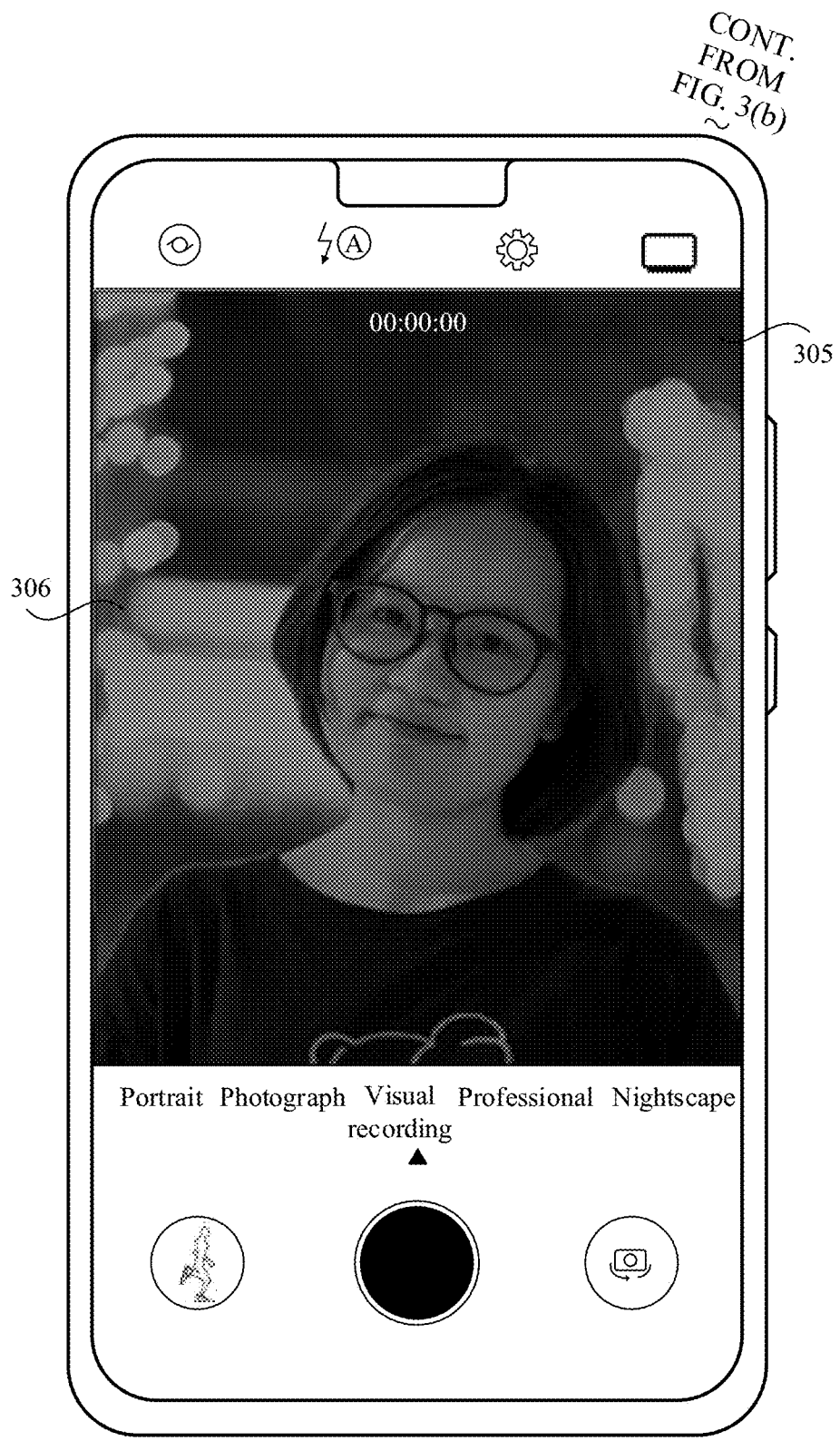

For example, the user selects the option for a ##style shown in FIG. 3(b). In response to a selection operation of the user on the option for a ##style shown in FIG. 3(b), the mobile phone may use the preset LUT corresponding to the ##style to process a preview image 306 for visual recording. For example, the mobile phone may display a framing interface 305 for visual recording shown in FIG. 3(c). The framing interface 305 for visual recording may include a preview image 306.

It should be noted that the option for an original image shown in FIG. 3(b) corresponds to an image not processed by an LUT, the option for a  style corresponds to an image processed by an LUT with the  style, the option for a ##style corresponds to an image processed by an LUT with the ##style, and the option for a && style corresponds to an image processed by an LUT with the && style. The four images shown in FIG. 3(b) have different display effects.

In conclusion, in a solution of the conventional technology, only an LUT pre-configured before shooting, an LUT selected by a user, or an LUT determined by recognizing a preview image may be used to process the preview image. In this way, the mobile phone may only shoot photos or videos with a style or a display effect corresponding to the foregoing pre-configured LUT, the LUT selected by the user, or the LUT determined by recognizing a preview image. The photos or videos shot by the mobile phone have a single style or display effect, which cannot meet current diversified shooting requirements of users.

An embodiment of this application provides an image processing method, which may be applied to an electronic device including a camera. The electronic device may determine a scenario (that is, a first scenario) corresponding to a first-image frame captured by the camera. Then the electronic device may determine a first LUT corresponding to the first scenario. Finally, the electronic device may perform image processing on the first image by using the first LUT of this image frame to obtain a second image, and display the second image. A display effect of the second image is the same as a display effect corresponding to the first LUT.

In this solution, the electronic device may dynamically adjust LUTs in a process of photographing or visual recording based on each image frame obtained by the electronic device. In this way, in the process of photographing or visual recording, display effects or styles corresponding to different LUTs may be presented, and the display effects obtained by photographing or visual recording may be enriched.

For example, the electronic device in this embodiment of this application may be a portable computer (such as a mobile phone), a tablet computer, a notebook computer, a personal computer (personal computer, PC), a wearable electronic device (such as a smartwatch), an augmented reality (augmented reality, AR)/virtual reality (virtual reality, VR) device, a vehicle-mounted computer, or the like. A specific form of the electronic device is not specially limited in the following embodiments.

Figure 4:
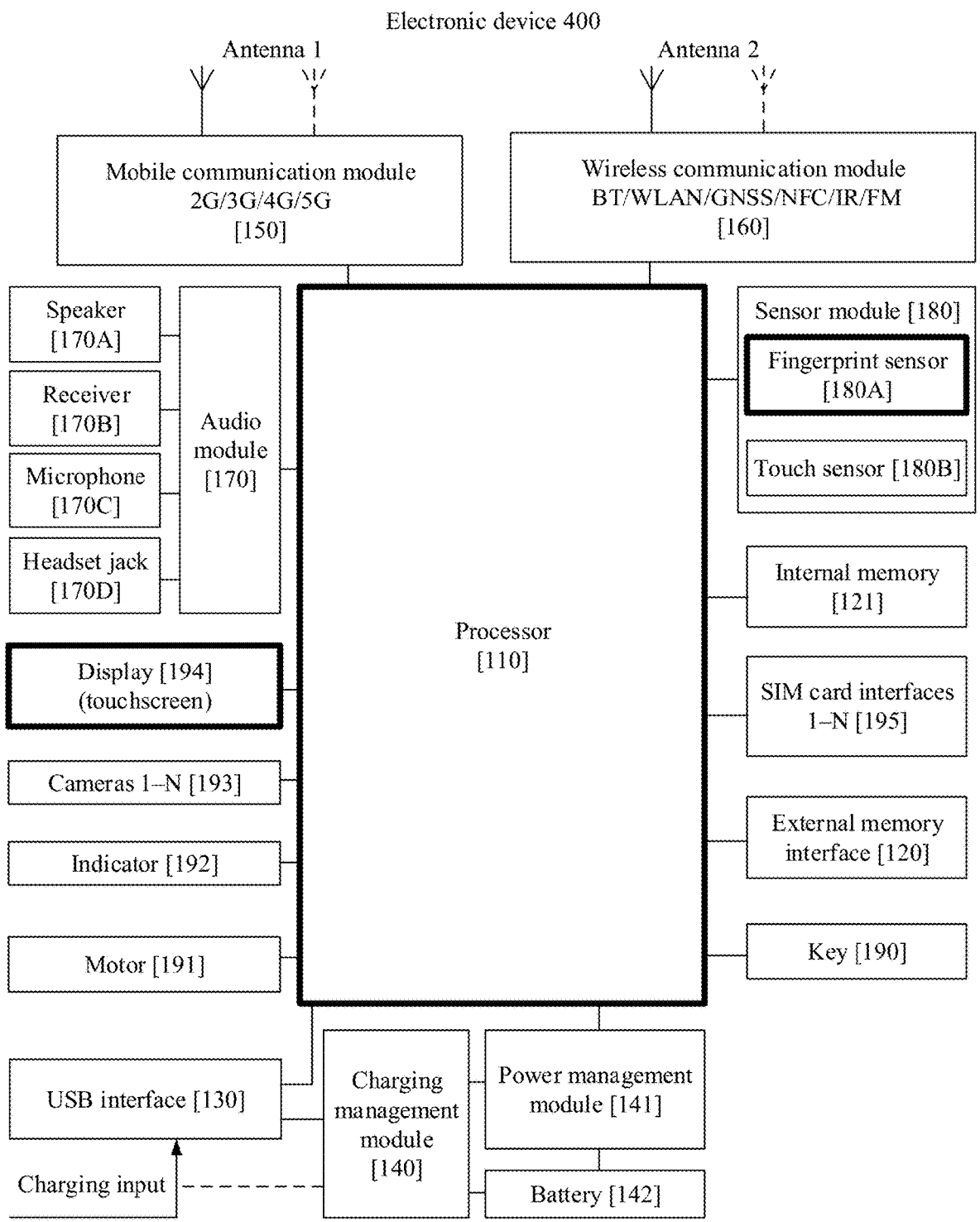
FIG. 4 is a schematic diagram of a hardware structure of an electronic device according to an embodiment of this application.

For example, the foregoing electronic device is a mobile phone. FIG. 4 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like.

The sensor module 180 may include a pressure sensor, a gyro sensor, a barometric pressure sensor, a magnetic sensor, an acceleration sensor, a distance sensor, an optical proximity sensor, a fingerprint sensor 180A, a temperature sensor, a touch sensor 180B, an ambient light sensor, a bone conduction sensor, and the like.

It can be understood that the structure illustrated in this embodiment of the present invention does not constitute a specific limitation on the electronic device 100. In some other embodiments of this application, the electronic device 100 may include more or fewer components than those shown in the figure, or combine some components, or split some components, or have different component arrangements. The illustrated components may be implemented by using hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor. DSP), a baseband processor, a neural-network processing unit (neural-network processing unit, NPU), and/or a micro controller unit (micro controller unit, MCU), and the like. Different processing units may be independent devices, or may be integrated in one or more processors.

The controller may be a nerve center and a command center of the electronic device 100. The controller can generate an operation control signal based on instruction operation codes and a timing signal, and complete the control of fetching and executing instructions.

The processor 110 may be further provided with a memory for storing instructions and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving efficiency of a system.

In some embodiments, the processor 110 may include one or more interfaces. The interfaces may include an inter-integrated circuit (inter-integrated circuit, I2C) interface, a serial peripheral interface (serial peripheral interface, SPI), an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

It can be understood that the interface connection relationship between the modules illustrated in the embodiments of the present invention is merely an example for description, and does not constitute a limitation on the structure of the electronic device 100. In some other embodiments of this application, the electronic device 100 may alternatively use an interface connection mode that is different from those in the foregoing embodiments, or use a combination of a plurality of interface connection modes.

The charging management module 140 is configured to receive a charging input from a charger. The power management module 141 is configured to connect the battery 142, the charging management module 140, and the processor 110. The power management module 141 receives an input from the battery 142 and/or an input from the charging management module 140, and supplies power to the processor 110, the internal memory 121, an external memory, the display 194, the camera 193, the wireless communication module 160, and the like. In some other embodiments, the power management module 141 and the charging management module 140 may be disposed in a same device.

A wireless communication function of the electronic device 100 may be implemented by using an antenna 1, an antenna 2, the mobile communication module 150, the wireless communication module 160, the modem processor, the baseband processor, and the like. The antenna 1 and the antenna 2 are configured to transmit and receive electromagnetic wave signals. Each antenna in the electronic device 100 may be configured to cover one or more communication frequency bands. Different antennas may also be multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a wireless communication solution that is applied to the electronic device 100, including 2G/3G/4G/5G and the like. The wireless communication module 160 may provide wireless communication solutions applied to the electronic device 100, including a wireless local area network (wireless local area network, WLAN) (such as a Wi-Fi network), Bluetooth (Bluetooth, BT), a global navigation satellite system (global navigation satellite system, GNSS), frequency modulation (frequency modulation, FM), NFC, an infrared (infrared, IR) technology, and the like.

The electronic device 100 implements a display function by using the GPU, the display 194, the application processor, and the like. The GPU is an image processing microprocessor, which is connected to the display 194 and the application processor. The GPU is configured to perform mathematical and geometric calculations to render graphics. The processor 110 may include one or more GPUs that execute program instructions to generate or change display information.

The display 194 is configured to display an image, a video, and the like. The display is a touchscreen. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like. The ISP is configured to process data fed back by the camera 193. The camera 193 is configured to capture a still image or a video. In some embodiments, the electronic device 100 may include one or N cameras 193, where N is a positive integer greater than 1.

The NPU is a neural-network (neural-network, NN) computing processor. By referring to a structure of a biological neural network, such as a transfer mode between human brain neurons, the NPU quickly processes input information, and can further perform continuous self-learning. The NPU can implement applications such as intelligent cognition of the electronic device 100, for example, screen protector recognition, image restoration, image recognition, face recognition, voice recognition, and text understanding.

The external memory interface 120 may be configured to connect to an external memory card such as a Micro SD card, so as to expand a storage capacity of the electronic device 100. The external memory card communicates with the processor 110 by using the external memory interface 120 to implement a data storage function. For example, music, video, and other files are stored in the external memory card.

The internal memory 121 may be configured to store computer executable program code, where the executable program code includes an instruction. The processor 110 executes various function applications and data processing of the electronic device 100 by running an instruction stored in the internal memory 121. The internal memory 121 may include a program storage area and a data storage area. The program storage area may store an operating system, an application required by at least one function (such as a sound play function or an image play function), or the like. The data storage area can store data (such as audio data or a phone book) created during use of the electronic device 100. In addition, the internal memory 121 may include a high-speed random access memory, and may further include a non-volatile memory, such as at least one magnetic disk storage device, a flash memory device, or a universal flash storage (universal flash storage, UFS).

The electronic device 100 can implement audio functions (such as music playing and sound recording) by using the audio module 170, the speaker 170A, the receiver 170B, the microphone 170C, the headset jack 170D, the application processor, The fingerprint sensor 180A is configured to capture fingerprint information. The electronic device 100 may use fingerprint features of the captured fingerprint information for user identity verification (that is, fingerprint recognition), to implement unlocking by using the fingerprint, access an application lock, photograph by using the fingerprint, answer a call by using the fingerprint, and the like.

The touch sensor 180B is also referred to as a "touch panel (TP)". The touch sensor 180B may be disposed on the display 194, and the touch sensor 180B and the display 194 constitute a touchscreen, which is also referred to as a "touch control screen". The touch sensor 180B is configured to detect a touch operation on or near the touch sensor 180B. The touch sensor can transmit a detected touch operation to the application processor to determine a type of a touch event. The display 194 may be configured to provide a visual output related to the touch operation. In some other embodiments, the touch sensor 180B may alternatively be disposed on the surface of the electronic device 100 at a position different from that of the display 194.

The key 190 includes a power-on key, a volume key, and the like. The motor 191 may generate a vibration prompt. The indicator 192 may be an indicator light, which may be configured to indicate a charging state and a power change, or to indicate a message, a missed call, a notification, or the like. The SIM card interface 195 is configured to connect to a SIM card.

Figure 5:
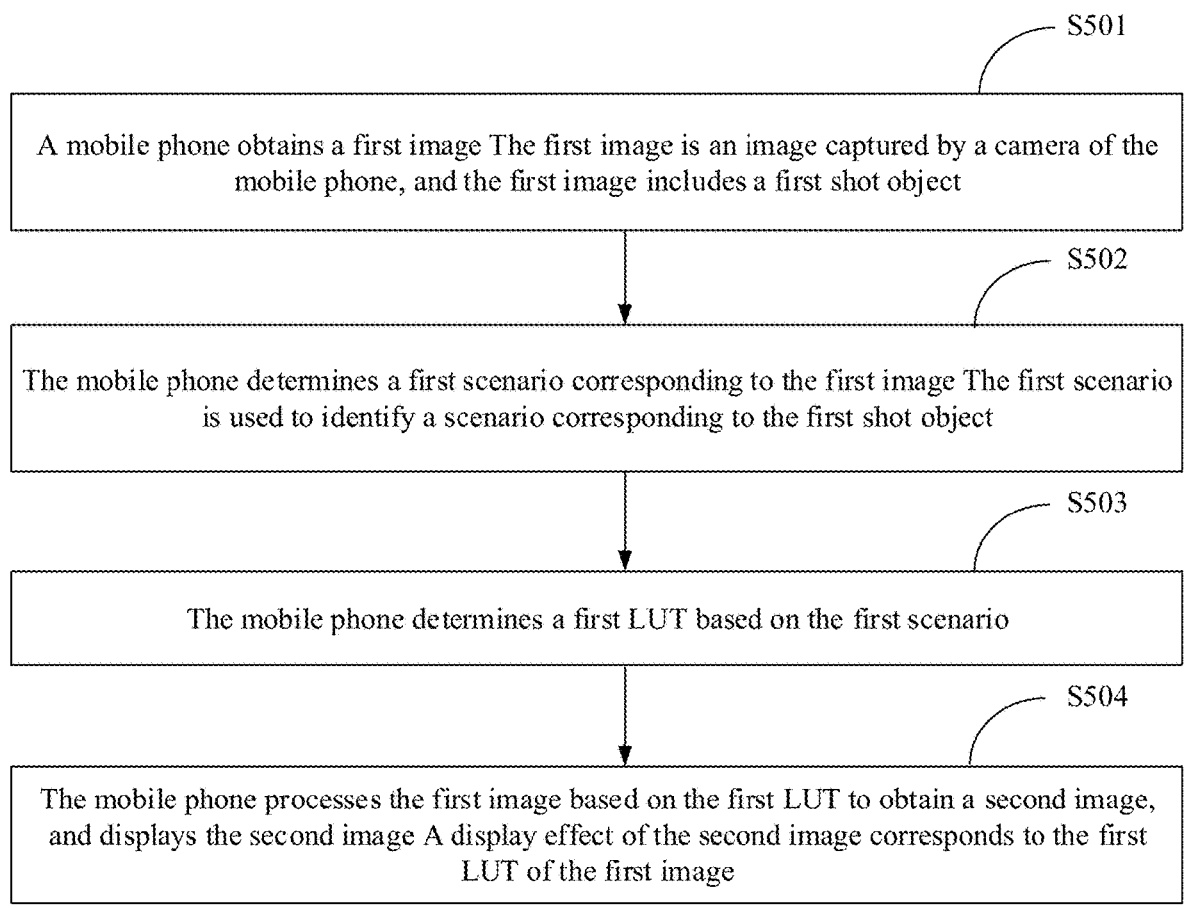
FIG. 5 is a flowchart of an image processing method according to an embodiment of this application.

An embodiment of this application provides an image processing method. The method may be applied to an electronic device including a camera and a display (such as a touchscreen). Based on an example in which the foregoing electronic device is a mobile phone, as shown in FIG. 5, the image processing method may include S501 to S504.

S501: A mobile phone obtains a first image. The first image is an image captured by a camera of the mobile phone, and the first image includes a first shot object.

In an application scenario (1) of this embodiment of this application, the mobile phone may capture a first image on a preview interface for photographing by the mobile phone. For example, the mobile phone may display a preview interface 601 shown in FIG. 6(*a*). The preview interface 601 includes a first image 602 captured by the camera of the mobile phone. The first image 602 is an image that is not processed by an LUT.

In an application scenario (2) of this embodiment of this application, the mobile phone may capture a first image on a preview interface before visual recording by the mobile phone. For example, the mobile phone may display a preview interface 801 shown in FIG. 8(*a*). The preview interface 801 includes a first image 802 captured by the camera of the mobile phone. The first image 802 is an image that is not processed by an LUT.

Figure 10A:
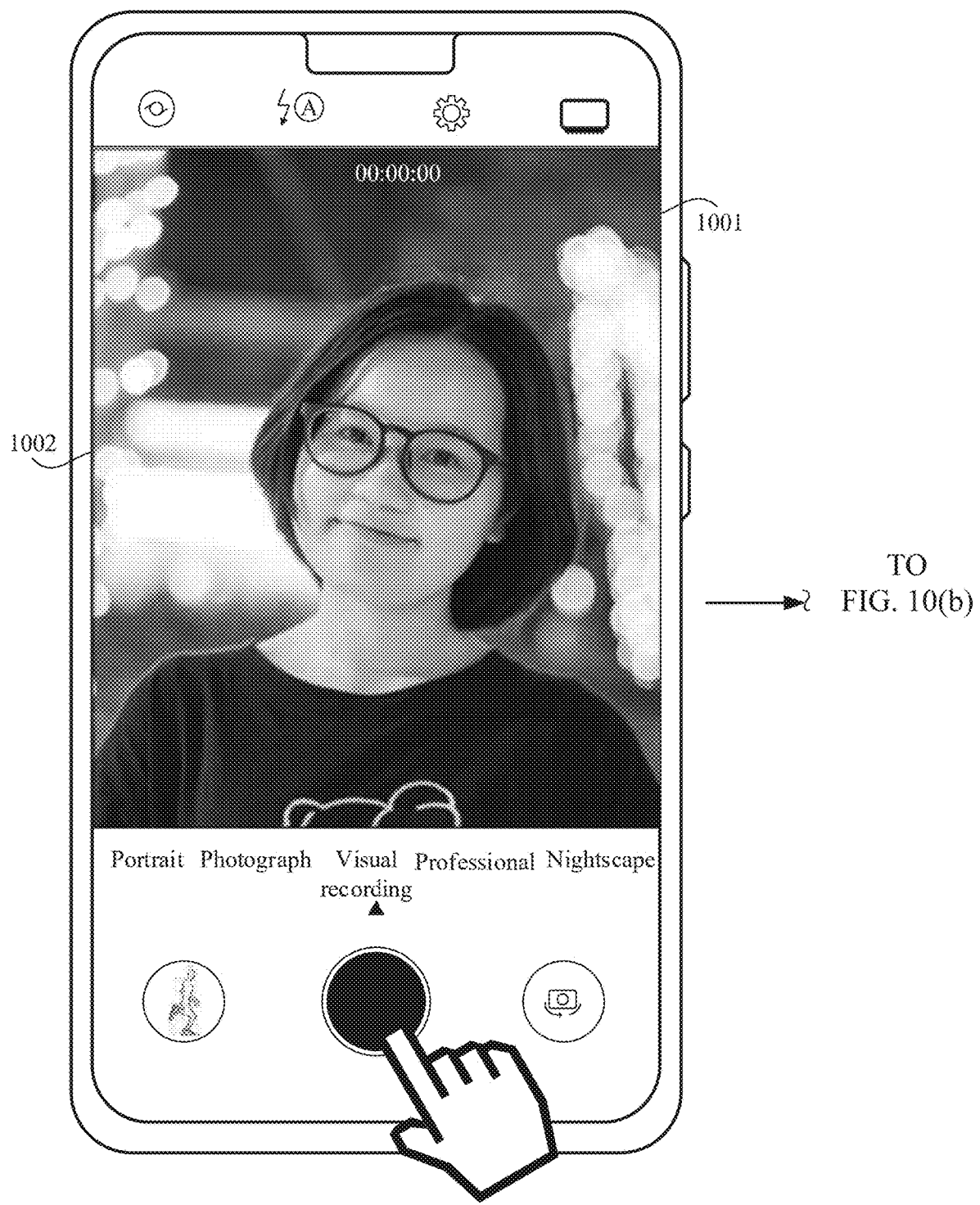
FIG. 10(a)-FIG. 10(c) are a schematic diagram of a framing interface for visual recording by another mobile phone according to an embodiment of this application.

In an application scenario (3) of this embodiment of this application, the mobile phone may capture a first image on a framing interface (also referred to as a preview interface) for visual recording being performed by the mobile phone. For example, a framing interface 1001 for visual recording shown in FIG. 10(*a*) is a framing interface for visual recording that is not started, and the framing interface 1001 includes a preview image 1002. In response to a visual recording operation of a user on the framing interface 1001 shown in FIG. 10(*a*), the mobile phone may display a preview interface 1003 shown in FIG. 10(*b*). The preview interface 1003 includes a first image 1004 captured by the camera of the mobile phone. The first image 1004 is an image that is not processed by an LUT.

It should be noted that the foregoing first image may be an image captured by the camera of the mobile phone. For example, the first image may be an original image captured by the camera of the mobile phone, and the first image is not processed by an ISP. Alternatively, the first image may be a preview image obtained from an image captured by the camera of the mobile phone. For example, the first image may be a preview image obtained after image processing performed on an original image captured by the camera of the mobile phone.

S502: The mobile phone determines a first scenario corresponding to the first image. The first scenario is used to identify a scenario corresponding to the first shot object.

S503: The mobile phone determines a first LUT based on the first scenario.

In this embodiment of this application, a plurality of third LUTs may be pre-configured in the mobile phone. The plurality of third LUTs may also be referred to as a plurality of preset LUTs. The plurality of third LUTs are used to process a preview image captured by the camera to obtain images with different display effects, and each third LUT corresponds to a display effect in one shooting scenario. For example, as shown in FIG. 1, the image 101 is obtained by using the LUT 1 (that is, a third LUT 1, also referred to as a preset LUT 1) to process the original image 100, the image 102 is obtained by using the LUT 2 (that is, a third LUT 2, also referred to as a preset LUT 2) to process the original image 100, and the image 103 is obtained by using the LUT 3 (that is, a third LUT 3, also referred to as a preset LUT 3) to process the original image 100. According to a comparison, the image 101, the image 102, and the image 103 shows different display effects. That is, the preset LUT 1, the preset LUT 2, and the preset LUT 3 may correspond to different display effects or styles.

In this embodiment of this application, different display effects may be display effects in different shooting scenarios. For example, the shooting scenario may be a portrait scenario, a travel scenario, a food scenario, a landscape scenario, a pet scenario, a still life scenario, or the like. It should be noted that the shooting scenarios in this embodiment of this application are in a one-to-one correspondence with the display effects or styles. In different shooting scenarios, a corresponding LUT may be used to process a preview image to obtain a corresponding display effect or style. Therefore, the mobile phone may recognize the first image, and determine a shooting scenario (that is, a first scenario) corresponding to the first image. Then, the mobile phone may determine a first LUT based on the first scenario.

It may be learned from the foregoing description that the shooting scenario may be a portrait scenario, a travel scenario, a food scenario, a landscape scenario, a pet scenario, a still life scenario, or the like. Shot objects in images captured in different shooting scenarios are different. For example, an image captured in a portrait scenario may include a portrait image, and an image captured in a food scenario may include a food image. Therefore, in this embodiment of this application, the mobile phone may recognize a shot object included in the first image, so as to determine a shooting scenario corresponding to the first image.

The mobile phone may recognize the first image by using a pre-configured image shooting scenario detection algorithm, so as to recognize a shooting scenario (that is, a first scenario) corresponding to the first image. For example, the first image is the first image 602 shown in FIG. 6(*a*). By recognizing the first image 602, the mobile phone may recognize that a shooting scenario (that is, a first scenario) corresponding to the first image 602 is a portrait scenario. In this way, the mobile phone may determine a third LUT corresponding to the portrait scenario as a first LUT.

It should be noted that, for the method in which the mobile phone recognizes a first scenario corresponding to the first image, reference may be made to related methods in the conventional technology. Details are not described herein again in this embodiment of this application. For specific examples of the foregoing image shooting scenario detection algorithm, refer to related algorithms in the conventional technology. Details are not described herein again in this embodiment of this application.

Figure 7A:
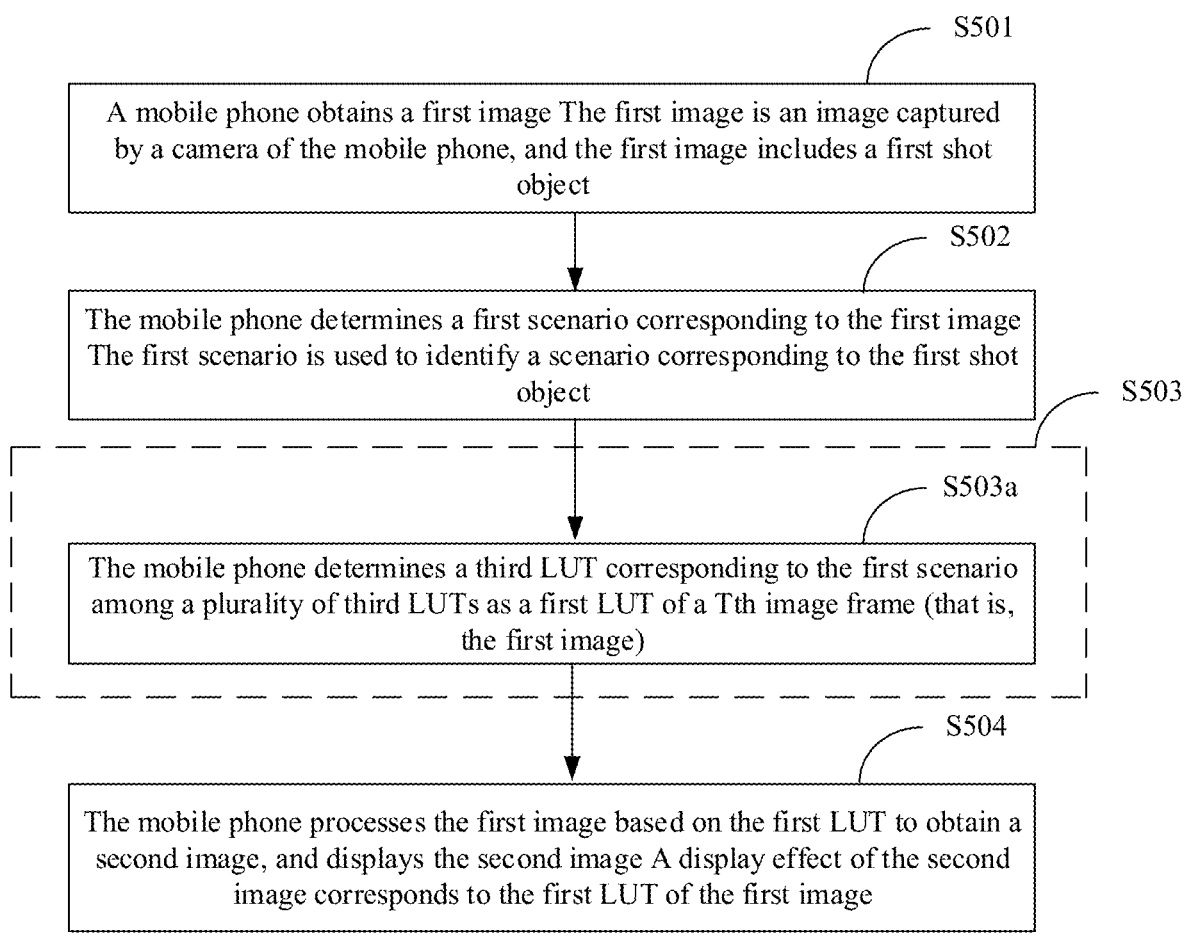
FIG. 7A is a flowchart of another image processing method according to an embodiment of this application.

In some embodiments, as shown in FIG. 7A, S503 may include S503*a*.

S503*a*: The mobile phone determines a third LUT corresponding to the first scenario among a plurality of third LUTs as a first LUT of a $T^{th}$ image frame (that is, the first image).

In this embodiment of this application, herein, based on an example in which the $T^{th}$ first-image frame is the first image 602 shown in FIG. 6(*a*), the method in which the mobile phone performs S502 and S503 (including S503*a*) to determine a first LUT is described with reference to FIG. 7B.

Figure 7B:
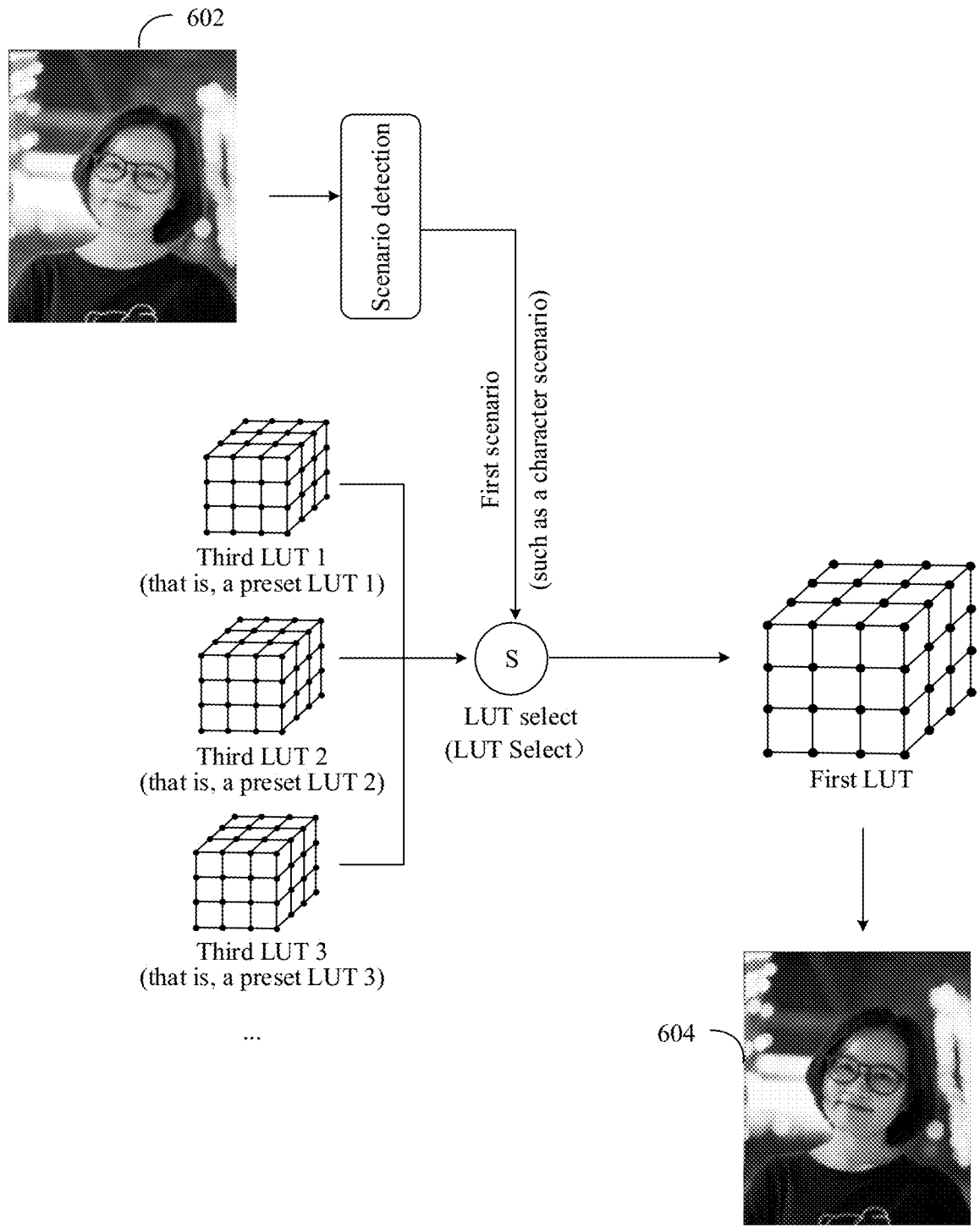
FIG. 7B is a schematic diagram of a principle of determining a final LUT (that is, a first LUT) of a $T^{th}$ image frame according to an embodiment of this application.

As shown in FIG. 7B, the mobile phone may detect a scenario of the first image 602, to recognize a first scenario (such as a portrait scenario) corresponding to the first image 602. Then, the mobile phone may perform LUT select (LUT Select), to select a first LUT corresponding to the portrait scenario from a plurality of third LUTs (such as third LUTs like the third LUT 1, the third LUT 2, and the third LUT 3).

In some other embodiments, when the mobile phone determines a final LUT, reference is made to a current image frame (that is, the first image), and reference is further made to a final LUT of the previous image frame of the first image.

In this way, in the process of changing LUTs, smooth transition of display effects or styles corresponding to different LUTs may be implemented, display effects of a plurality of preview image frames presented by the electronic device may be optimized, and visual experience of a user in the process of photographing or visual recording is improved.

Figure 7C:
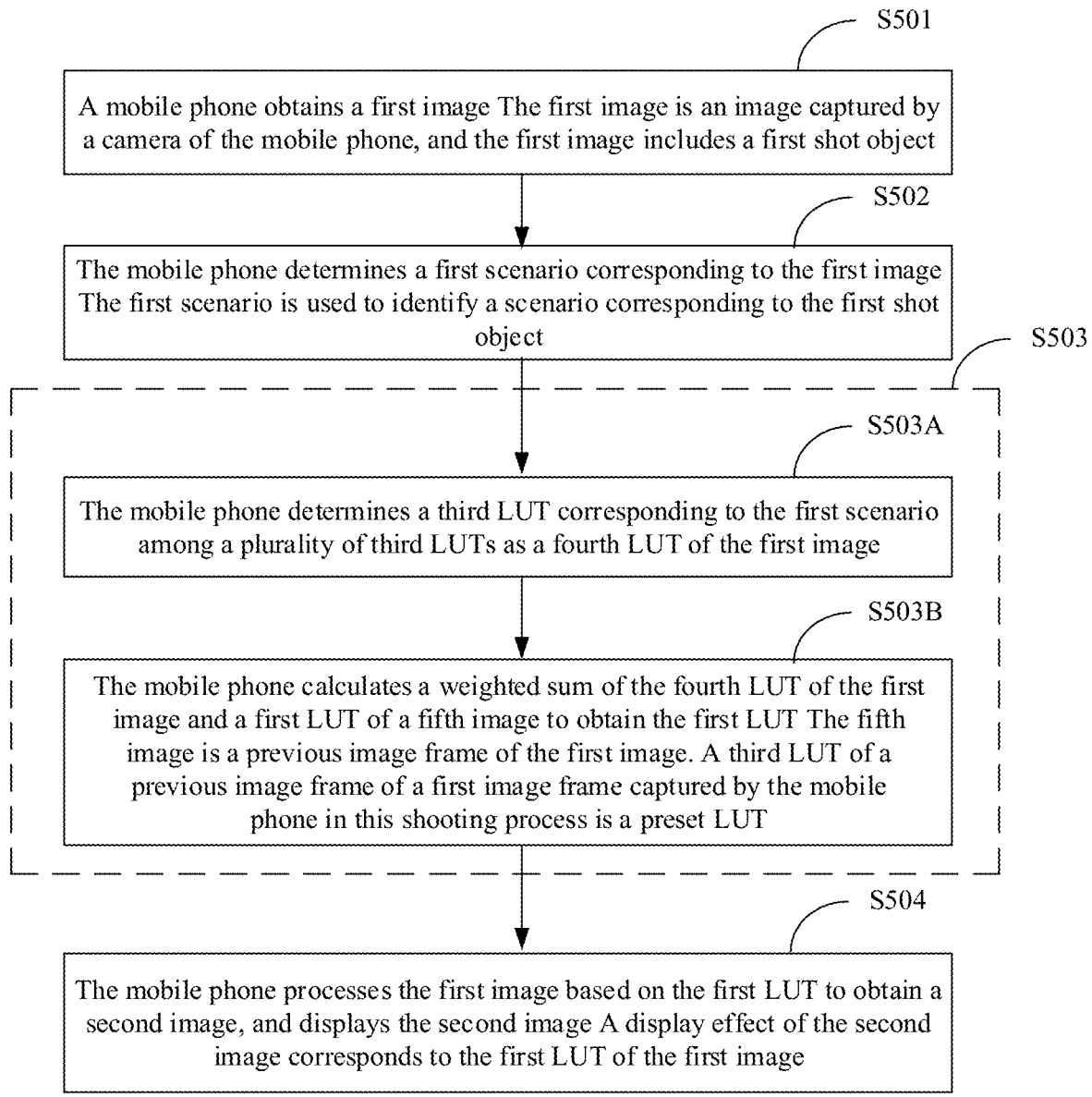
FIG. 7C is a flowchart of another image processing method according to an embodiment of this application.

Specifically, as shown in FIG. 7C, S503 may include S503A and S503B.

S503A: The mobile phone determines a third LUT corresponding to the first scenario among a plurality of third LUTs as a fourth LUT of the first image.

S503B: The mobile phone calculates a weighted sum of the fourth LUT of the first image and a first LUT of a fifth image to obtain the first LUT. The fifth image is a previous image frame of the first image. A third LUT of a previous image frame of a first first-image frame captured by the mobile phone in this shooting process is a preset LUT.

In a photographing mode or a visual recording mode, the camera of the mobile phone may capture images in real time, and output each image frame captured. For example, if the first image is a second image frame captured by the mobile phone, the fifth image is the first image frame captured by the mobile phone. If the first image is the $T^{th}$ image frame captured by the mobile phone, the fifth image is the $(T-1)^{th}$ image frame captured by the mobile phone, with $T \geq 2$ and T being an integer.

In some embodiments, the mobile phone may use a first weighting coefficient $P_1$ and a second weighting coefficient $P_2$ to calculate a weighted sum of the fourth LUT of the $T^{th}$ image frame (that is, the first image) and the first LUT of the $(T-1)^{th}$ image frame (that is, the fifth image), so as to obtain the first LUT of the $T^{th}$ image frame (that is, the first image). The first weighting coefficient $P_1$ and the second weighting coefficient $P_2$ may also be collectively referred to as time domain smoothing weights.

The first weighting coefficient $P_1$ is a weighting coefficient of the fourth LUT of the $T^{th}$ image frame, and the second weighting coefficient $P_2$ is a weighting coefficient of the first LUT of the $(T-1)^{th}$ image frame. A sum of the first weighting coefficient $P_1$ and the second weighting coefficient $P_2$ is equal to 1, that is, $P_1+P_2=1$. The first weighting coefficient $P_1$ and the second weighting coefficient $P_2$ may be preset in the mobile phone.

For example, in this embodiment of this application, the fourth LUT of the $T^{th}$ image frame may be denoted as $Q_{(T, 2)}$, the first LUT of the $(T-1)^{th}$ image frame may be denoted as $Q_{(T-1, 3)}$, and the first LUT of the $T^{th}$ image frame may be denoted as $Q_{(T, 3)}$. The first LUT of the $0^{th}$ image frame is a preset LUT That is, $Q_{(0, 3)}$ is a preset value. In this way, the mobile phone may use the following formula (1) to calculate the first LUT of the $T^{th}$ image frame, such as $Q_{(T, 3)}$.

$$Q_{(T,3)} = P_1 \times Q_{(T,2)} + P_2 \times Q_{(T-1,3)}. \quad \text{Formula (1)}$$

For example, when $T=1$, $Q_{(0, 3)}$, the first weighting coefficient $P_1$, and the second weighting coefficient $P_2$ are known quantities. Therefore, the mobile phone may use formula (1), such as $Q_{(1, 3)}=P_1 \times Q_{(1, 2)}+P_2 \times Q_{(0, 3)}$, to calculate the first LUT of the first image frame, such as $Q_{(1, 3)}$.

For example, when $T=2$, $Q_{(2, 3)}$, the first weighting coefficient $P_1$, and the second weighting coefficient $P_2$ are known quantities. Therefore, the mobile phone may use formula (1), such as $Q_{(2, 3)}=P_1 \times Q_{(2, 2)}+P_2 \times Q_{(1, 3)}$, to calculate the first LUT of the second image frame, such as $Q_{(2, 3)}$.

For another example, when $T=3$, $Q_{(2, 3)}$, the first weighting coefficient $P_1$, and the second weighting coefficient $P_2$ are known quantities. Therefore, the mobile phone may use formula (1), such as $Q_{(3, 3)}=P_1 \times Q_{(3, 2)}+P_2 \times Q_{(2, 3)}$, to calculate the first LUT of the third image frame, such as $Q_{(3, 3)}$.

For example, when $T=4$, $Q_{(4, 3)}$, the first weighting coefficient $P_1$, and the second weighting coefficient $P_2$ are known quantities. Therefore, the mobile phone may use formula (1), such as $Q_{(4, 3)}=P_1 \times Q_{(4, 2)}+P_2 \times Q_{(3, 3)}$, to calculate the first LUT of the fourth image frame, such as $Q_{(4, 3)}$.

In this way, when $T=n$, $Q_{(n, 3)}$, the first weighting coefficient $P_1$, and the second weighting coefficient $P_2$ are known quantities. Therefore, the mobile phone may use formula (1), such as $Q_{(n, 3)}=P_1 \times Q_{(n, 2)}+P_2 \times Q_{(n-1, 3)}$, to calculate the first LUT of the $n^{th}$ image frame, such as $Q(n, 3)$.

It should be noted that a smaller first weighting coefficient $P_1$ (that is, the weighting coefficient of the fourth LUT of the $T^{th}$ image frame) indicates a larger second weighting coefficient $P_2$ (that is, the weighting coefficient of the first LUT of the $(T-1)^{th}$ image frame), and a smoother transition effect of a plurality of second-image frames.

In this embodiment of this application, herein, based on an example in which the $T^{th}$ first-image frame is the first image 602 shown in FIG. 6(a), the method in which the mobile phone performs S502 and S503 (including S503A and S503B) to determine a first LUT is described with reference to FIG. 7D.

Figure 7D:
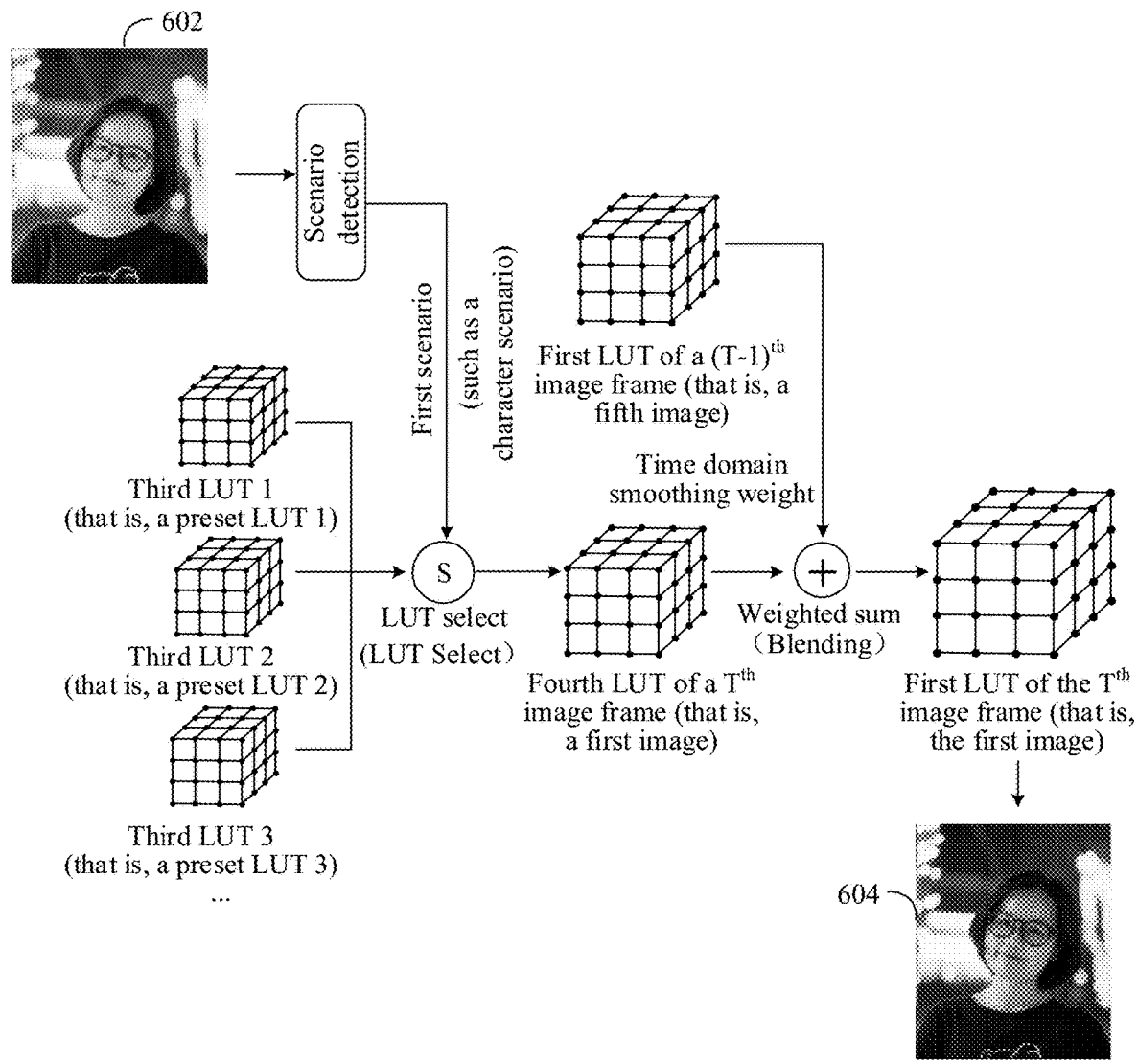
FIG. 7D is a schematic diagram of a principle of determining a final LUT (that is, a first LUT) of a $T^{th}$ image frame according to an embodiment of this application.

As shown in FIG. 7D, the mobile phone may detect a scenario of the first image 602, to recognize a first scenario (such as a portrait scenario) corresponding to the first image 602. Then, the mobile phone may perform LUT select (LUT Select), to select a fourth LUT corresponding to the portrait scenario from a plurality of third LUTs (such as third LUTs like the third LUT 1, the third LUT 2, and the third LUT 3). Finally, the mobile phone may calculate a weight sum (Blending) of the fourth LUT of the $T^{th}$ image frame (that is, the first image) and the first LUT of the $(T-1)^{th}$ image frame (that is, the fifth image), so as to obtain the first LUT of the $T^{th}$ image frame.

Figure 7E:
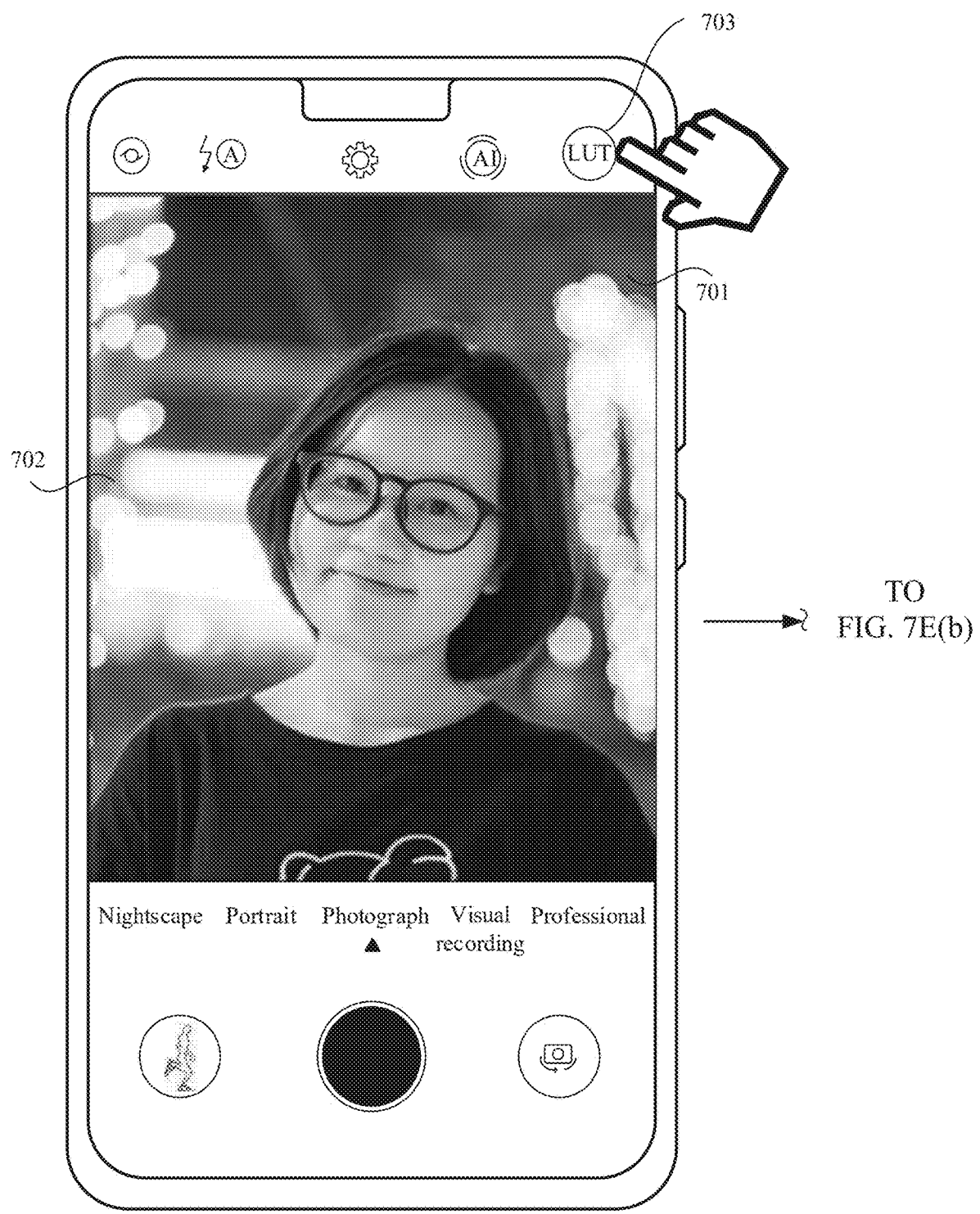
FIG. 7E(a) and FIG. 7E(b) are a schematic diagram of a framing interface for photographing by another mobile phone according to an embodiment of this application.
Figure 7E:
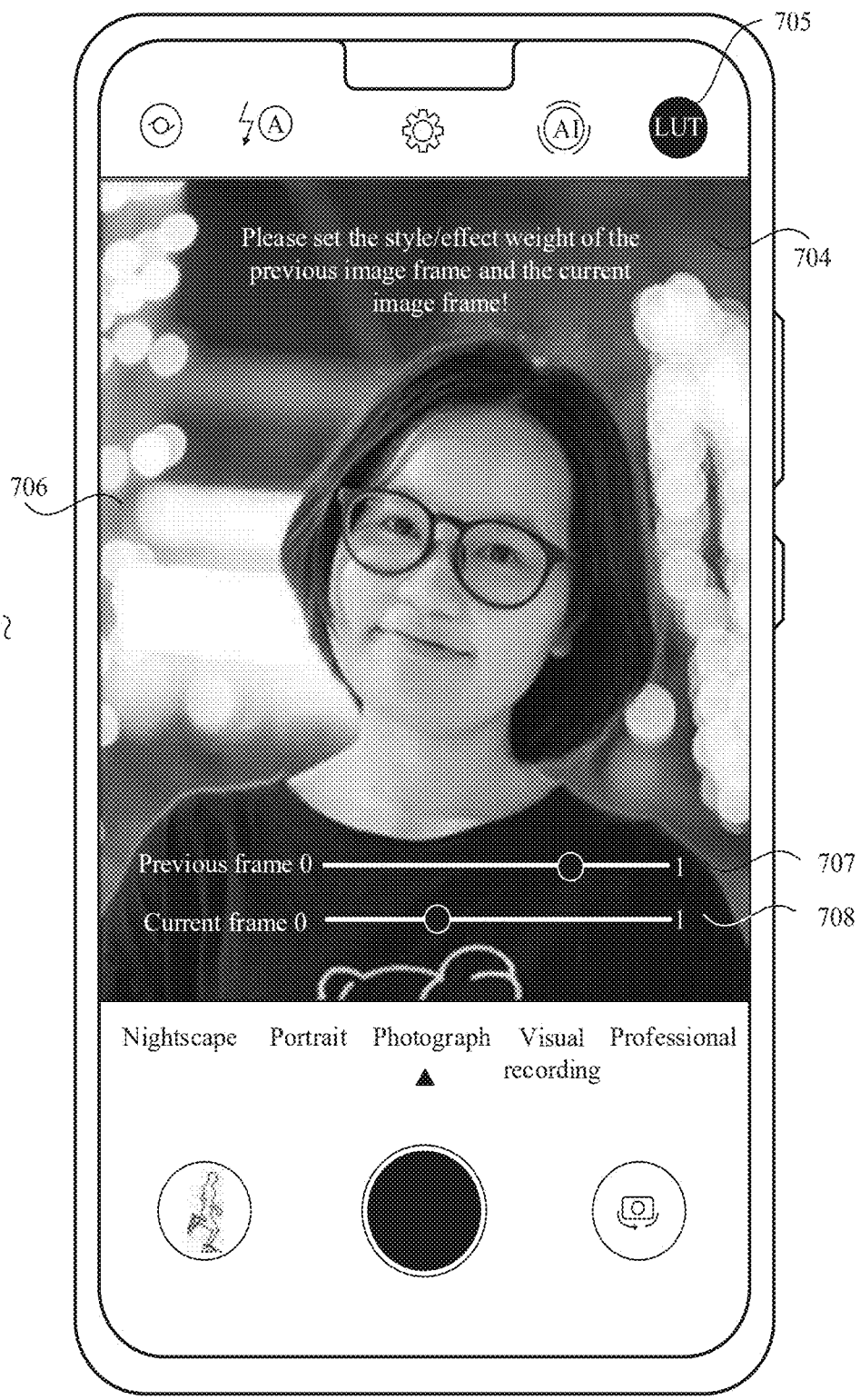

In some other embodiments, the user may set weighting coefficients of the fourth LUT of the $T^{th}$ image frame (that is, the first image) and the first LUT of the $(T-1)^{th}$ image frame (that is, the fifth image). Specifically, the foregoing preview interface (such as the preview interface 601, the preview interface 801, or the preview interface 1003) may further include a first preset control. The first preset control is used to trigger the mobile phone to set weights of the fourth LUT of the $T^{th}$ image frame and the first LUT of the $(T-1)^{th}$ image frame, that is, the foregoing first weighting coefficient and second weighting coefficient. For example, as shown in FIG. 7E(a), a preview interface 701 may include a first preset control 703, and the first preset control 703 is used to trigger the mobile phone to set the weights of the fourth LUT of the $T^{th}$ image frame and the first LUT of the $(T-1)^{th}$ image frame. The preview interface 701 further includes a first image 702. Specifically, before S503B, the method according to this embodiment of this application may further include S503' and S503".

S503': The mobile phone displays a first setting item and a second setting item in response to a tap operation of the user on the first preset control.

The first setting item is used to set the first weighting coefficient of the fourth LUT of the $T^{th}$ image frame, and the second setting item is used to set the second weighting coefficient of the first LUT of the $(T-1)^{th}$ image frame.

For example, in response to a tap operation of the user on the first preset control 703 shown in FIG. 7E(a), the mobile phone may display a preview interface 704 shown in FIG. 7E(b). The preview interface 704 includes a first preset control 705, a first image 706, a first setting item 707, and a second setting item 708. The first setting item 707 is used to set the first weighting coefficient of the fourth LUT of the $T^{th}$ image frame. The second setting item 708 is used to set the second weighting coefficient of the first LUT of the $(T-1)^{th}$ image frame. The first preset control 705 and the first preset control 703 are in different states. If the first preset control 705 is in an on state, the first preset control 703 is in an off state.

In some embodiments, the foregoing preview interface (such as the preview interface 601, the preview interface 801, or the preview interface 1003) may not include the foregoing first preset control. In this embodiment, the mobile phone may receive a first preset operation input by the user on the preview interface. S504' may be replaced with: The mobile phone displays a first setting item and a second setting item on the preview interface in response to the first preset operation of the user on the preview interface. For example, the first preset operation may be any preset gesture such as an L-shaped gesture, an S-shaped gesture, or a √-shaped gesture input by the user on a display (such as a touchscreen) of the mobile phone. For another example, the first preset operation may be a tap operation of the user on a first physical key of the mobile phone. The first physical key may be one physical key or a combination of at least two physical keys in the mobile phone.

S503": In response to a setting operation of the user on the first setting item and/or the second setting item, the mobile phone uses the first weighting coefficient set by the user as a weighting coefficient of the fourth LUT of the $T^{th}$ image frame, and uses the second weighting coefficient set by the user as a weighting coefficient of the first LUT of the $(T-1)^{th}$ image frame. The first weighting coefficient and the second weighting coefficient may be collectively referred to as time domain smoothing weights.

If weighting coefficients (including the first weighting coefficient and the second weighting coefficient) set by the user are different, the mobile phone uses the weighting coefficient set by the user to obtain the first LUT of the $T^{th}$ image frame. When first LUTs of different $T^{th}$ image frames are used to process a same first image, different display effects may be obtained. In some embodiments, the mobile phone may further display a display effect obtained through processing by the first LUT of the $T^{th}$ image frame after the user adjusts the first weighting coefficient and the second weighting coefficient.

Figure 7F:
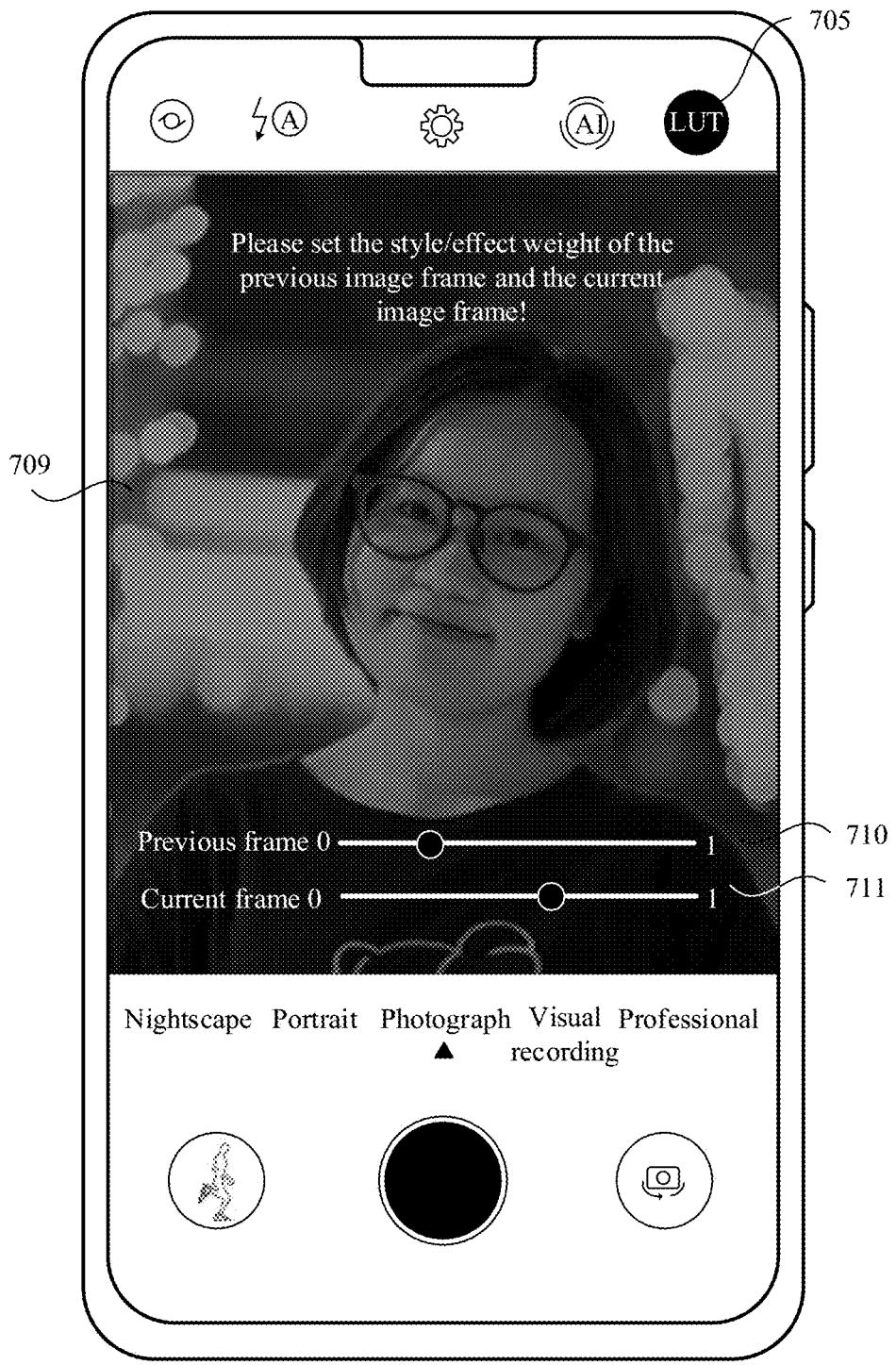
FIG. 7F(a)-FIG. 7F(c) are a schematic diagram of a framing interface for photographing by another mobile phone according to an embodiment of this application.
Figure 7F:
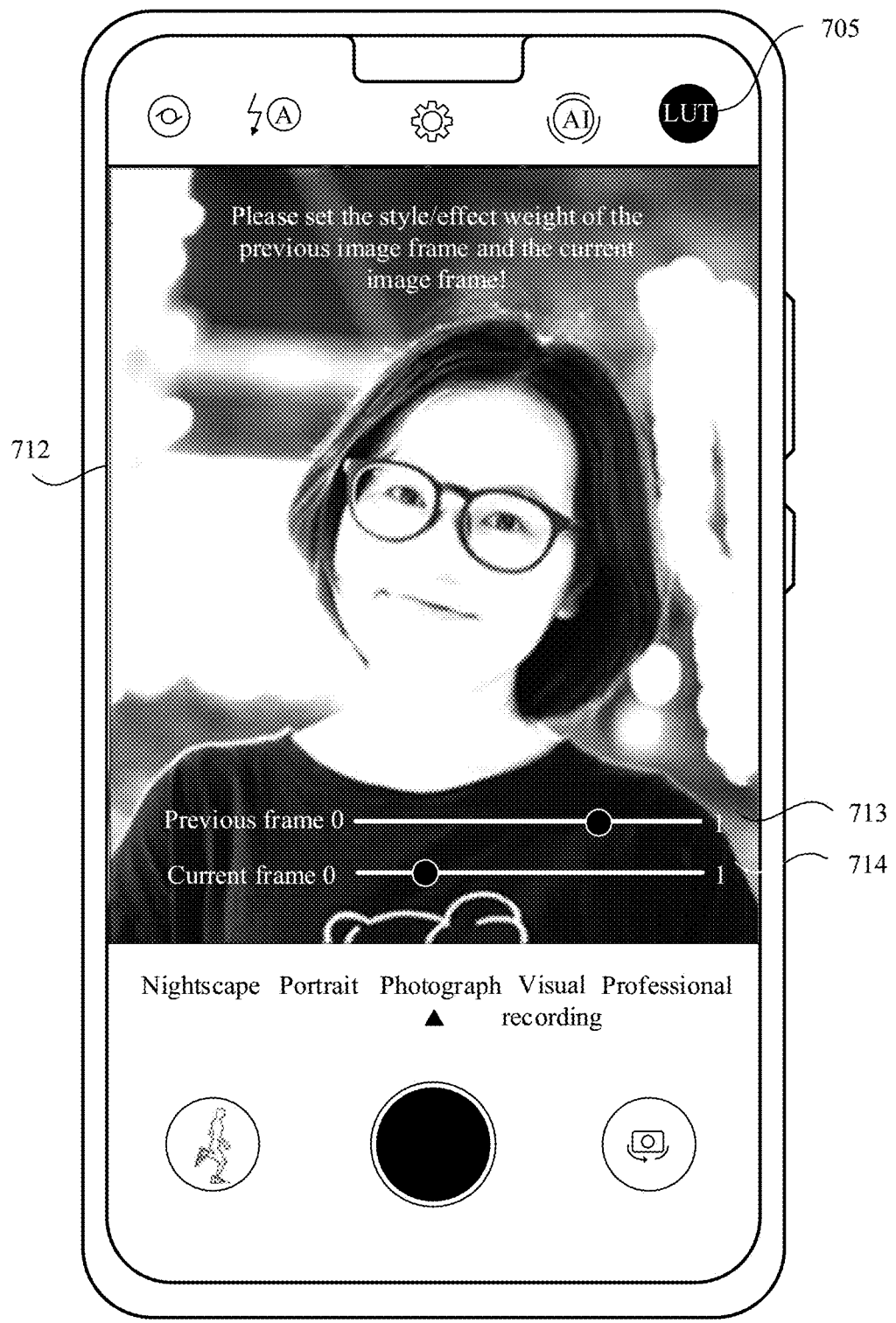
Figure 7F:
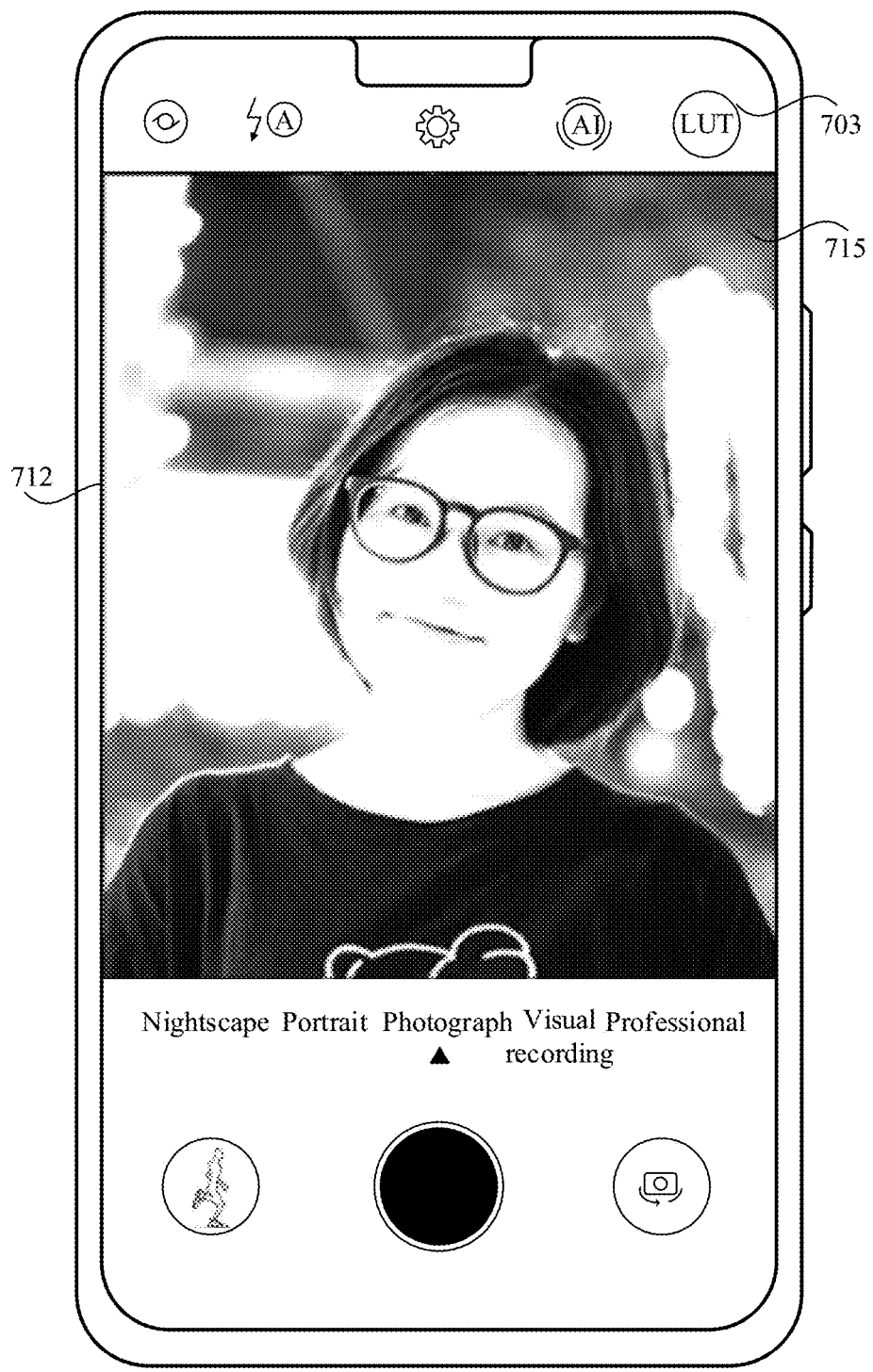

For example, a first weighting coefficient corresponding to a first setting item 707 shown in FIG. 7E(b), a first weighting coefficient corresponding to a first setting item 710 shown in FIG. 7F(a), and a first weighting coefficient corresponding to a first setting item 713 shown in FIG. 7F(b) are all different. In addition, a second weighting coefficient corresponding to a second setting item 708 shown in FIG. 7E(b), a second weighting coefficient corresponding to a second setting item 711 shown in FIG. 7F(a), and a second weighting coefficient corresponding to a second setting item 714 shown in FIG. 7F(b) are all different. Therefore, a preview image 706 shown in FIG. 7E(b), a preview image 709 shown in FIG. 7F(a), and a preview image 712 shown in FIG. 7F(b) have different display effects. In this way, the user may set appropriate weighting coefficients based on adjusted display effects. 715 shown in FIG. 7F(c) is an image obtained through processing by using the LUT determined by the weight (that is, the weighting coefficient) shown in FIG. 7F(b).

For example, it is assumed that the first weighting coefficient set by the user is $P_1'$, and the second weighting coefficient is $P_2'$. In this embodiment, the fourth LUT of the T image frame may be denoted as $Q_{(T, 2)}$, the first LUT of the $(T-1)^{th}$ image frame may be denoted as $Q_{(T-1, 3)}$, and the first LUT of the $T^{th}$ image frame may be denoted as $Q_{(T, 3)}$. The first LUT of the $0^{th}$ image frame is a preset LUT That is, $Q_{(0, 3)}$ is a preset value. In this way, the mobile phone may use the following formula (2) to calculate the first LUT of the $T^{th}$ image frame, such as $Q_{(T, 3)}$.

$$Q_{(T,3)} = P_1' \times Q_{(T,2)} + P_2' \times Q_{(T-1,3)}. \quad \text{Formula (2)}$$

For example, when T=1, $Q_{(0, 3)}$, the first weighting coefficient $P_1'$, and the second weighting coefficient $P_2'$ are known quantities. Therefore, the mobile phone may use formula (2), such as $Q_{(1, 3)} = P_1' \times Q_{(1, 2)} + P_2' \times Q_{(0, 3)}$, to calculate the first LUT of the first image frame, such as $Q_{(1, 3)}$.

For example, when T=2, $Q_{(1, 3)}$, the first weighting coefficient $P_1'$, and the second weighting coefficient $P_2'$ are known quantities. Therefore, the mobile phone may use formula (2), such as $Q_{(2, 3)} = P_1 \times Q_{(2, 2)} + P_2 \times Q_{(1, 3)}$, to calculate the first LUT of the second image frame, such as $Q_{(2, 3)}$.

It should be noted that, in a process of shooting or visual recording by the mobile phone, the user may trigger the mobile phone anytime to perform S504' and S504", and reset the first weighting coefficient and the second weighting coefficient. For example, after it is assumed that T=2 and before T=3, the first weighting coefficient is set to $P_1''$, and the second weighting coefficient is set to $P_2''$. Then, the mobile phone may use formula (3) to calculate the first LUT of the $T^{th}$ image frame, such as $Q_{(3, 3)}$.

For example, when T=3, $Q_{(2, 3)}$, the first weighting coefficient $P_1''$, and the second weighting coefficient $P_2''$ are known quantities. Therefore, the mobile phone may use formula (3), such as $Q_{(3, 3)} = P_1'' \times Q_{(3, 2)} + P_2'' \times Q_{(2, 3)}$, to calculate the first LUT of the third image frame, such as $Q_{(3, 3)}$.

For example, when T=4, $Q_{(4, 3)}$, the first weighting coefficient $P_1$, and the second weighting coefficient $P_2$ are known quantities. Therefore, the mobile phone may use formula (3), such as $Q_{(4, 3)} = P_1'' \times Q_{(4, 2)} + P_2'' \times Q_{(3, 3)}$, to calculate the first LUT of the fourth image frame, such as $Q_{(4, 3)}$.

It should be noted that a smaller first weighting coefficient (that is, the weighting coefficient of the fourth LUT of the $T^{th}$ image frame) indicates a larger second weighting coefficient (that is, the weighting coefficient of the first LUT of the $(T-1)^{th}$ image frame), and a smoother transition effect of a plurality of second-image frames.

S504: The mobile phone processes the first image based on the first LUT to obtain a second image, and displays the second image. A display effect of the second image corresponds to the first LUT of the first image.

Figure 6A:
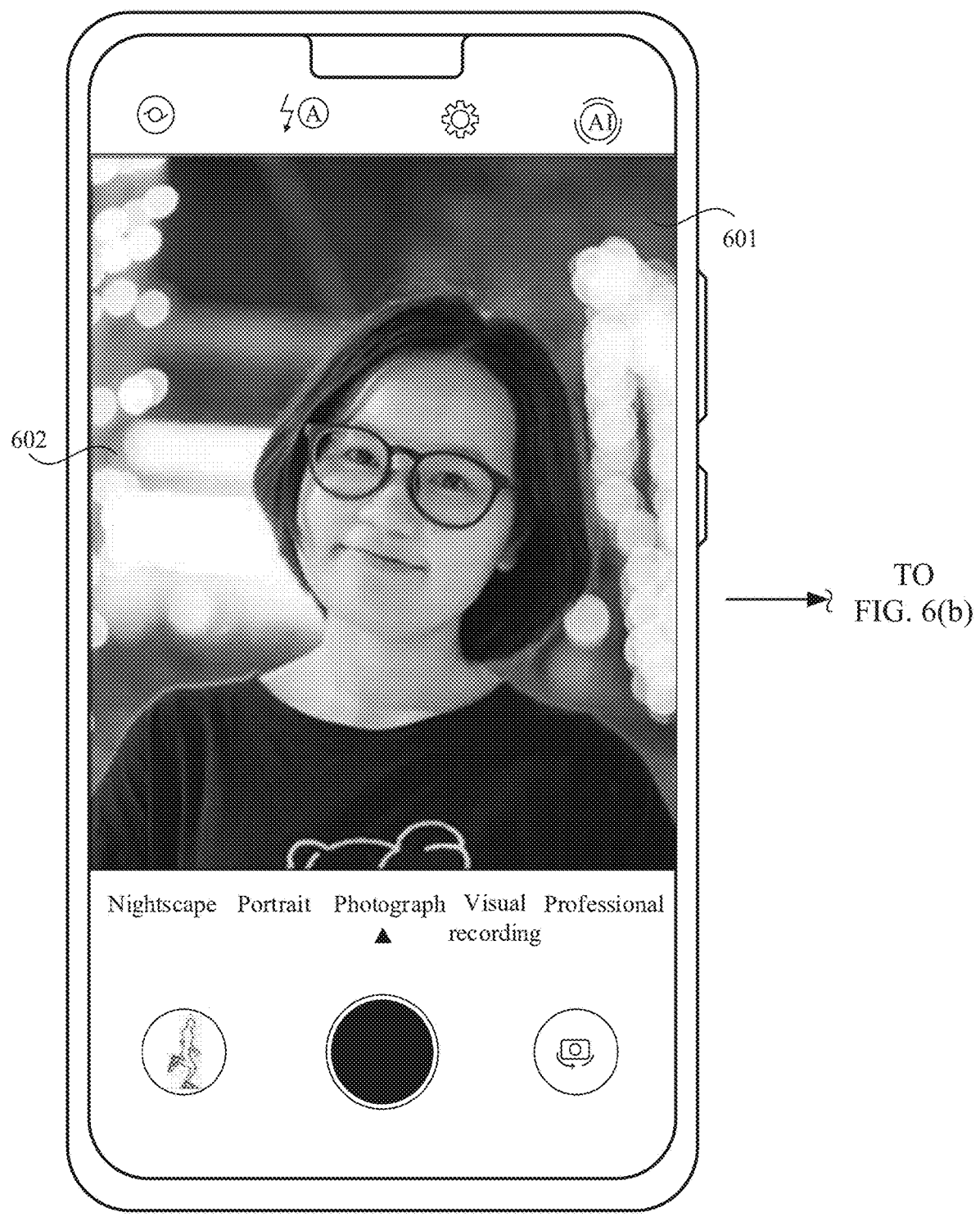
FIG. 6(a)-FIG. 6(c) are a schematic diagram of a framing interface for photographing by a mobile phone according to an embodiment of this application.
Figure 6B:
Figure 6C:
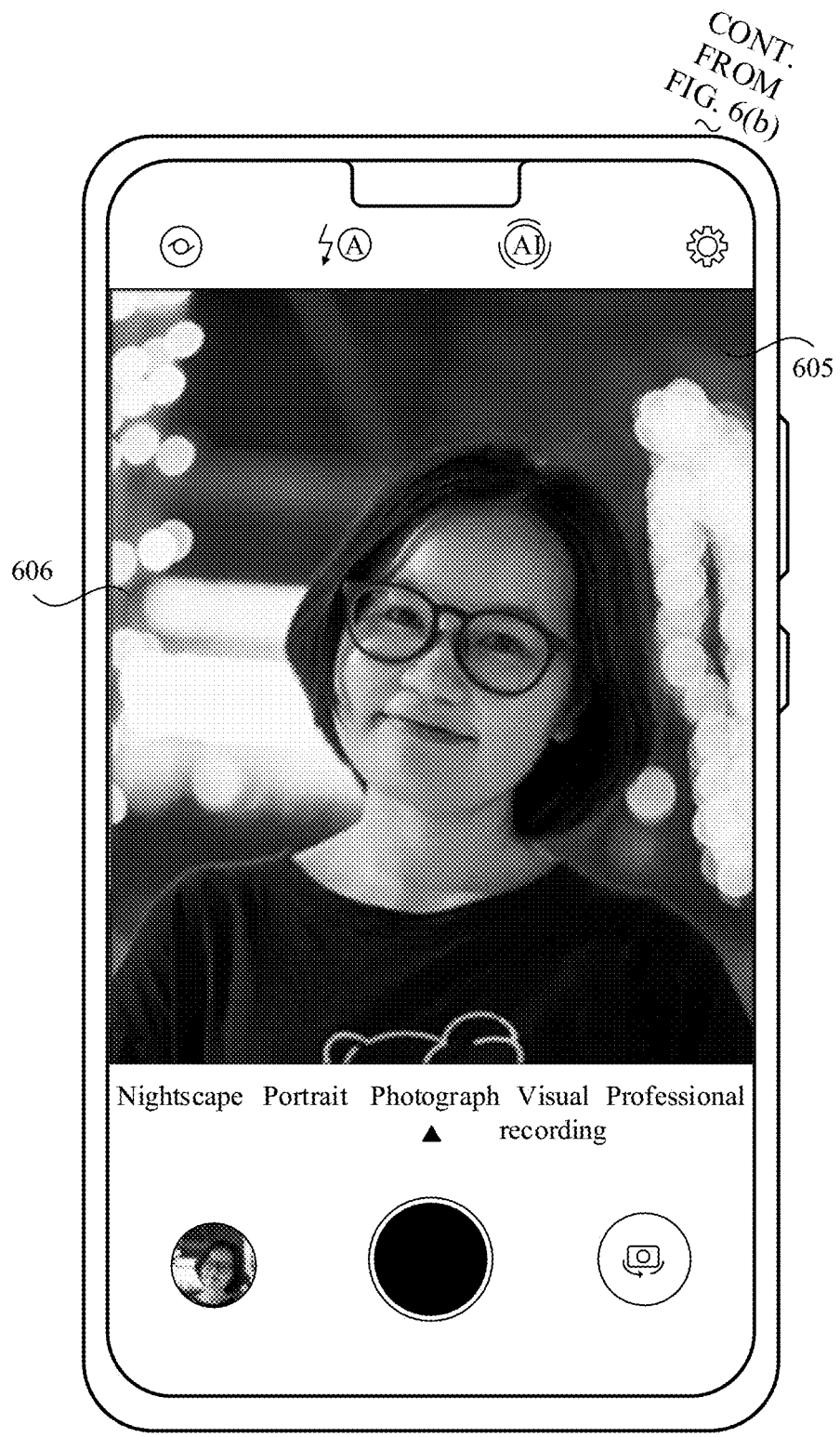

For example, in the foregoing application scenario (1), the first image is the first image 602 shown in FIG. 6(a). When the mobile phone performs S504, a second image 604 shown in FIG. 6(b) may be obtained, and a preview interface 603 shown in FIG. 6(b) may be displayed. The preview interface 603 includes the second image 604 obtained through processing by using the first LUT of the $T^{th}$ image frame. For a same image, a display effect of the image that is not processed by using an LUT and a display effect of the image that is processed by using an LUT are different. For example, the first image 602 shown in FIG. 6(a) is not processed by an LUT, and the second image 604 shown in FIG. 6(b) is an image processed by an LUT. A display effect of the first image 602 is different from a display effect of the second image 604. The "display effect" of the image in this embodiment of this application means an image effect that can be observed by human eyes after the image is displayed on a display. In response to a tap operation of the user on a "Shooting shutter" shown in FIG. 6(b), the mobile phone may save the second image 604, and display a preview interface 605 for photographing shown in FIG. 6(c). The preview interface 605 for photographing includes a preview image 606.

For example, in this embodiment of this application, S504 is described herein with reference to FIG. 7D. The mobile phone may perform S504, that is, calculate a weighted sum of the fourth LUT of the $T^{th}$ image frame and the first LUT of the $(T-1)^{th}$ image frame by using time domain smoothing weights (including the foregoing first weighting coefficient and second weighting coefficient) shown in FIG. 7D, so as to obtain the first LUT of the Ta image frame shown in FIG. 7D. Then, the mobile phone may use the first LUT of the $T^{th}$ frame shown in FIG. 7D to perform image processing on the preview image captured by the camera to obtain the second image 604 shown in FIG. 7D.

Figure 8A:
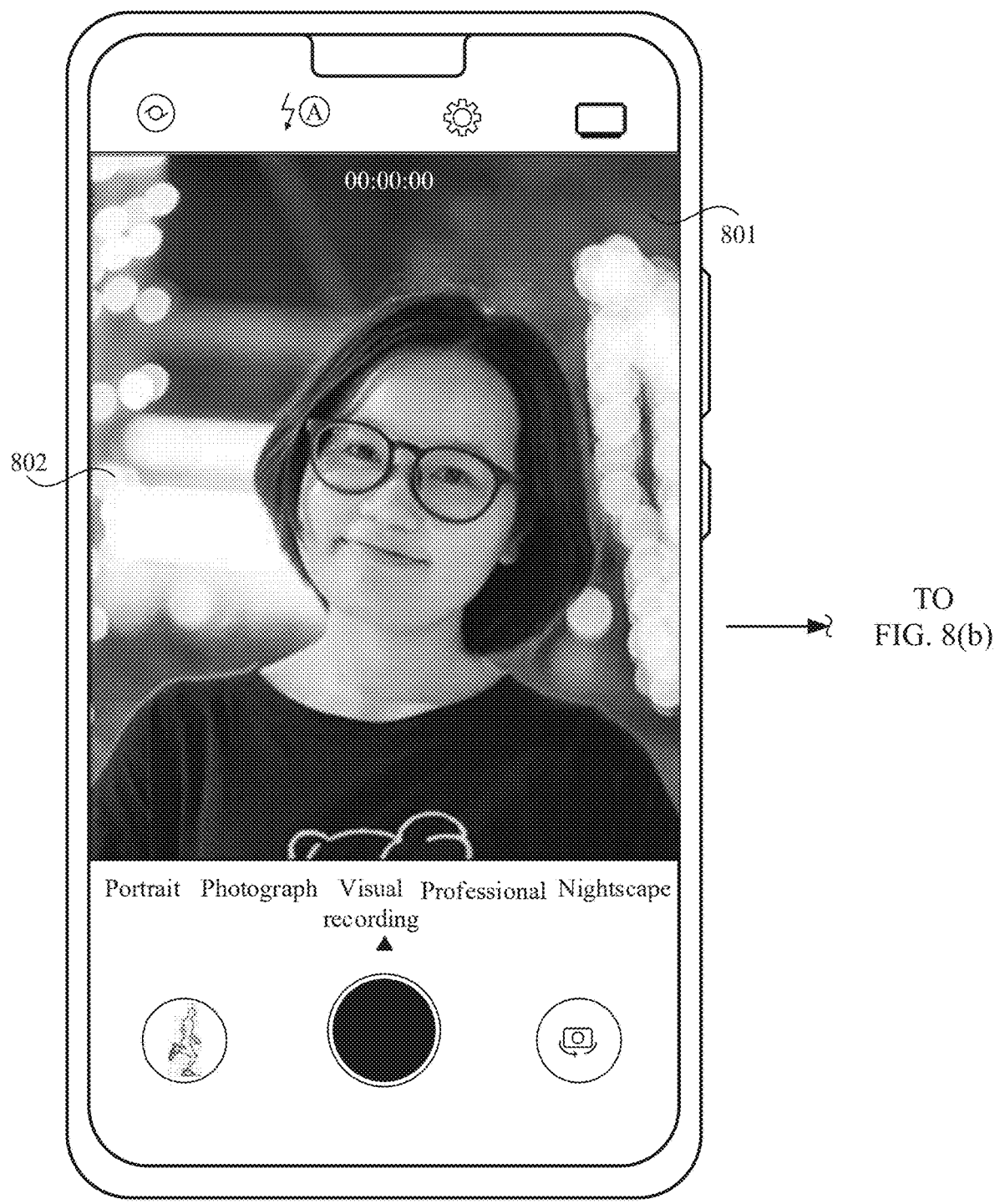
FIG. 8(a) and FIG. 8(b) are a schematic diagram of a framing interface for visual recording by a mobile phone according to an embodiment of this application.

For example, in the foregoing application scenario (2), the first image is the first image 802 shown in FIG. 8(a). When the mobile phone performs S504, a second image 804 shown in FIG. 8(b) may be obtained, and a preview interface 803 shown in FIG. 8(b) may be displayed. The preview interface 803 includes the second image 804 obtained through processing by using the first LUT of the $T^{th}$ image frame. A display effect of the second image 804 shown in FIG. 8(b) is different from a display effect of the first image 802 shown in FIG. 8(a).

In a process of photographing by the mobile phone, a framing interface of the camera of the mobile phone may change greatly. For example, the user may move the mobile phone, which changes framing content of the mobile phone. For another example, the user may switch a front-facing camera and a rear-facing camera of the mobile phone, which changes framing content of the mobile phone. If the framing content of the mobile phone changes greatly, if this solution is implemented, the display effect/style of the mobile phone may change with the change of the framing content.

Specifically, after S304, the mobile phone may capture a third image, where the third image is an image captured by the camera of the mobile phone, and the third image includes a second shot object; the mobile phone determines a second scenario corresponding to the second image, w % here the second scenario is used to identify a scenario corresponding to the second shot object; the mobile phone determines a second LUT based on the second scenario; and the mobile phone processes the third image based on the second LUT to obtain a fourth image, and displays the fourth image. A display effect of the fourth image corresponds to the second LUT.

Figure 8B:
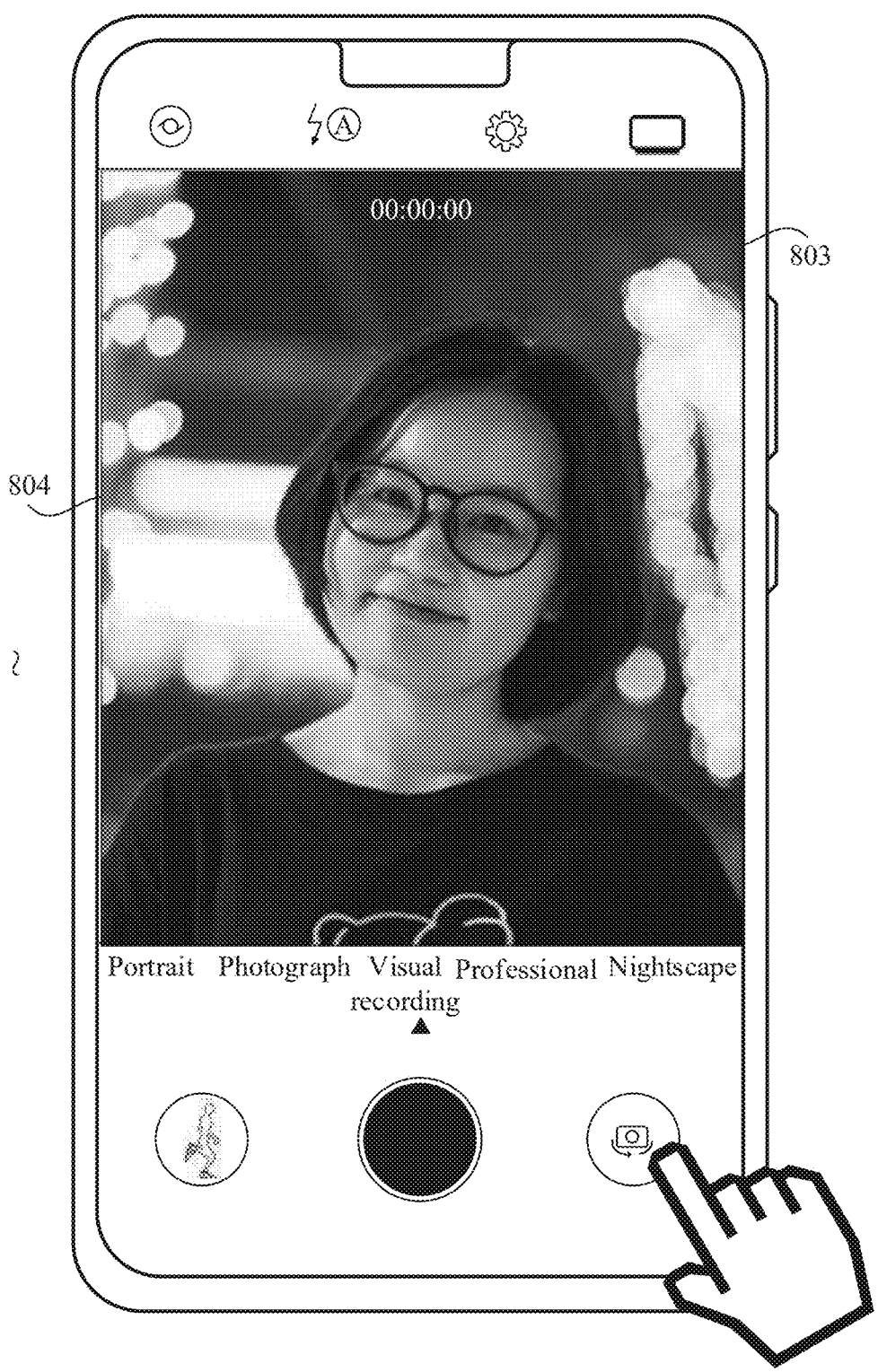

For example, it is assumed that the preview image 804 shown in FIG. 8(b) is an image captured by a front-facing camera. In response to a tap operation of the user on a camera switching option shown in FIG. 8(b), the mobile phone may switch to use a rear-facing camera to capture an image. For example, the mobile phone may display a framing interface 901 shown in FIG. 9(a). The framing interface 901 for visual recording includes a preview image (which may be used as a fourth image) 902. The preview image 902 as the fourth image may be obtained by processing the third image captured by the camera. Because image content of the preview image 902 and the preview image 804 has changed greatly, shooting scenarios of the preview image 902 and the preview image 804 may also change greatly. For example, the shooting scenario of the preview image 804 is a portrait scenario (that is, the first scenario), and the shooting scenario of the preview image 902 may be a food scenario (that is, thee second scenario). In this way, the mobile phone may automatically adjust an LUT. For example, the mobile phone may display a framing interface 903 for visual recording shown in FIG. 9(b). The framing interface 903 for visual recording includes a preview image (which may be used as a fourth image) 904. The shooting scenario of the preview image (which may be used as the fourth image) 904 is different from the shooting scenario the preview image (which may be used as the second image) 902, and the LUT used for processing the preview image 904 is different from the LUT used for processing preview image 902d. Therefore, the display effect of the preview image 904 is different from the display effect of the preview image 902.

Figure 10B:
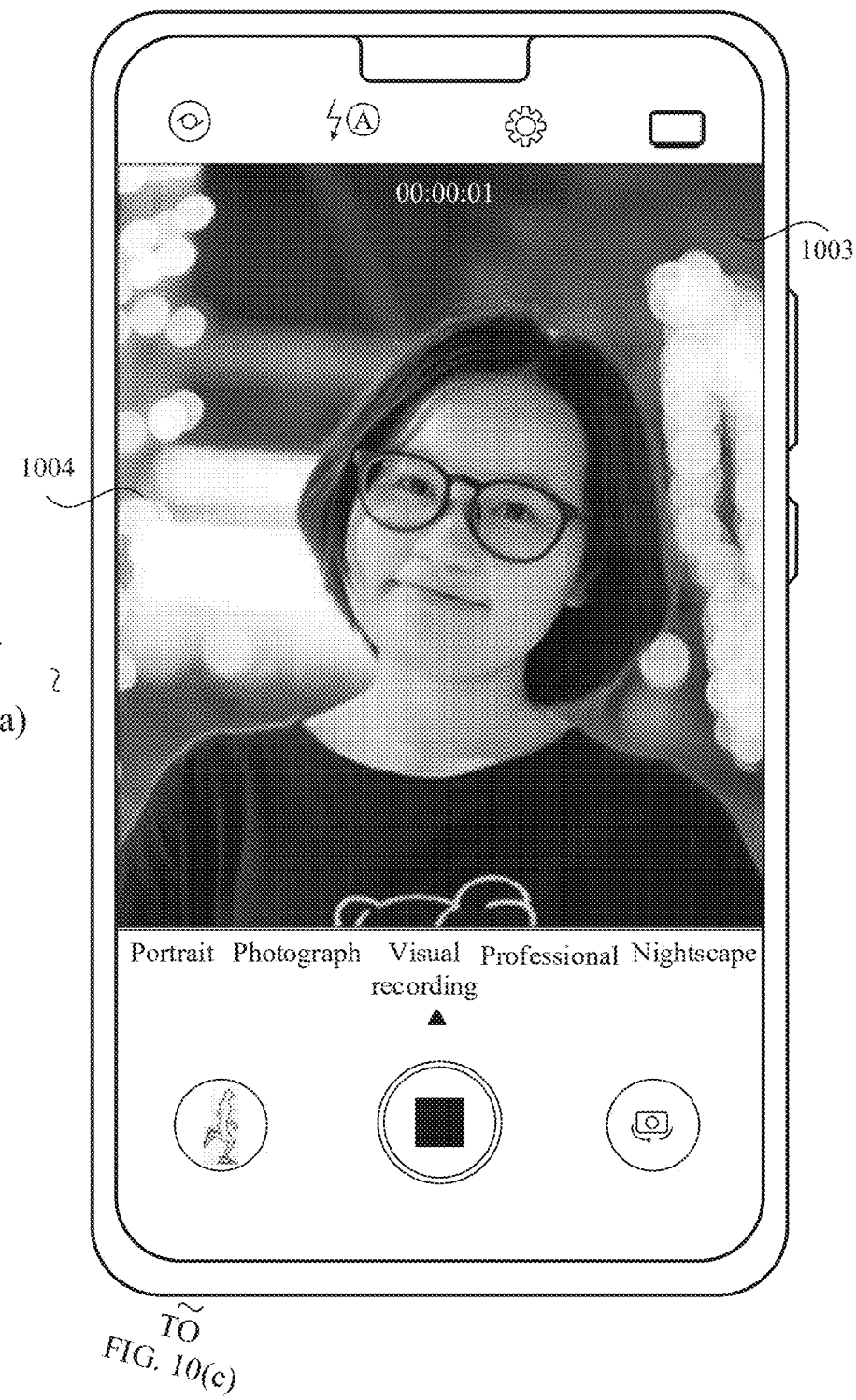
Figure 10C:
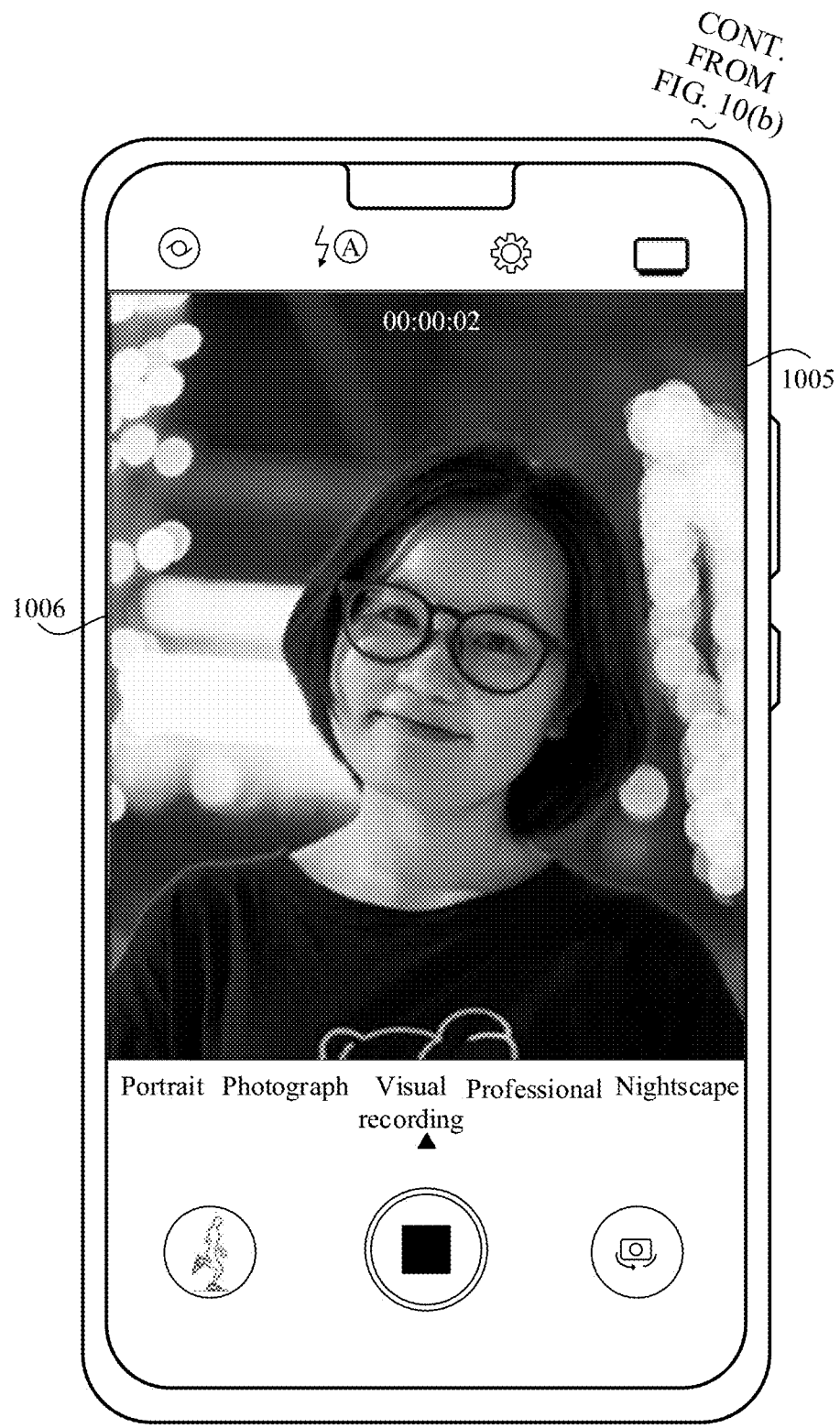

For example, in the foregoing application scenario (3), the first image is the first image 1004 on the preview interface 1003 shown in FIG. 10(b). When the mobile phone performs S504, a second image 1006 shown in FIG. 10(c) may be obtained, and a preview interface 1005 shown in FIG. 10(b) may be displayed. The preview interface 1005 includes the second image 1006 obtained through processing by using the first LUT of the $T^{th}$ image frame. A display effect of the second image 1006 is different from a display effect of the first image 1004.

In the image processing method according to this embodiment of this application, the mobile phone may determine a scenario (that is, a first scenario) corresponding to a first-image frame captured by the camera. Then the mobile phone may determine a first LUT corresponding to the first scenario. Finally, the mobile phone may perform image processing on the first image by using the first LUT of this image frame to obtain a second image, and display the second image. A display effect of the second image is the same as a display effect corresponding to the first LUT.

In this solution, the mobile phone may dynamically adjust LUTs in a process of photographing or visual recording based on each image frame periodically obtained by the mobile phone. In this way, in the process of photographing or visual recording, display effects or styles corresponding to different LUTs may be presented, and the display effects obtained by photographing or visual recording may be enriched.

In addition, when the mobile phone determines a final LUT, reference is made to a current image frame, and reference is further made to a final LUT of a previous image frame. In this way, in the process of changing LUTs, smooth transition of display effects or styles corresponding to different LUTs may be implemented, display effects of a plurality of preview image frames presented by the mobile phone may be optimized, and visual experience of a user in the process of photographing or visual recording is improved.

Figure 9A:
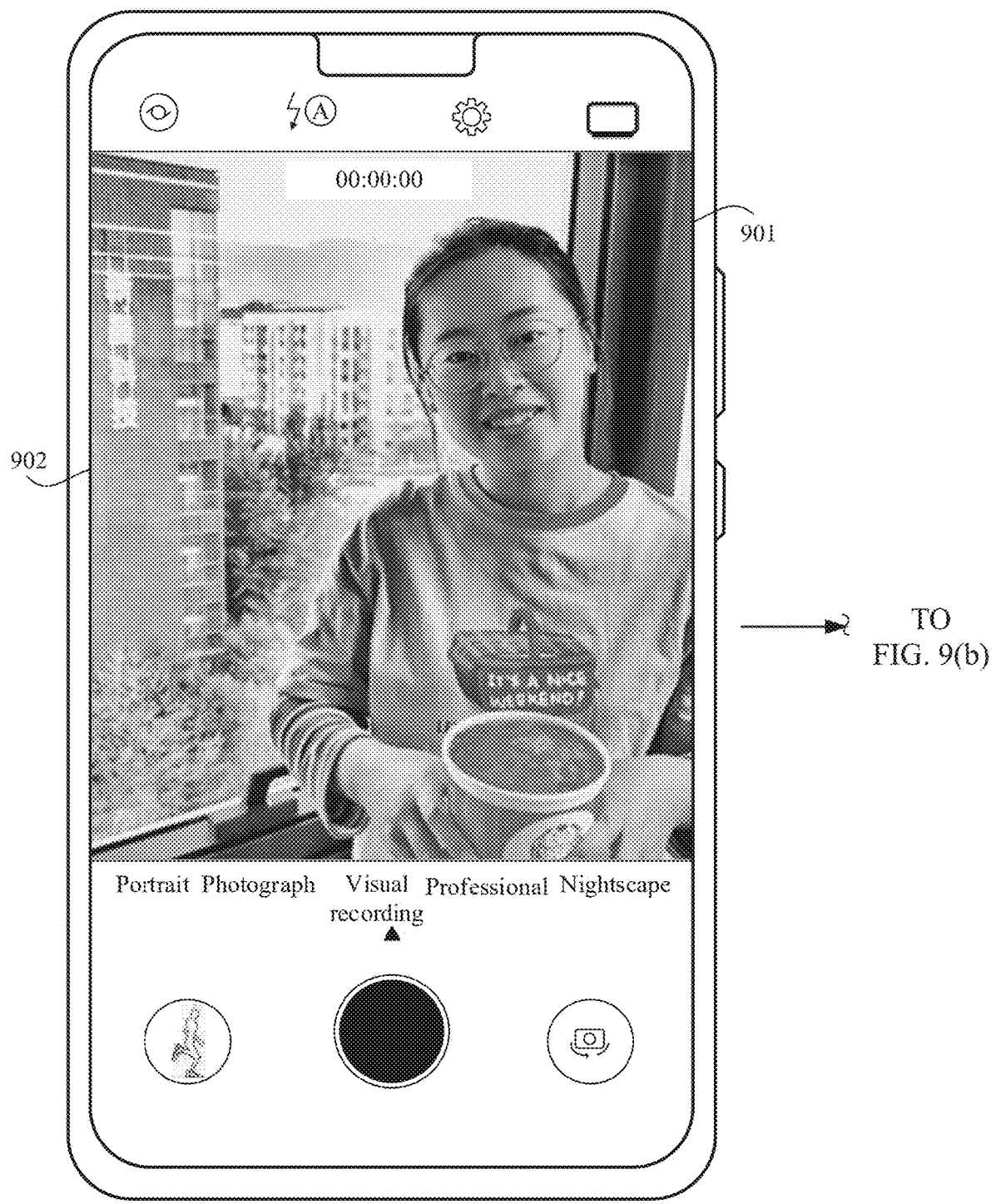
FIG. 9(a) and FIG. 9(b) are a schematic diagram of a framing interface for visual recording by another mobile phone according to an embodiment of this application.
Figure 9B:
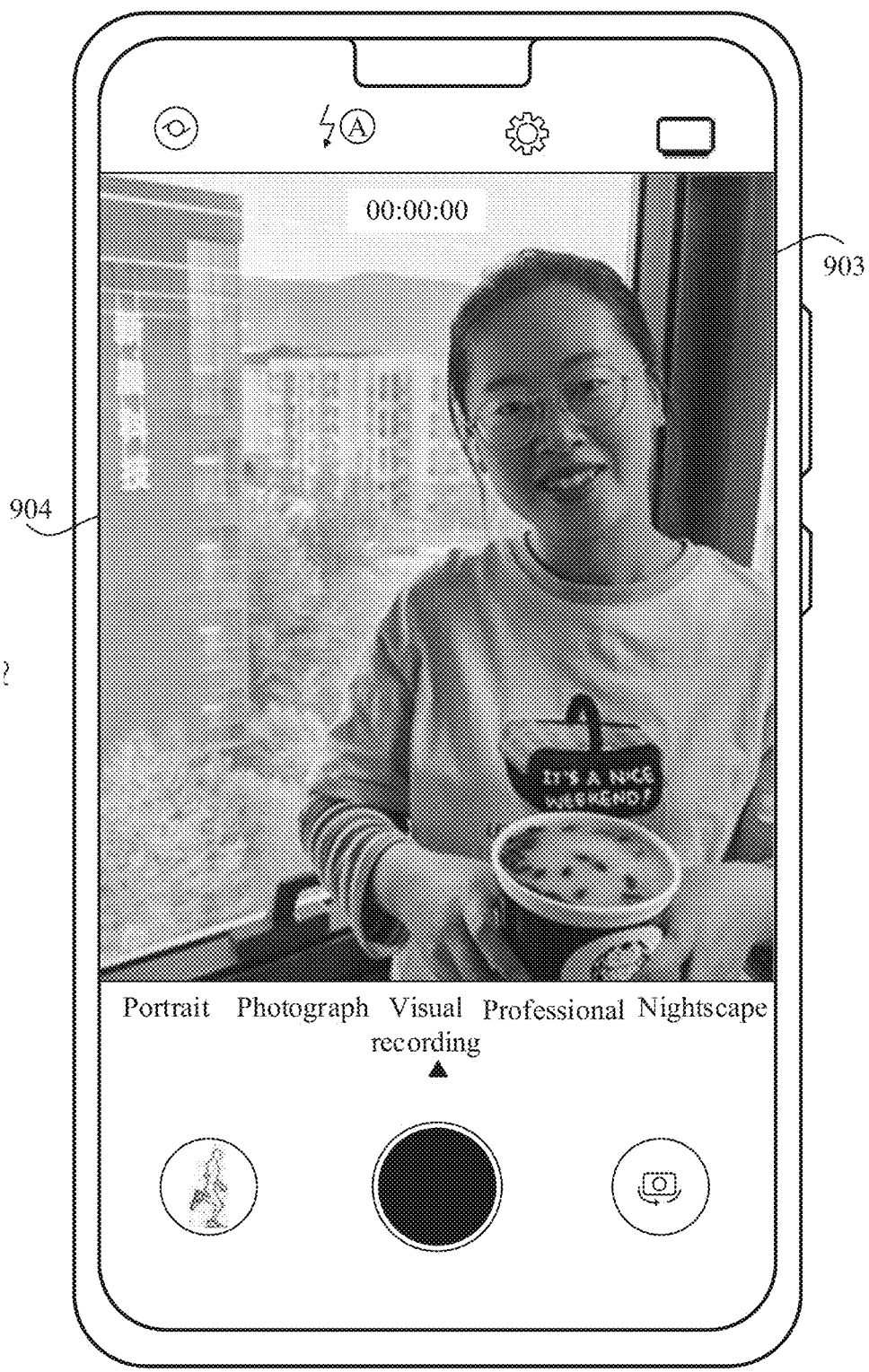

It should be noted that, images captured by the camera may include images of more than one shooting scenario, and may include images of a plurality of shooting scenarios (referred to as complex shooting scenarios). For example, as shown in FIG. 9(a), the preview image 902 includes a portrait image, a food image, and an architecture image. In this case, if the mobile phone performs the method shown in S503, only a third LUT corresponding to the first scenario of the first image can be used as the first LUT; or only a third LUT corresponding to the first scenario of the first image can be used as the fourth LUT to determine the first LUT. That is, in the foregoing complex shooting scenarios, the method shown in S503 is used, and for the first LUT, reference is made to only a third LUT corresponding to the first scenario of the first image, but no reference is made to a third LUT corresponding to shooting scenarios other than the first scenario among the complex shooting scenarios. This may affect the display effect of the mobile phone.

Figure 11A:
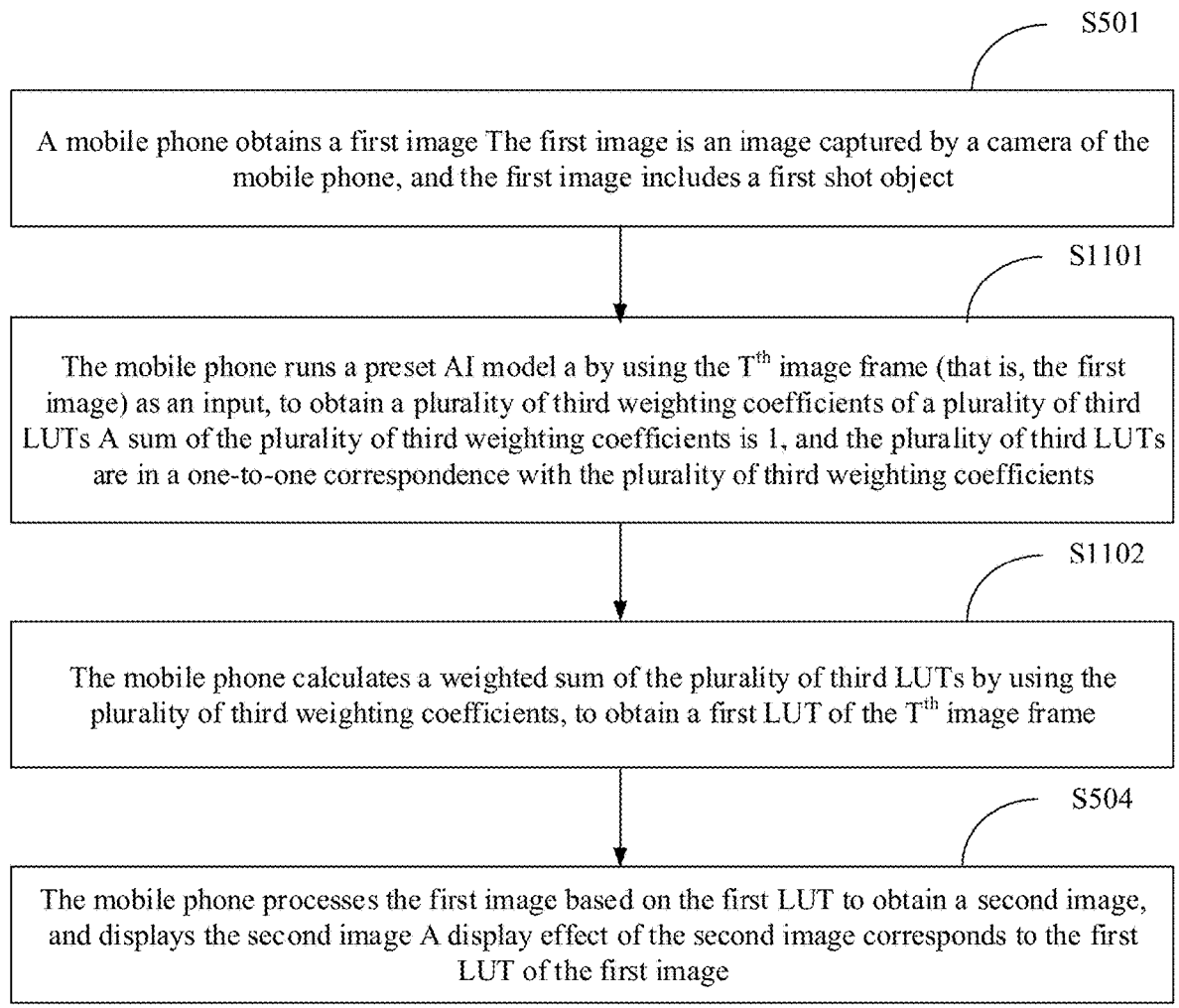
FIG. 11A is a flowchart of another image processing method according to an embodiment of this application.

Based on this, in some other embodiments, the mobile phone may run a preset AI model by using the $T^{th}$ image frame (that is, the first image) as an input of the preset AI model (such as the preset AI model a), to obtain weights of the foregoing plurality of third LUTs. Then, the mobile phone may calculate a weighted sum of the plurality of third LUTs to obtain the first LUT. Specifically, as shown in FIG. 11A, S502 and S503 may be replaced with S1101 and S1102.

S1101: The mobile phone runs a preset AI model a by using the $T^{th}$ image frame (that is, the first image) as an input, to obtain a plurality of third weighting coefficients of a plurality of third LUTs. A sum of the plurality of third weighting coefficients is 1, and the plurality of third LUTs are in a one-to-one correspondence with the plurality of third weighting coefficients.

The foregoing preset AI model a may be a neural network model for LUT weight learning. For example, the preset AI model a may be any one of the following neural network models: VGG-net, Resnet, and Lenet. In this embodiment of this application, a training process of the preset AI model a may include Sa and Sb.

Sa: The mobile phone obtains a plurality of groups of data pairs, where each group of data pairs includes a sixth image and a seventh image, and the sixth image is an image that is obtained by processing the seventh image and that meets a preset condition.

The preset condition may be: A display effect after processing (also referred to as a display effect) meets a preset standard display effect. That is, the foregoing sixth image is equivalent to a standard image, and the seventh image is an unprocessed original image. The foregoing sixth image may be obtained by implementing photo shop (PS) on the seventh image. It should be noted that the foregoing plurality of groups of data pairs may include a data pairs in a plurality of different shooting scenarios.

Sb: The mobile phone trains the preset AI model a by using the seventh image and the sixth image as input samples, so that the preset AI model a is capable of determining a weight that is used to obtain a weighted sum of the plurality of third LUTs, so as to obtain an LUT that is used to process the seventh image to obtain a display effect of the sixth image.

For example, after the mobile phone inputs the seventh image and the sixth image into the preset AI model a as input samples, the preset AI model a may repeatedly perform the following operation (1) and operation (2) until an eighth image obtained by processing the seventh image by the preset AI model a achieves the display effect of the sixth image, which indicates that the preset AI model a has the foregoing capability.

Operation (1): With the seventh image used as an input (Input), the preset AI model a uses weights of a plurality of third LUTs to process the seventh image (Input) to obtain the eighth image (Output). When the preset AI model a processes the seventh image (input) for the first time to obtain the eighth image (Output), the weight used is a default weight. The default weight includes a plurality of default weighting coefficients. The plurality of default weighting coefficients are in a one-to-one correspondence with the plurality of third LUTs. The plurality of default weighting coefficients are pre-configured in the mobile phone.

Operation (2): The preset AI model a uses gradient descent to compare the eighth image (Output) with the sixth image (that is, the standard image), and updates the weights in operation (1).

It should be noted that when the preset AI model a is trained, the foregoing plurality of default weighting coefficients may all be the same. As the training progresses, the preset AI model a gradually adjusts the weights of the plurality of third LUTs, and learns a capability of determining a weight that is used to obtain a weighted sum of the plurality of third LUTs, so as to obtain an LUT that is used to process the second image to obtain a display effect of the first image.

SI 102: The mobile phone calculates a weighted sum of the plurality of third LUTs by using the plurality of third weighting coefficients, to obtain a first LUT of the $T^{th}$ image frame.

For example, in this embodiment of this application, based on an example in which the $T^{th}$ image frame (that is, the first image) is the first image 902 shown in FIG. 9(a), the method in which the mobile phone performs S1101 and S1102 to determine a first LUT of the $T^{th}$ image frame, as well as the method in which the mobile phone performs S504 to obtain a second image, is described with reference to FIG. 11B.

Figure 11B:
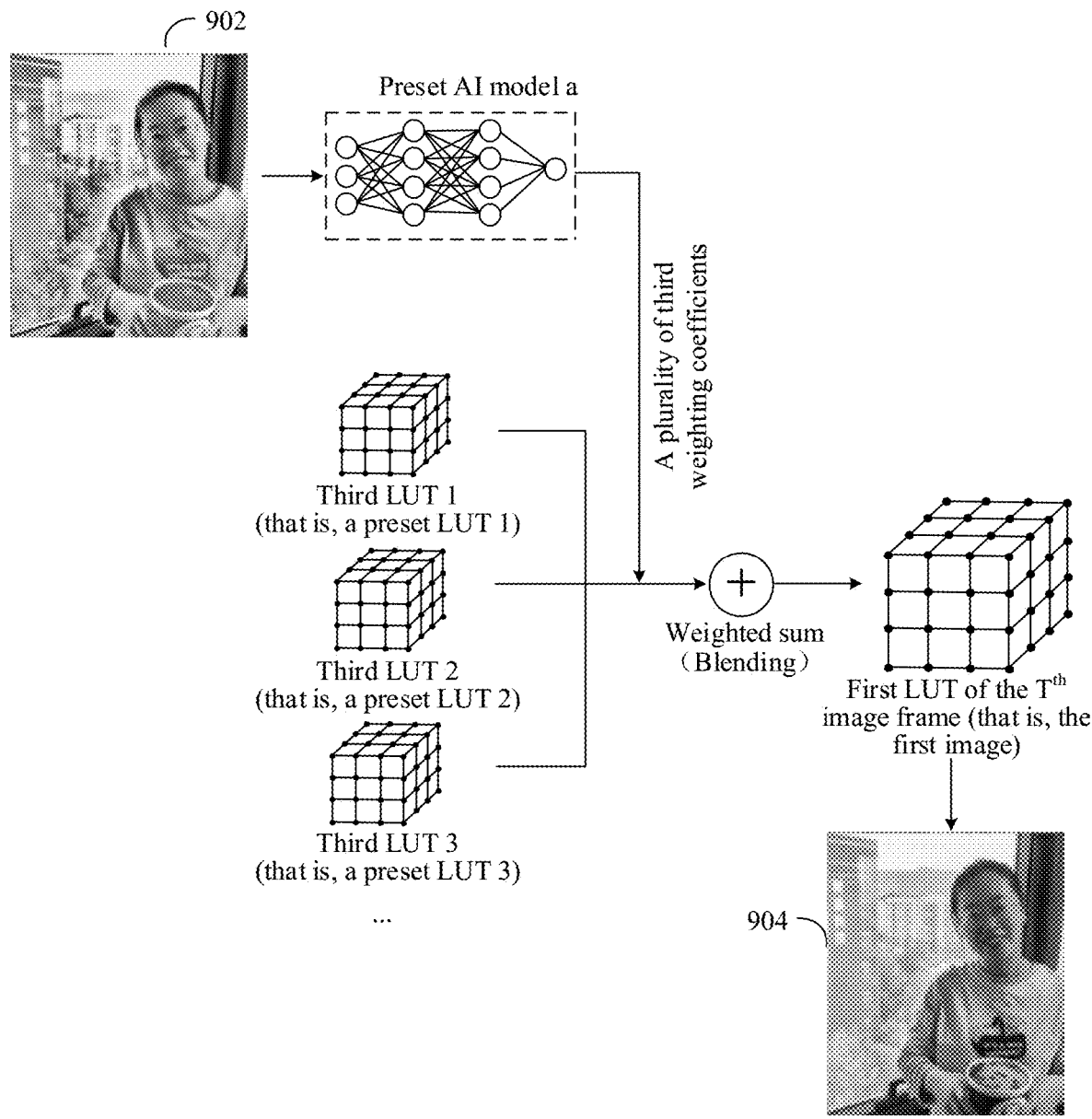
FIG. 11B is a schematic diagram of another principle of determining a final LUT (that is, a first LUT) of a $T^{th}$ image frame according to an embodiment of this application.

The mobile phone may execute S1101 first, and run a preset AI model a shown in FIG. 11B by using the first image 902 as an input, to obtain a plurality of third weighting coefficients shown in FIG. 11B. A sum of the plurality of third weighting coefficients is 1, and the plurality of third LUTs are in a one-to-one correspondence with the plurality of third weighting coefficients. For example, it is assumed that the preset AI model a shown in FIG. 11B outputs M third weighting coefficients. $M \geq 2$, and M is an integer. It is assumed that among the M third weighting coefficients, a third weighting coefficient corresponding to a third LUT 1 (that is, a preset LUT 1) is $K_{(T,\ 1)}$, a third weighting coefficient corresponding to a third LUT 2 (that is, a preset LUT 2) is $K_{(T,\ 2)}$, a third weighting coefficient corresponding to a third LUT 3 (that is, a preset LUT 3) is $K_{(T,\ 3)}$, and a third weighting coefficient corresponding to a third LUT M (that is, a preset LUT M) is $K_{(T,\ M)}$.

Then, the mobile phone may perform S1102, that is, calculate a weighted sum of the M third LUTs based on the following formula (4) by using the foregoing plurality of third weighting coefficients, to obtain a first LUT of the $T^{th}$ image frame. In this embodiment of this application, a first LUT of the $T^{th}$ image frame may be denoted as $Q_{(T,\ m,\ 3)}$, and a third LUT m may be denoted as $Q_{(T,\ m,\ 1)}$.

$$Q_{(T,2)} = \sum_{m=1}^{M} [K_{(T,m)} \times Q_{(T,m,1)}].$$

Formula (4)

Then, the mobile phone may perform S504, that is, perform image processing on the first image 902 by using the first LUT of the $T^{th}$ image frame shown in FIG. 11B to obtain the second image 904 shown in FIG. 11B.

In this embodiment, when the mobile phone determines a first LUT of the $T^{th}$ image frame in a complex shooting scenario, reference is made to a third LUT corresponding to the first scenario of the first image, and reference is further made to third LUTs corresponding to shooting scenarios other than the first scenario among a plurality of third LUTs. In this way, display effects of the mobile phone may be improved.

In some other embodiments, when the mobile phone determines a final LUT, reference is made to a current image frame (that is, the first image), and reference is further made to a final LUT of the previous image frame of the first image. In this way, in the process of changing LUTs, smooth transition of display effects or styles corresponding to different LUTs may be implemented, display effects of a plurality of preview image frames presented by the electronic device may be optimized, and visual experience of a user in the process of photographing or visual recording is improved.

Figure 11C:
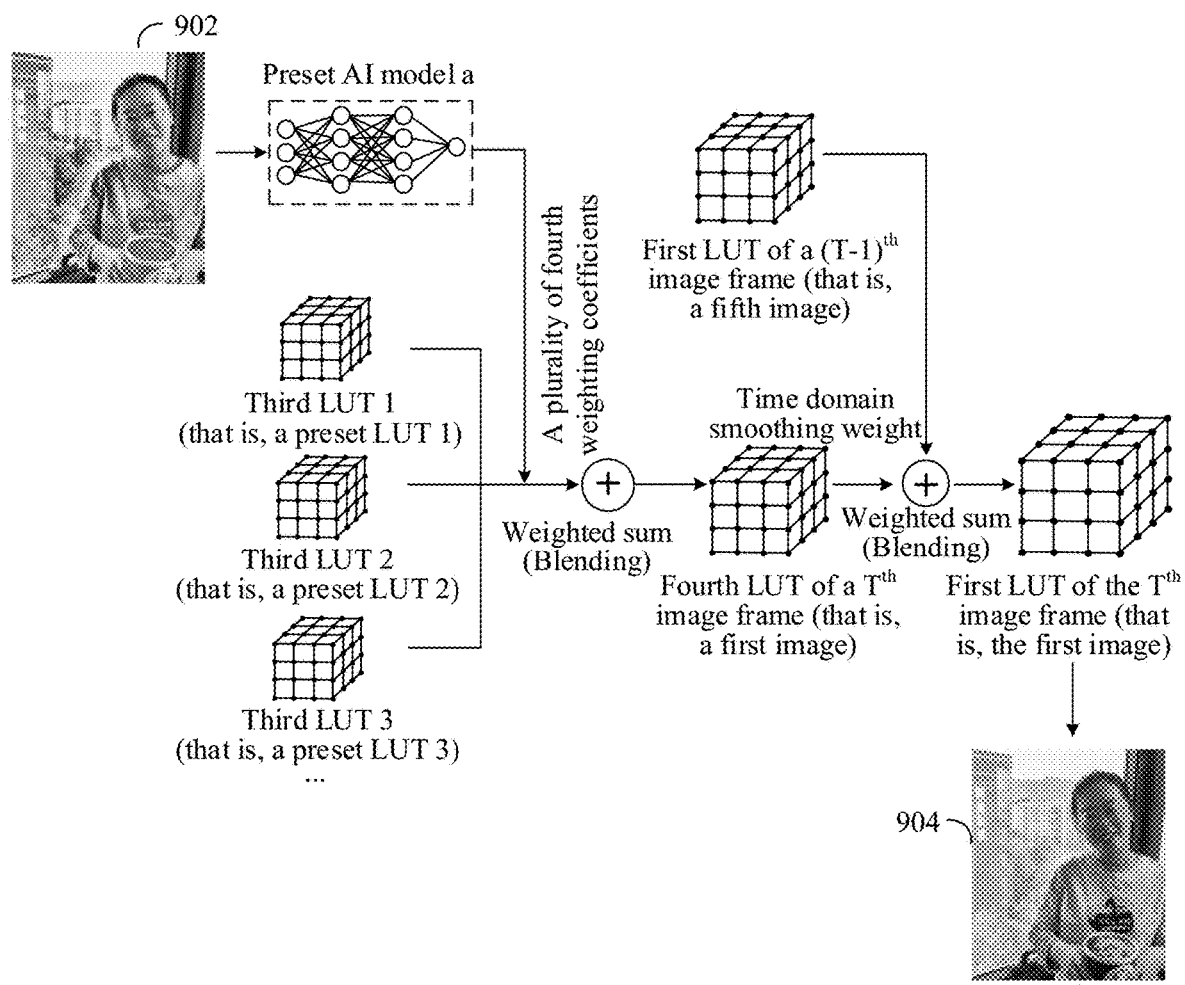
FIG. 11C is a schematic diagram of another principle of determining a final LUT (that is, a first LUT) of a T image frame according to an embodiment of this application.

Specifically, S1102 may include: The mobile phone calculates a weighted sum of the plurality of third LUTs by using a plurality of third weighting coefficients, to obtain a fourth LUT of the $T^{th}$ image frame; and the mobile phone calculates a weighted sum of the fourth LUT of the $T^{th}$ image frame (that is, the first image) and the first LUT of the $(T-1)^{th}$ image frame (that is, the fifth image), to obtain the first LUT of the $T^{th}$ image frame. FIG. 11C shows a method in which the mobile phone performs S1101 and S1102 to determine the first LUT of the $T^{th}$ image frame in this embodiment, as well as a schematic diagram of a principle of a method in which the mobile phone performs S504 to obtain the second image.

Figure 12A:
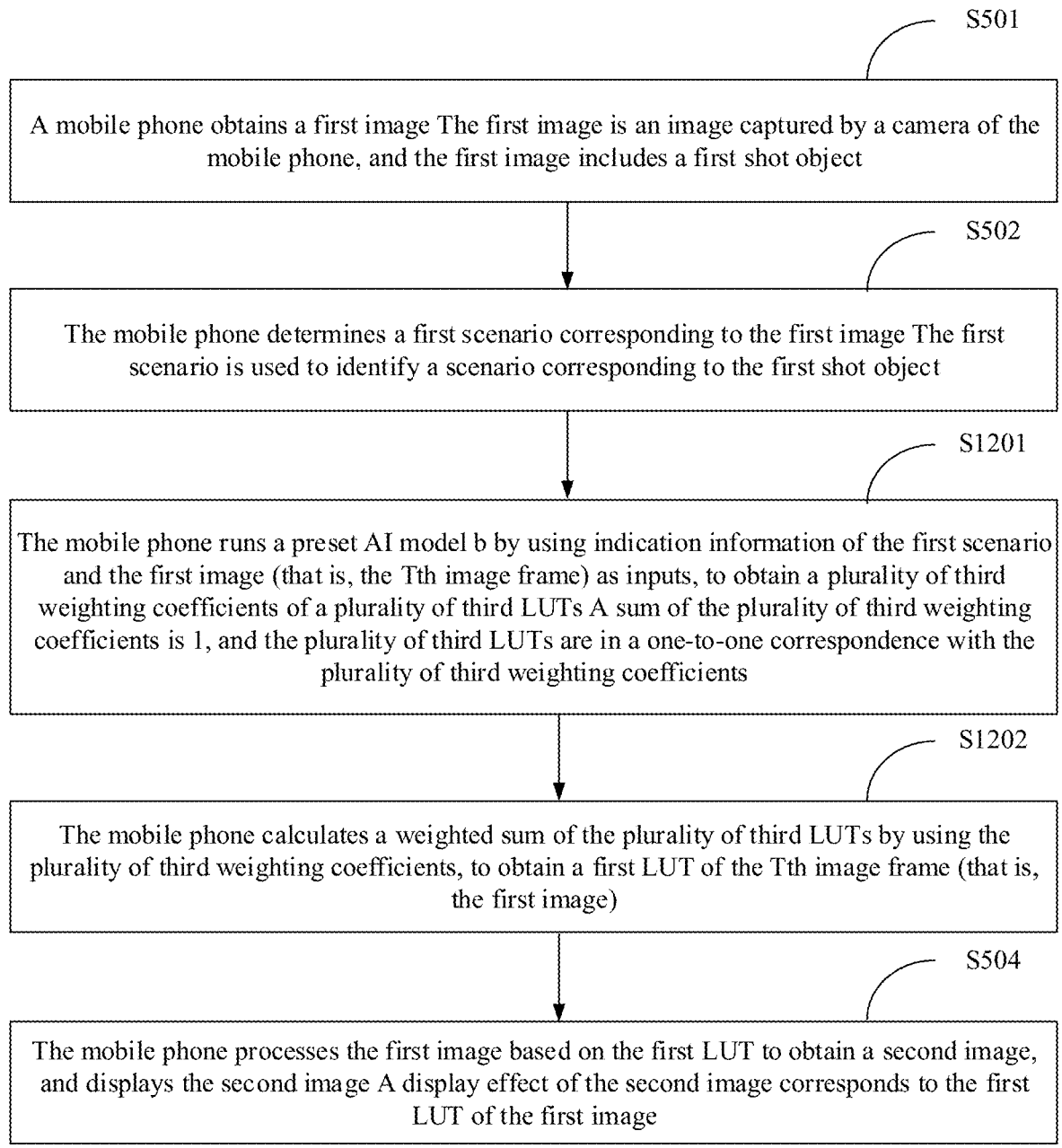
FIG. 12A is a flowchart of another image processing method according to an embodiment of this application.

In some other embodiments, the mobile phone may run an AI model by using the $T^{th}$ image frame (that is, the first image) and a scenario detection result of the first image as inputs of the AI model (such as a preset AI model b), to obtain weights of the foregoing plurality of third LUTs. Then, the mobile phone may calculate a weighted sum of the plurality of third LUTs to obtain the first LUT. Specifically, as shown in FIG. 12A, S503 may be replaced with S1201-S1202.

S1201: The mobile phone runs a preset AI model b by using indication information of the first scenario and the first image (that is, the $T^{th}$ image frame) as inputs, to obtain a plurality of third weighting coefficients of a plurality of third LUTs. A sum of the plurality of third weighting coefficients is 1, and the plurality of third LUTs are in a one-to-one correspondence with the plurality of third weighting coefficients.

The foregoing preset AI model b may be a neural network model for LUT weight learning. For example, the preset AI model b may be any one of the following neural network models: VGG-net, Resnet, and Lenet. In this embodiment of this application, a training process of the preset AI model b may include Si, Sii, and Siii.

Si: The mobile phone obtains a plurality of groups of data pairs, where each group of data pairs includes a sixth image and a seventh image, and the sixth image is an image that is obtained by processing the seventh image and that meets a preset condition.

Si is the same as Sa. Details are not described herein again in this embodiment of this application.

Sii: The electronic device recognizes the seventh image, and determines a third scenario corresponding to the second image.

For the method in which the electronic device recognizes the seventh image and determines a third scenario corresponding to the seventh image, reference may be made to the method in which the mobile phone recognizes the first scenario corresponding to the first image. Details are not described herein again in this embodiment of this application.

Siii: The mobile phone trains the preset AI model b by using the seventh image, the sixth image, and indication information for recognizing the third scenario as input samples, so that the preset AI model b is capable of determining a weight that is used to obtain a weighted sum of the plurality of third LUTs, so as to obtain an LUT that is used to process the seventh image to obtain a display effect of the sixth image.

It should be noted that the preset AI model b differs from the foregoing preset AI model a in that the indication information of the third scenario corresponding to the seventh image is added as an input sample. A training principle of the preset AI model b is the same as the training principle of the foregoing preset AI model a. The difference is that the indication information of the third scenario corresponding to the seventh image may more clearly indicate a shooting scenario corresponding to the seventh image.

It should be understood that if it is recognized that the shooting scenario of the seventh image is the third scenario, it indicates that the seventh image is more likely to be an image of the third scenario. Then, setting a weighting coefficient of a third LUT corresponding to a second shot object to a larger value improves display effects. It may be learned that the indication information of the third scenario may play a guiding role in the training of the preset AI model b, and guide the training of the preset AI model b in a direction close to the third scenario. In this way, convergence of the preset AI model b may be accelerated, to reduce training times of the preset AI model b.

S1202: The mobile phone calculates a weighted sum of the plurality of third LUTs by using the plurality of third weighting coefficients, to obtain a first LUT of the $T^{th}$ image frame (that is, the first image).

For example, in this embodiment of this application, based on an example in which the $T^{th}$ image frame (that is, the first image) is the first image 902 shown in FIG. 9(a), the method in which the mobile phone performs S1201 and S1202 to determine a first LUT of the $T^{th}$ image frame, as well as the method in which the mobile phone performs S504 to obtain a second image, is described with reference to FIG. 12B.

Figure 12B:
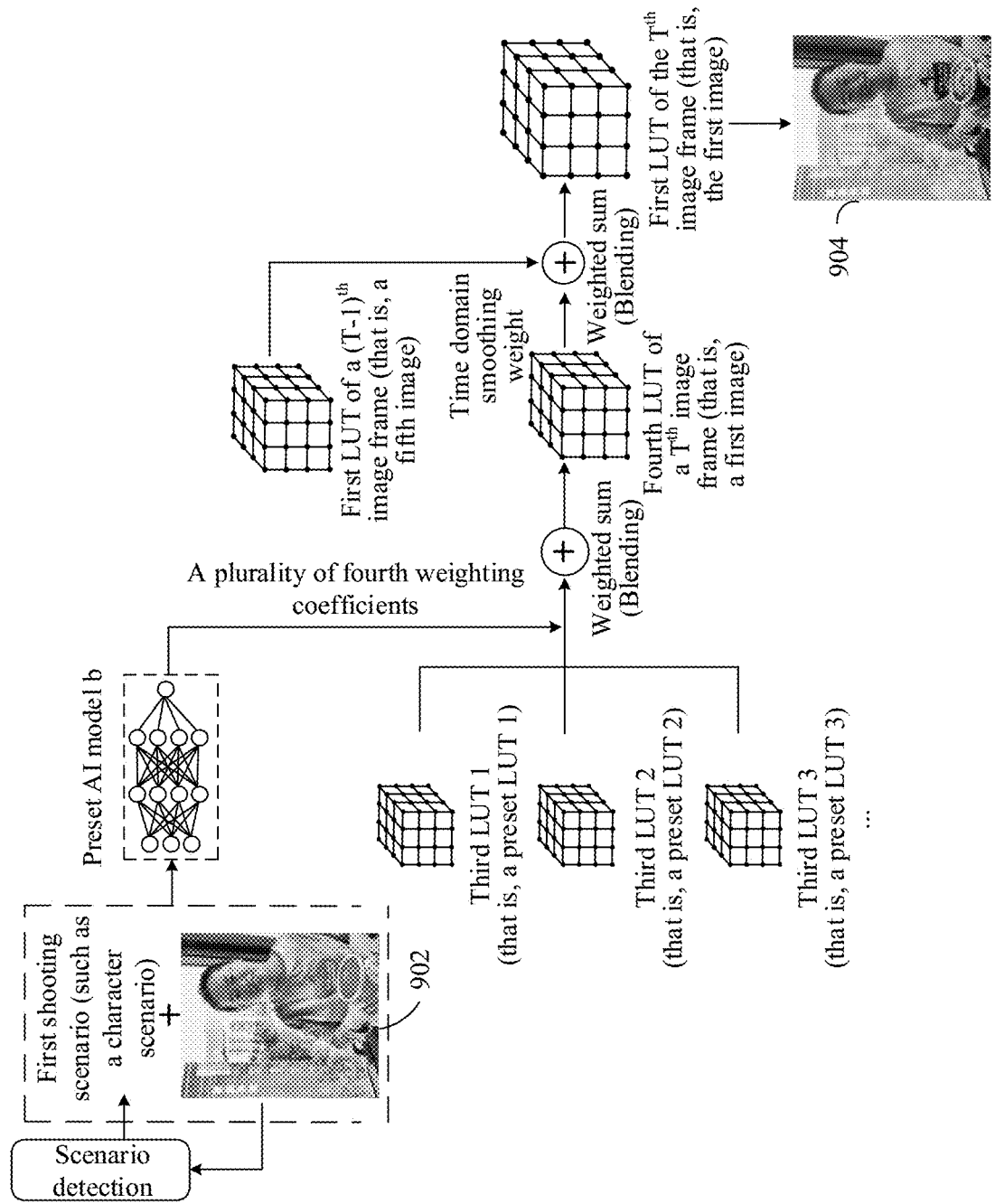
FIG. 12B is a schematic diagram of another principle of determining a final LUT (that is, a first LUT) of a $T^{th}$ image frame according to an embodiment of this application.

First, the mobile phone may perform S502, that is, perform scenario detection on the $T^{th}$ image frame (that is, the first image) 902 to obtain the first scenario corresponding to the first image 902 shown in FIG. 12B.

Then, the mobile phone may perform S1201, that is, run a preset AI model b shown in FIG. 12B by using the first image 902 and indication information of the first scenario as an input, to obtain a plurality of third weighting coefficients shown in FIG. 12B. A sum of the plurality of third weighting coefficients is 1, and the plurality of third LUTs are in a one-to-one correspondence with the plurality of third weighting coefficients. For example, it is assumed that the preset AI model b shown in FIG. 12B outputs M third weighting coefficients. M≥2, and M is an integer. The mobile phone may perform S1202, that is, calculate a weighted sum of the M third LUTs by using the plurality of third weighting coefficients, to obtain a first LUT of the $T^{th}$ image frame. Then, the mobile phone may perform S505, that is, perform image processing on the first image 902 by using the first LUT of the $T^{th}$ frame shown in FIG. 12B to obtain the second image 904 shown in FIG. 12B.

In this embodiment, when the mobile phone determines a first LUT of the $T^{th}$ image frame in a complex shooting scenario, reference is made to a third LUT corresponding to the first scenario of the first image, and reference is further made to third LUTs corresponding to shooting scenarios other than the first scenario among a plurality of third LUTs. In addition, when the mobile phone determines a plurality of third weighting coefficients, reference is further made to the first image. In this way, display effects of the mobile phone may be improved.

In some other embodiments, when the mobile phone determines a final LUT, reference may be made to a current image frame (that is, the first image), and reference is further made to a final LUT of the previous image frame of the first image. In this way, in the process of changing LUTs, smooth transition of display effects or styles corresponding to different LUTs may be implemented, display effects of a plurality of preview image frames presented by the electronic device may be optimized, and visual experience of a user in the process of photographing or visual recording is improved.

Figure 12C:
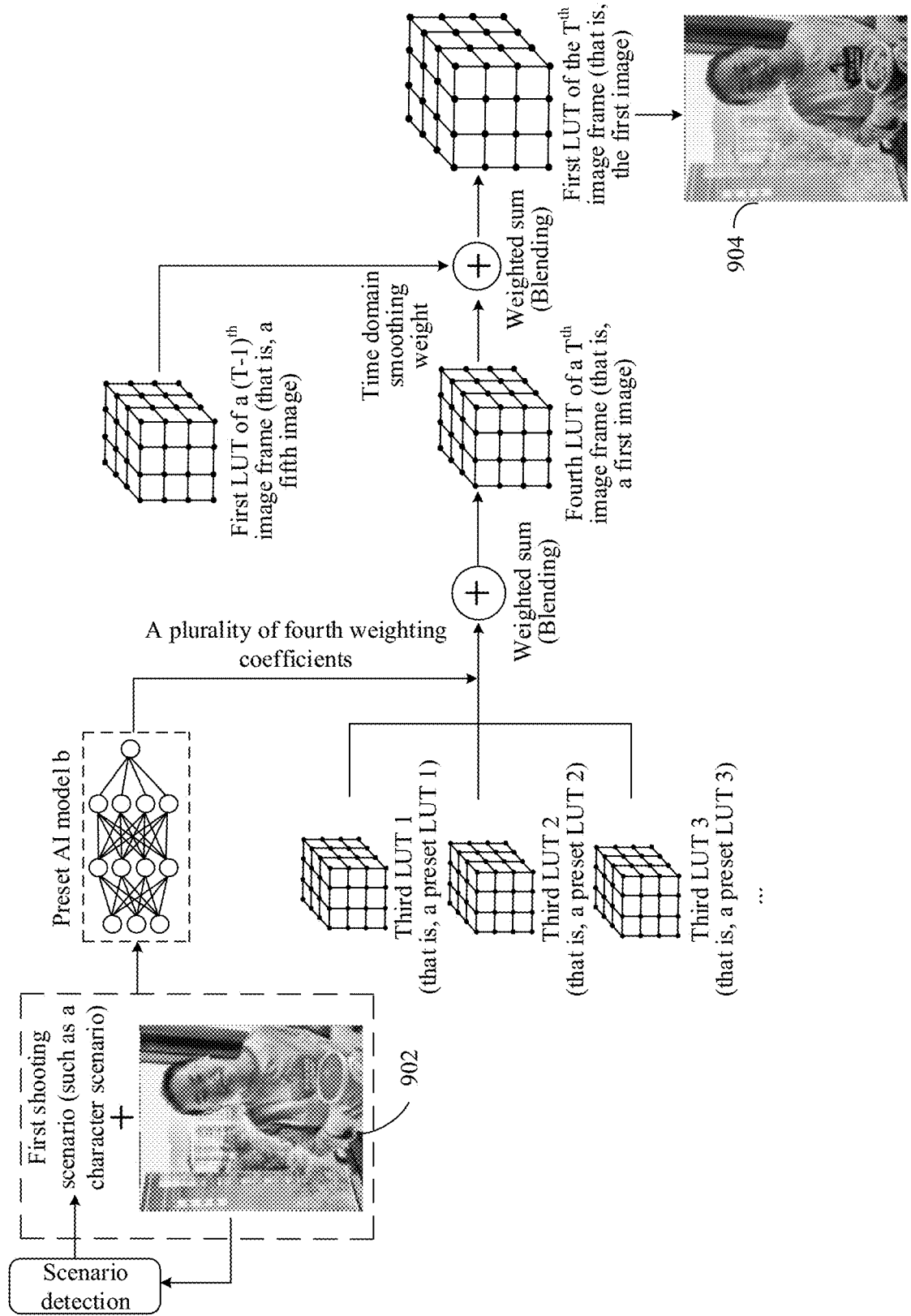
FIG. 12C is a schematic diagram of another principle of determining a final LUT (that is, a first LUT) of a $T^{th}$ image frame according to an embodiment of this application.

Specifically, S1203 may include: The mobile phone calculates a weighted sum of the plurality of third LUTs by using a plurality of third weighting coefficients, to obtain a fourth LUT of the $T^{th}$ image frame; and the mobile phone calculates a weighted sum of the fourth LUT of the $T^{th}$ image frame (that is, the first image) and the first LUT of the $(T-1)^{th}$ image frame (that is, the fifth image), to obtain the first LUT of the $T^{th}$ image frame. FIG. 12C shows a method in which the mobile phone performs S1201 and S1202 to determine the first LUT of the r image frame in this embodiment, as well as a schematic diagram of a principle of a method in which the mobile phone performs S504 to obtain the second image.

Figure 13A:
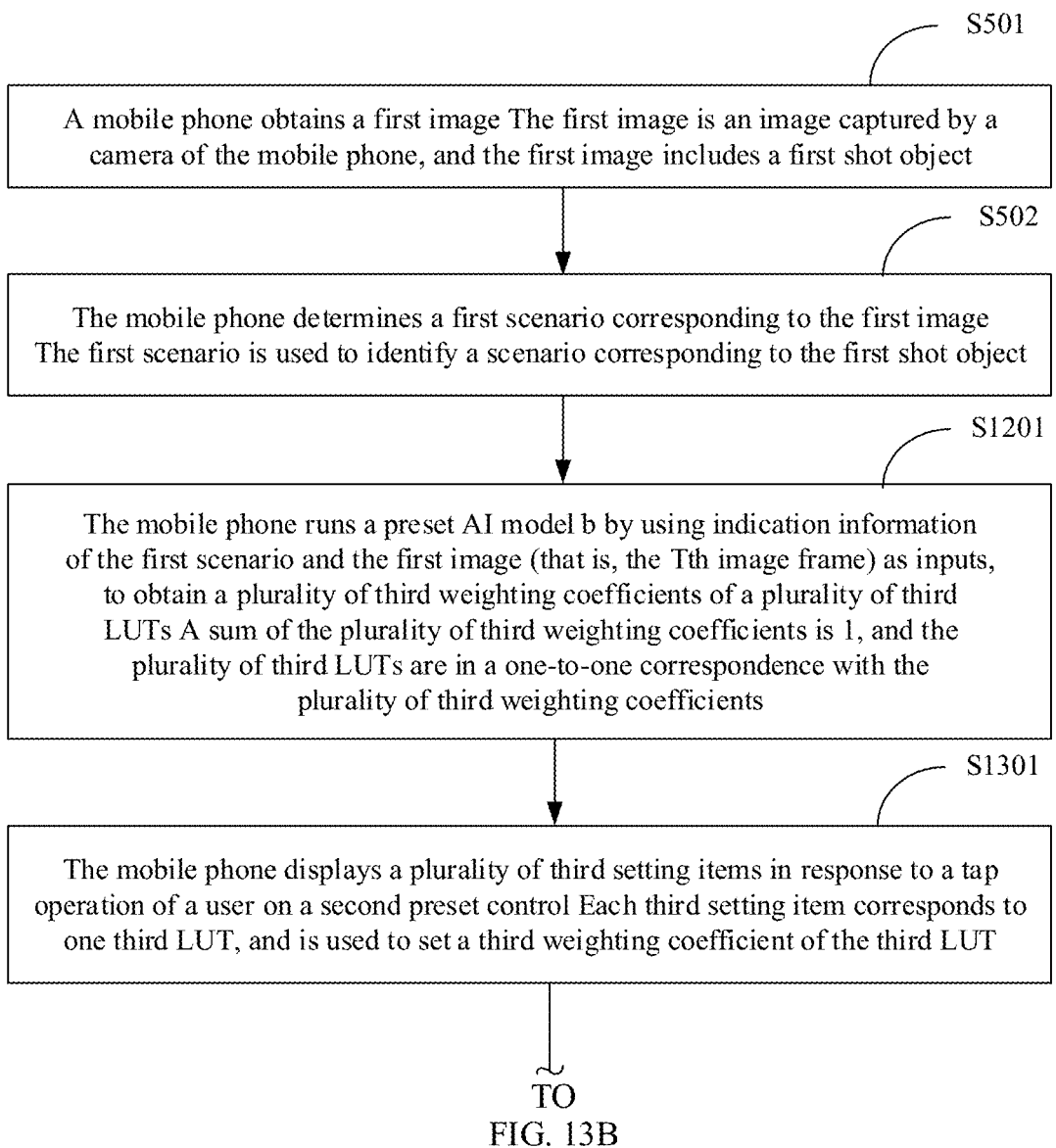
FIG. 13A and FIG. 13B are a flowchart of another image processing method according to an embodiment of this application.
Figure 13B:
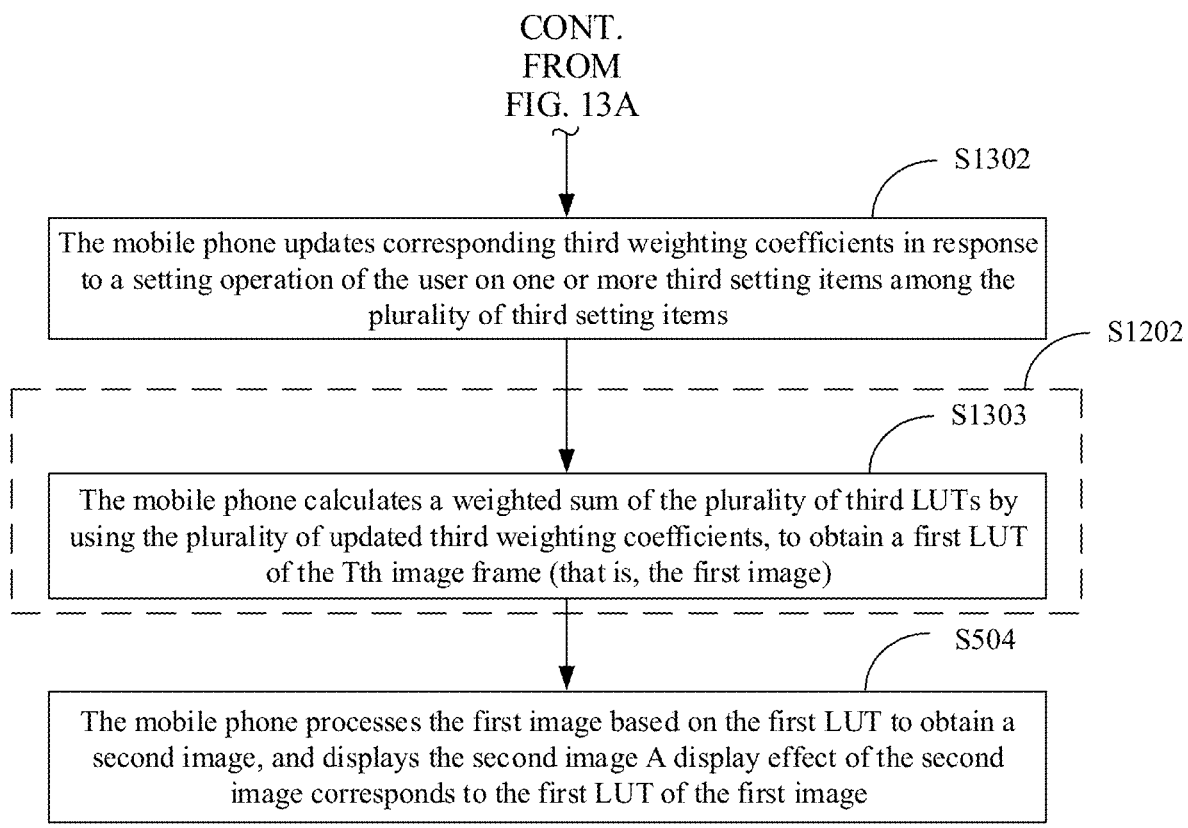

In some other embodiments, the user may adjust at least one third weighting coefficient among a plurality of third weighting coefficients output by the foregoing preset AI model a or preset AI model b. That is, the mobile phone may receive an adjustment operation of the user on the foregoing plurality of third weighting coefficients, and calculate the first LUT of the foregoing $T^{th}$ image frame by using a plurality of third weighting coefficients adjusted by the user. Specifically, before S1102 or S1202, the method according to this embodiment of this application may further include S1301 and S1302. Correspondingly. S1102 or S1202 may be replaced with S1303. For example, as shown in FIG. 13, before S1202, the method according to this embodiment of this application may further include S1301 and S1302. Correspondingly, S1202 may be replaced with S1303.

S1301: The mobile phone displays a plurality of third setting items in response to a tap operation of a user on a second preset control. Each third setting item corresponds to one third LUT, and is used to set a third weighting coefficient of the third LUT.

Specifically, the foregoing preview interface may further include a second preset control. The second preset control is used to trigger the mobile phone to display a plurality of third setting items of the plurality of third weighting coefficients, so that the user may set weights of the foregoing plurality of third LUTs by using the plurality of third setting items.

Figure 14A:
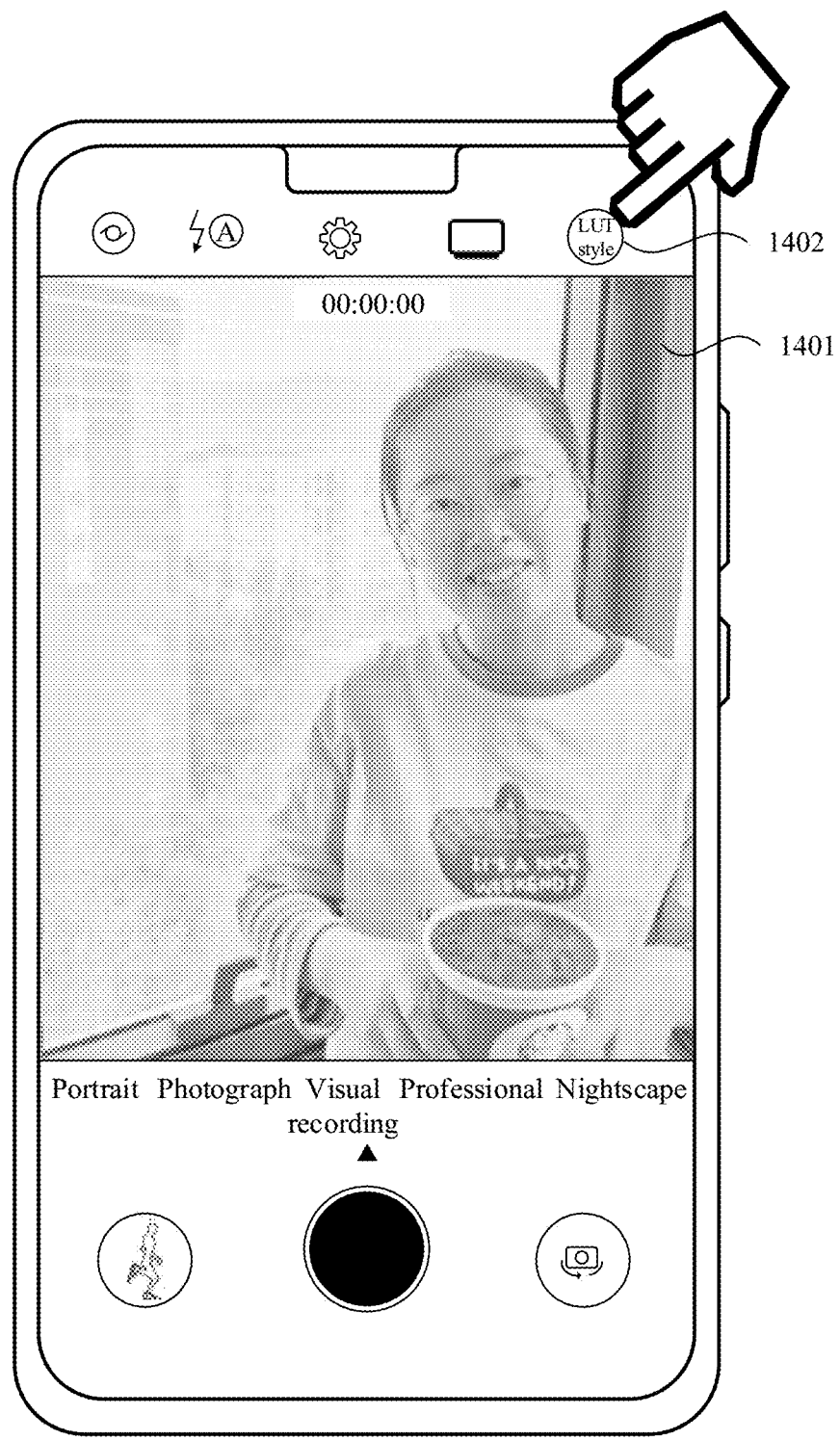
FIG. 14A(a) and FIG. 14A(b) are a schematic diagram of a framing interface for visual recording by another mobile phone according to an embodiment of this application.
Figure 14A:
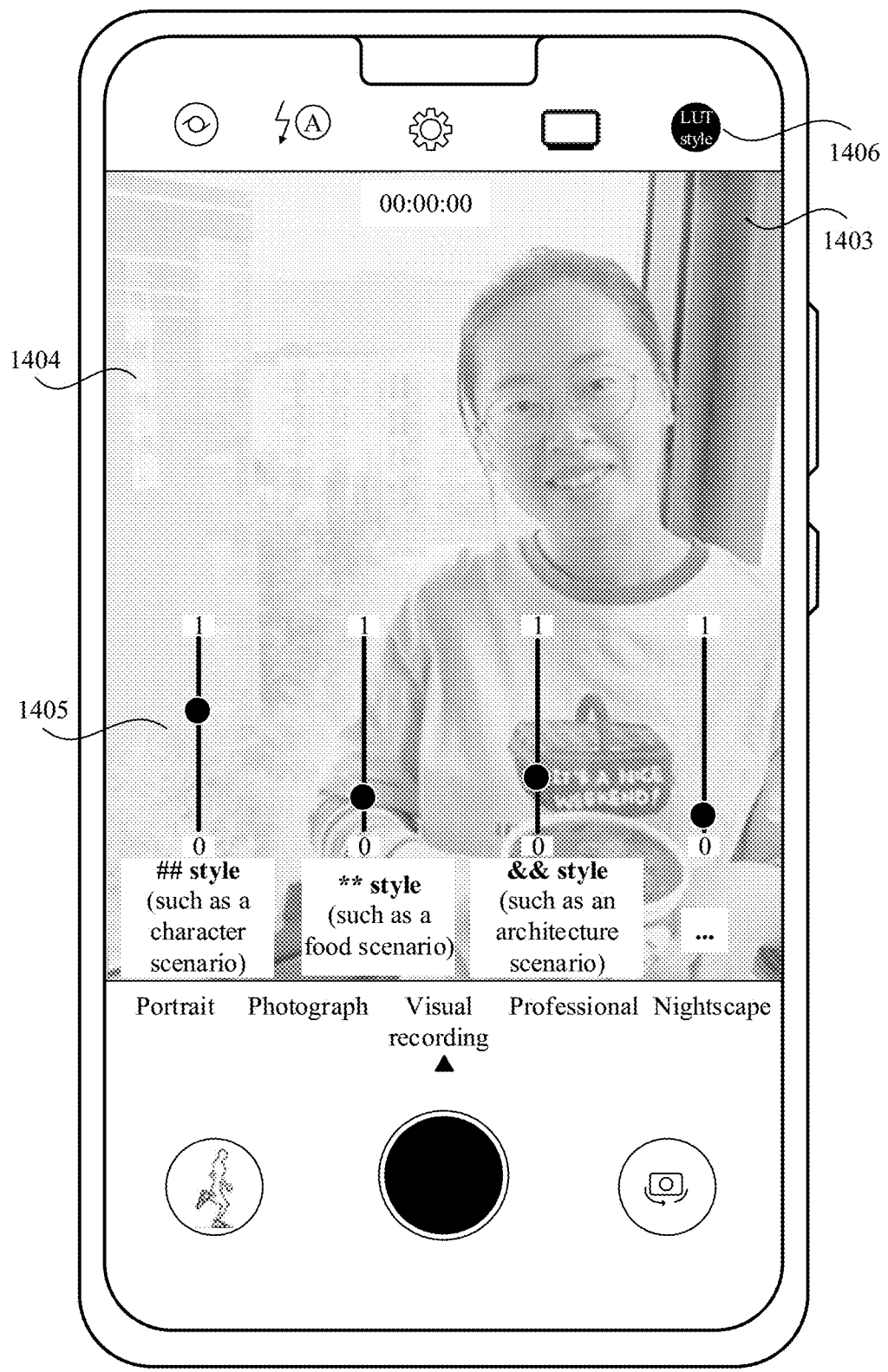

For example, as shown in FIG. 14A(a), a preview interface 1401 includes a second preset control 1402. In response to a tap operation of the user on the second preset control 1402, as shown in FIG. 14A(b), the mobile phone may display a plurality of third setting items 1405 on a preview interface 1403, such as a "##style (such as a portrait scenario)" setting item, a "** style (such as a food scenario)" setting item, and a "&& style (such as an architecture scenario)" setting item. In this embodiment of this application, based on an example in which a third setting item is a scroll bar shown in FIG. 14A(a), the method according to this embodiment of this application is described. It may be learned from the foregoing embodiment that each shooting style and shooting scenario may correspond to one third LUT The mobile phone may set a weight (that is, a weighting coefficient) corresponding to the third LUT by using the foregoing third setting item.

In response to a tap operation of the user on the second preset control 1402, a display state of the second preset control 1402 changes. For example, the mobile phone may display a second preset control 1406 shown in FIG. 14A(b). The display state (such as a display state with black words on a white background) corresponding to the second preset control 1402 is used to indicate that the second preset control is in an off state. The display state (such as a display state with white words on a black background) corresponding to the second preset control 1406 is used to indicate that the second preset control is in an on state. The preview interface 1403 further includes a second image 1404. The display effect of the second image 1404 is: a display effect obtained by using a plurality of third weighting coefficients shown by the third setting items 1405 for weighting and calculation, and processing the first image by using a finally obtained fourth LUT of a $T^{th}$ frame.

In some embodiments, the foregoing preview interface may include the foregoing second preset control, or may not include the foregoing second preset control. In this embodiment, the mobile phone may receive a second preset operation input by the user on the preview interface. S1301 may be replaced with: The mobile phone displays a plurality of third setting item on the preview interface in response to the second preset operation of the user on the preview interface. For example, the second preset operation may be any preset gesture such as an L-shaped gesture, an S-shaped gesture, or a √-shaped gesture input by the user on a display (such as a touchscreen) of the mobile phone. The preset gesture corresponding to the second preset operation is different from the preset gesture corresponding to the first preset operation. For another example, the second preset operation may be a tap operation of the user on a second physical key of the mobile phone. The first physical key may be one physical key or a combination of at least two physical keys in the mobile phone. The second physical key is different from the foregoing first physical key.

S1302: The mobile phone updates corresponding third weighting coefficients in response to a setting operation of the user on one or more third setting items among the plurality of third setting items.

Figure 14B:
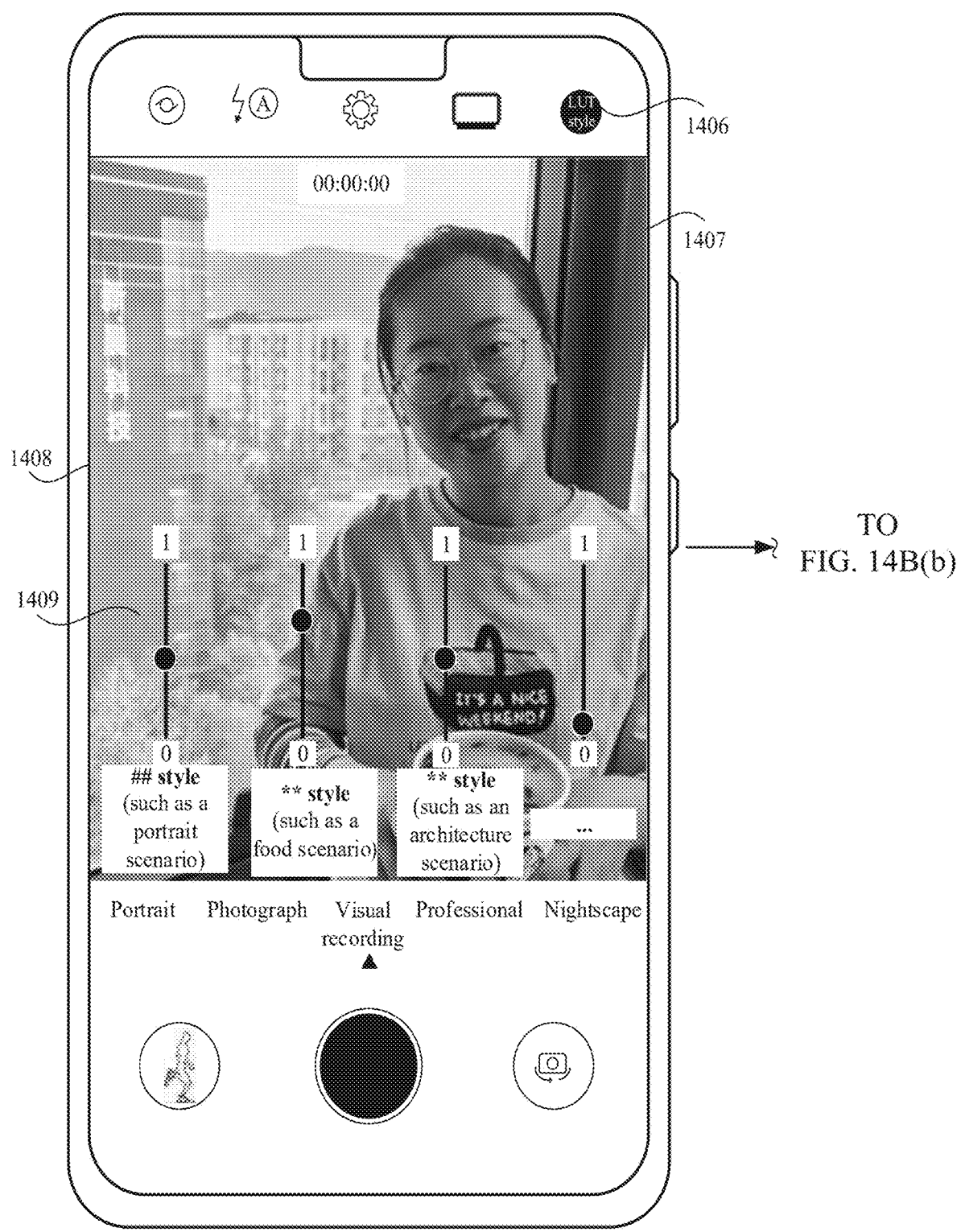
FIG. 14B(a) to FIG. 14B(c) are a schematic diagram of a framing interface for visual recording by another mobile phone according to an embodiment of this application.
Figure 14B:
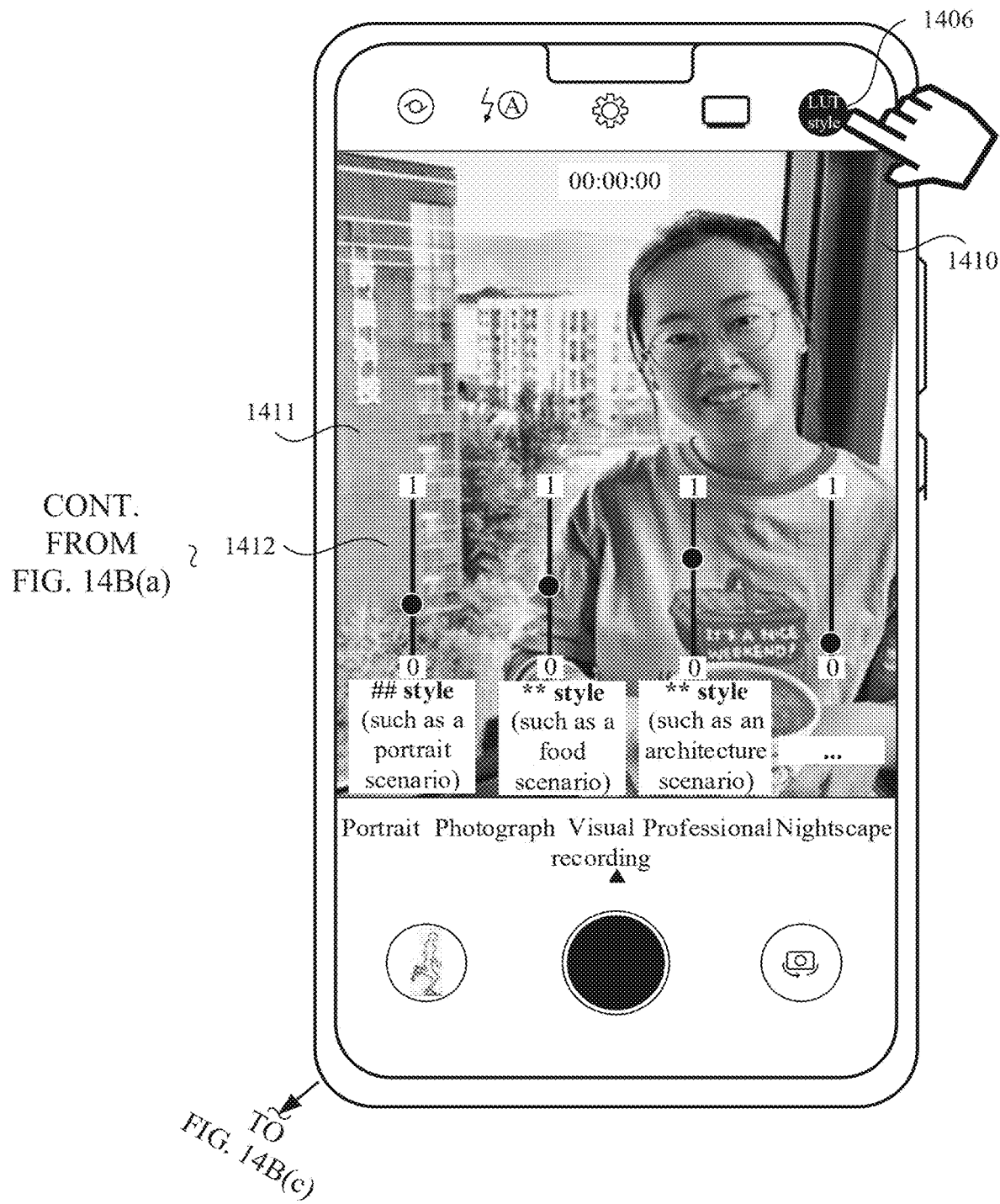
Figure 14B:
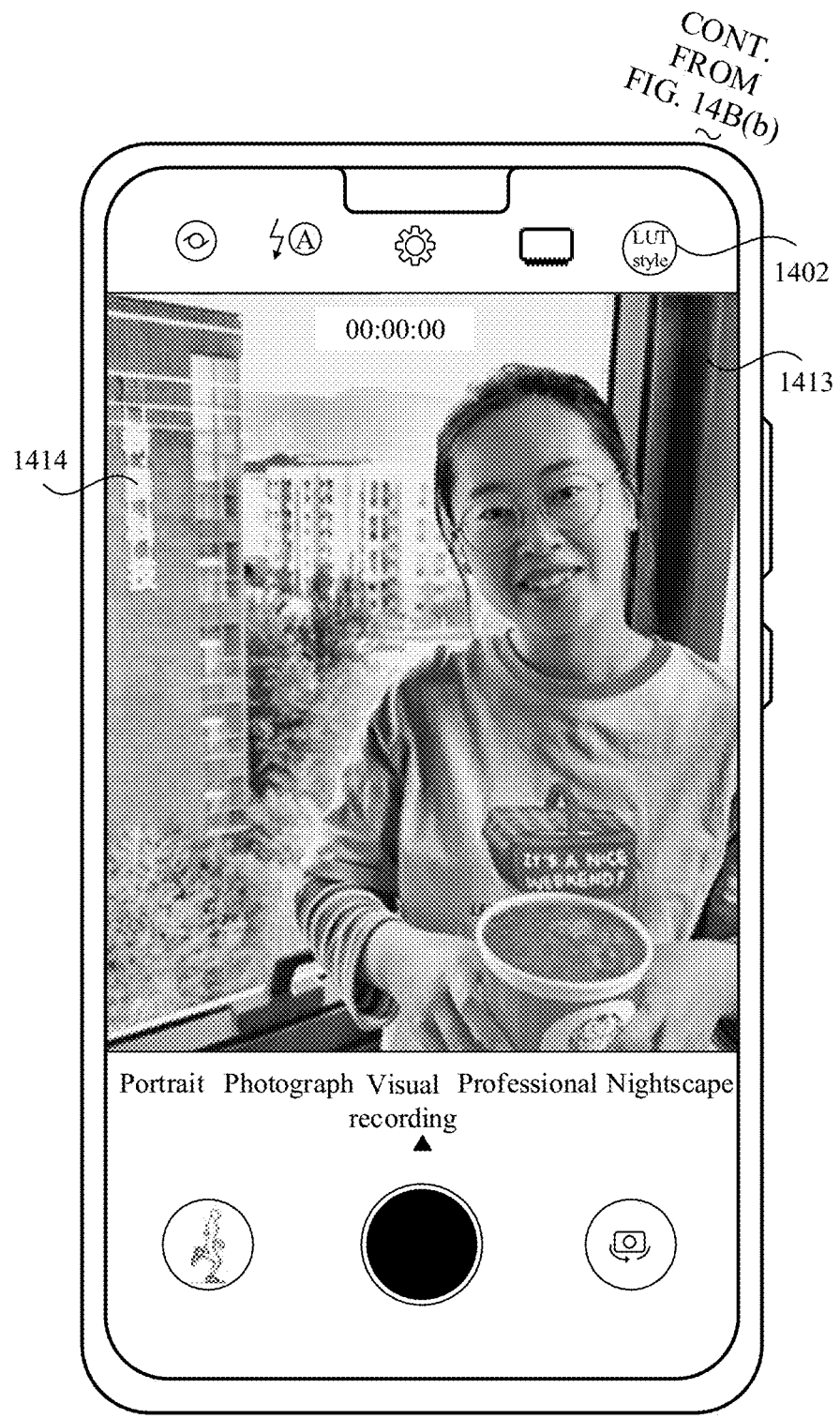

For example, the mobile phone may receive a setting operation of the user on a plurality of third setting items 1405 shown in FIG. 14A(b), and display a preview interface 1407 shown in FIG. 14B(a). The preview interface 1407 includes a plurality of third setting items 1409. A plurality of third weighting coefficients shown by the plurality of third setting items 1409 are different from the plurality of third weighting coefficients shown by the plurality of third setting items 1405. That is, in response to a setting operation of the user on the plurality of third setting items 1405, the mobile phone updates the plurality of third weighting coefficients shown by the plurality of third setting items 1405 to the third weighting coefficients shown by the plurality of third setting items 1409.

The preview interface 1407 further includes a second image 1408. The display effect of the second image 1408 is: a display effect obtained by using a plurality of third weighting coefficients shown by the third setting items 1409 for weighting and calculation, and processing the first image by using a finally obtained first LUT of a $T^{th}$ frame. By comparing FIG. 14B(a) with FIG. 14A(b), it may be learned that the display effect of the second image 1408 is different from the display effect of the second image 1404.

For another example, the mobile phone may receive a setting operation of the user on a plurality of third setting items 1409 shown in FIG. 14B(a), and display a preview interface 1410 shown in FIG. 14B(b). The preview interface 1410 includes a plurality of third setting items 1412. A plurality of third weighting coefficients shown by the plurality of third setting items 1412 are different from the plurality of third weighting coefficients shown by the plurality of third setting items 1409. That is, in response to a setting operation of the user on the plurality of third setting items 1409, the mobile phone updates the plurality of third weighting coefficients shown by the plurality of third setting items 1409 to the third weighting coefficients shown by the plurality of third setting items 1412.

The preview interface 1410 further includes a second image 1411. The display effect of the second image 1411 is; a display effect obtained by using a plurality of third weighting coefficients shown by the third setting items 1412 for weighting and calculation, and processing the first image by using a finally obtained first LUT of a $T^{th}$ frame. By comparing FIG. 14B(b) with FIG. 14B(a), it may be learned that the display effect of the second image 1411 is different from the display effect of the second image 1408.

It should be noted that after the mobile phone performs S1302, the mobile phone may receive a setting operation of the user on one or more third setting items among the plurality of third setting items. A sum of a plurality of updated third weighting coefficients by the mobile phone is not necessarily 1.

The user may adjust the foregoing plurality of third weighting coefficients in real time by adjusting any one of the foregoing third setting items. In addition, the user may observe the display effect of the second image after adjusting the plurality of third weighting coefficients, and set appropriate weighting coefficients for the plurality of third LUTs.

In some embodiments, the mobile phone may receive a tap operation of the user on the second preset control 1406 shown in FIG. 14B (b). In response to the tap operation of the user on the second preset control 1406, the mobile phone may hide the foregoing plurality of third setting items, and display a preview interface 1413 shown in FIG. 14B (c). The preview interface 1413 includes a second preview control 1402 and a second image 1414.

S1303: The mobile phone calculates a weighted sum of the plurality of third LUTs by using the plurality of updated third weighting coefficients, to obtain a first LUT of the $T^{th}$ image frame (that is, the first image).

Figure 15A:
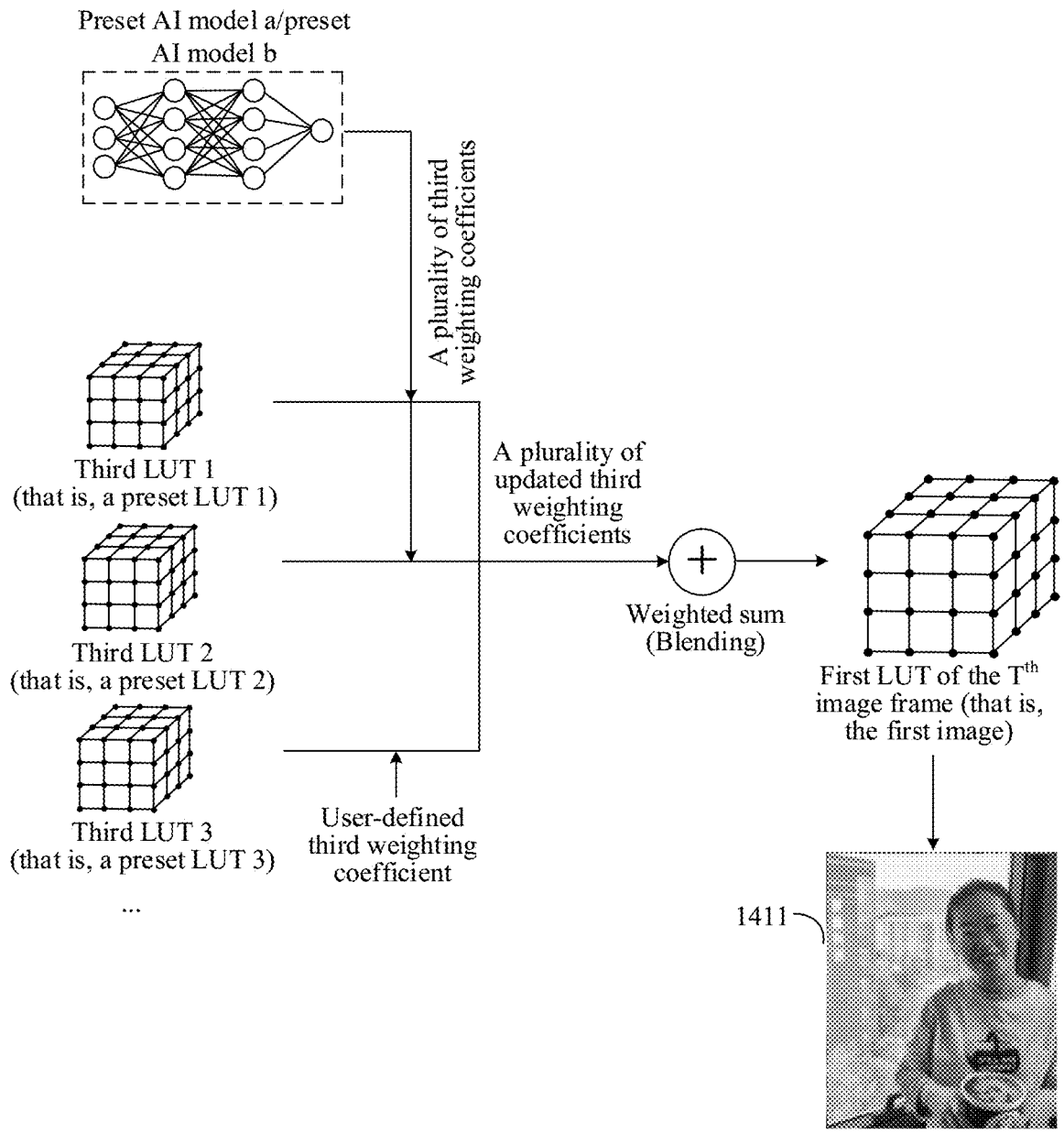
FIG. 15A is a schematic diagram of another principle of determining a final LUT (that is, a first LUT) of a $T^{th}$ image frame according to an embodiment of this application.

For example, in this embodiment of this application, the method in which the mobile phone performs S1301 to S1303 to determine a first LUT of the $T^{th}$ image frame, as well as the method in which the mobile phone performs S504 to obtain a second image, is described herein with reference to FIG. 15A.

After performing S1101 or S1202 by using the first image captured by the camera as an input, the mobile phone may obtain a plurality of third weighting coefficients shown in FIG. 15A, such as a plurality of third weighting coefficients output by the preset AI model a or the second preset AI model. The mobile phone may perform S1301 and S1302, that is, update the foregoing plurality of third weighting coefficients by using user-defined third weighting coefficients, to obtain a plurality of updated third weighting coefficients. Then, the mobile phone may perform S1303, that is, calculate a weighted sum of M third LUTs based on the following formula (5) by using the plurality of updated third weighting coefficients, to obtain a first LUT of the $T^{th}$ image frame. In this embodiment of this application, a first LUT of the $T^{th}$ image frame may be denoted as $Q_{(T, 3)}$, and a first LUT m may be denoted as $Q_{(T, m, 1)}$.

$$Q_{(T,3)} = \sum_{m=1}^{M} [K_{(T,m)}^{-1} \times Q_{(T,m,1)}]. \quad \text{Formula (5)}$$

$K_{(T, m)}^{1}$ is an updated third weighting coefficient of the third LUT m (that is, the preset LUT m).

Then, the mobile phone may perform S504, that is, perform image processing on the first image by using the first LUT of the $T^{th}$ image frame shown in FIG. 15A to obtain a second image 1411 shown in FIG. 15A.

In this embodiment, in a complex shooting scenario, the mobile phone may not only determine the weighting coefficients of a plurality of third LUTs by using the preset AI model a or the preset AI model b, but also provide the user with a service of adjusting the weighting coefficients of the plurality of third LUTs. In this way, the mobile phone may calculate a fourth LUT of the $T^{th}$ image frame based on the weighting coefficients adjusted by the user. In this way, the mobile phone may shoot a photo or video desired by the user based on a user requirement, which can improve shooting experience of the user.

In some other embodiments, when the mobile phone determines a final LUT, reference is made to a current image frame (that is, the first image), and reference is further made to a final LUT of the previous image frame of the first image. In this way, in the process of changing LUTs, smooth transition of display effects or styles corresponding to different LUTs may be implemented, display effects of a plurality of preview image frames presented by the electronic device may be optimized, and visual experience of a user in the process of photographing or visual recording is improved.

Figure 15B:
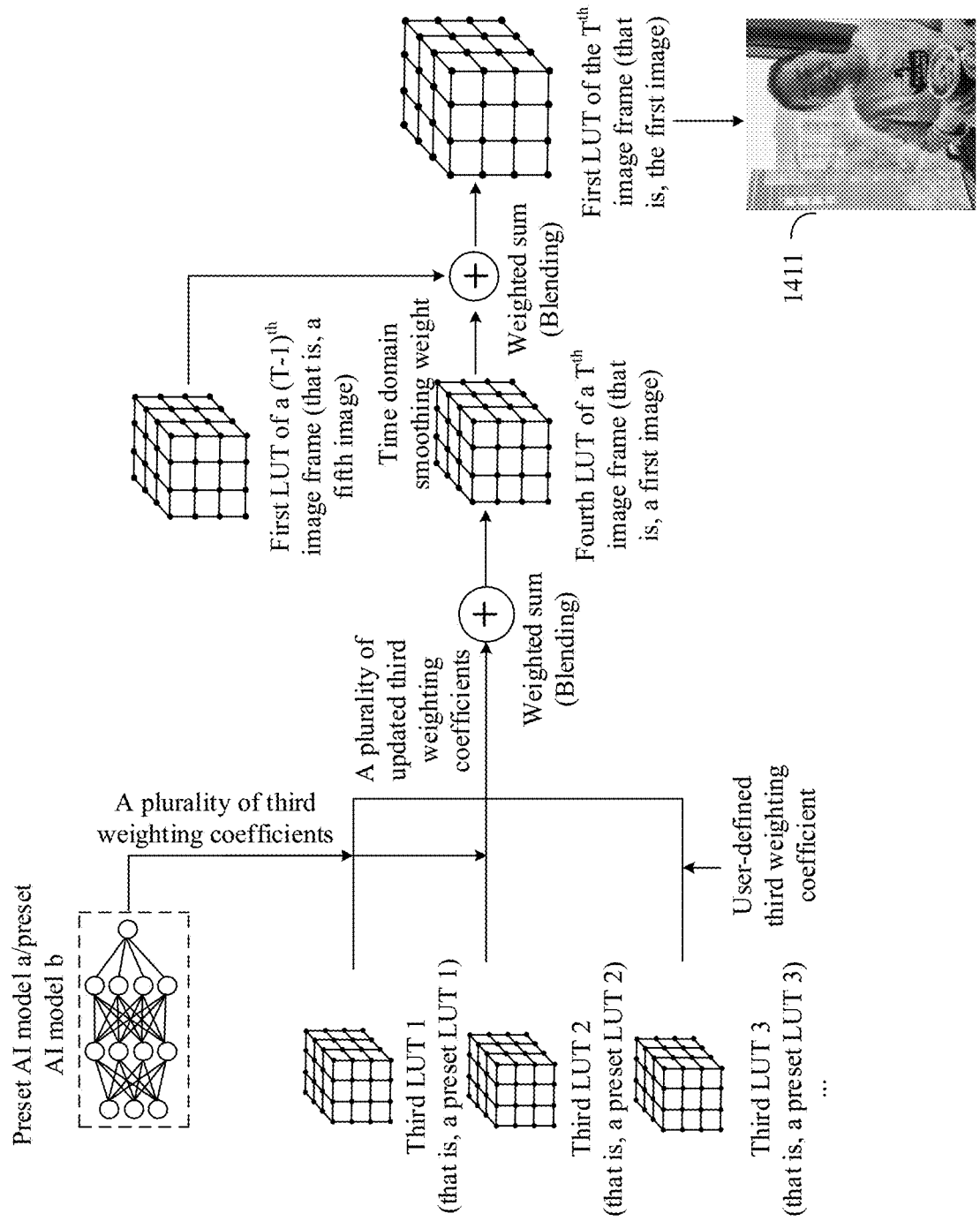
FIG. 15B is a schematic diagram of another principle of determining a final LUT (that is, a first LUT) of a $T^{th}$ image frame according to an embodiment of this application.

Specifically, S1303 may include: The mobile phone calculates a weighted sum of the plurality of third LUTs by using a plurality of third weighting coefficients, to obtain a fourth LUT of the T image frame; and the mobile phone calculates a weighted sum of the fourth LUT of the $T^{th}$ image frame (that is, the first image) and the first LUT of the $(T-1)^{th}$ image frame (that is, the fifth image), to obtain the first LUT of the $T^{th}$ image frame. FIG. 15B shows a method in which the mobile phone performs S1301 to S1303 to determine the first LUT of the T image frame in this embodiment, as well as a schematic diagram of a principle of a method in which the mobile phone performs S504 to obtain the second image.

In some other embodiments, the user may add an LUT in the mobile phone. For example, it is assumed that M third LUTs are preset in the mobile phone. Then, the mobile phone may add a $(M+1)^{th}$ third LUT and a $(+2)^{th}$ third LUT, and the like in the mobile phone in response to the user's operation of adding an LUT. Specifically, the method according to this embodiment of this application may further include S1601 to S1603.

S1601: In response to a second preset operation of the user, the mobile phone displays a third preset control. The third preset control is used to trigger the mobile phone to add an LUT (that is, a display effect corresponding to the LUT).

In response to the foregoing second preset operation, the mobile phone may not only display a plurality of third setting items, but also display a third preset control. For example, in response to the second preset operation, the mobile phone may display a preview interface 1601 shown in FIG. 16A(a). The preview interface 1601 for visual recording includes a first image 1602 and a third preset control 1603. The third preset control 1603 is used to trigger the mobile phone to add an LUT, that is, a display effect corresponding to the added LUT.

S1602: The mobile phone displays one or more fourth setting items in response to a tap operation of the user on third preset control, where each fourth setting item corresponds to one fifth LUT, each fifth LUT corresponds to a display effect in one shooting scenario, and the fifth LUT is different from the third LUT.

Figure 16A:
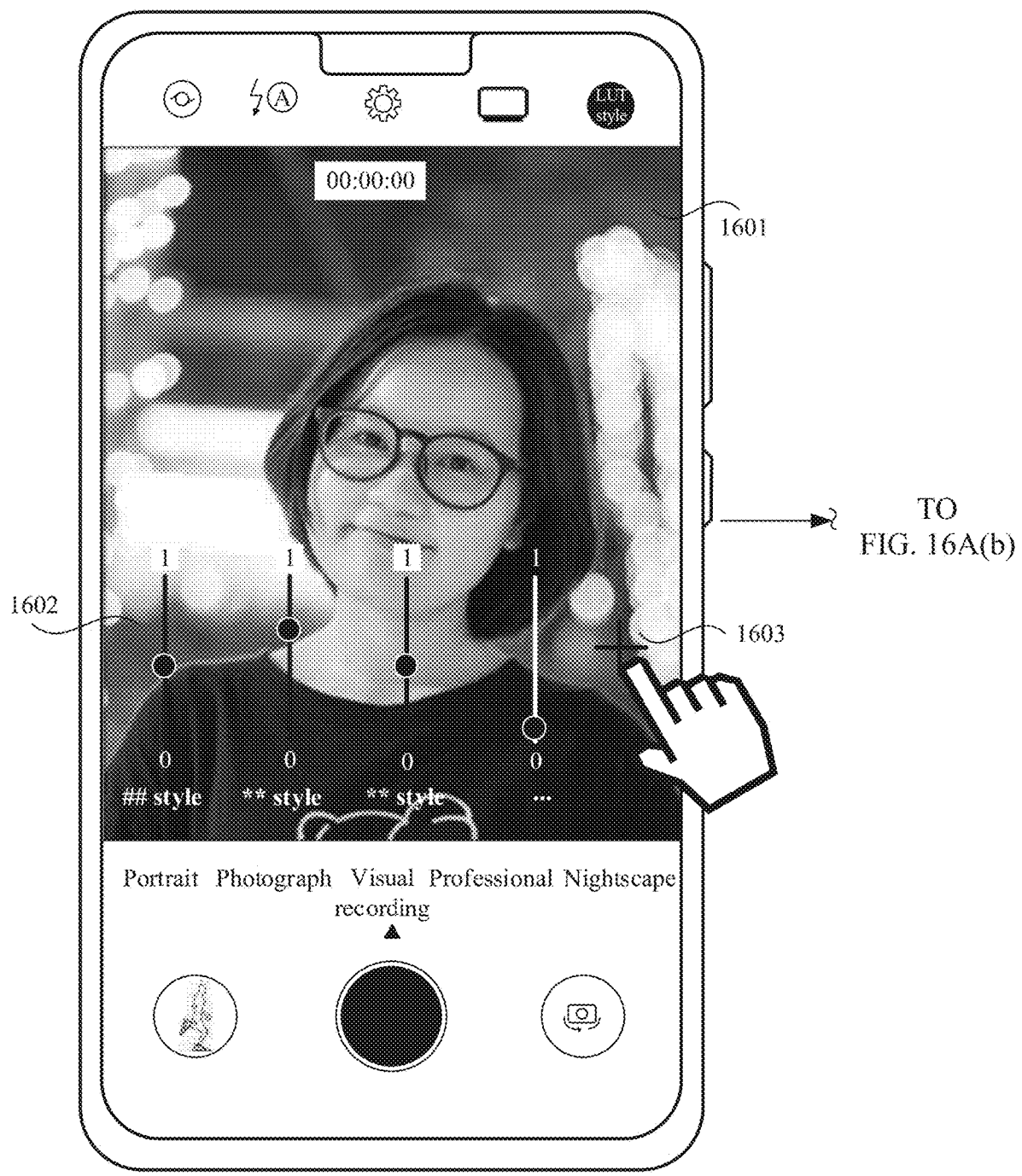
FIG. 16A(a) to FIG. 16A(c) are a schematic diagram of a framing interface for visual recording by another mobile phone according to an embodiment of this application.
Figure 16A:
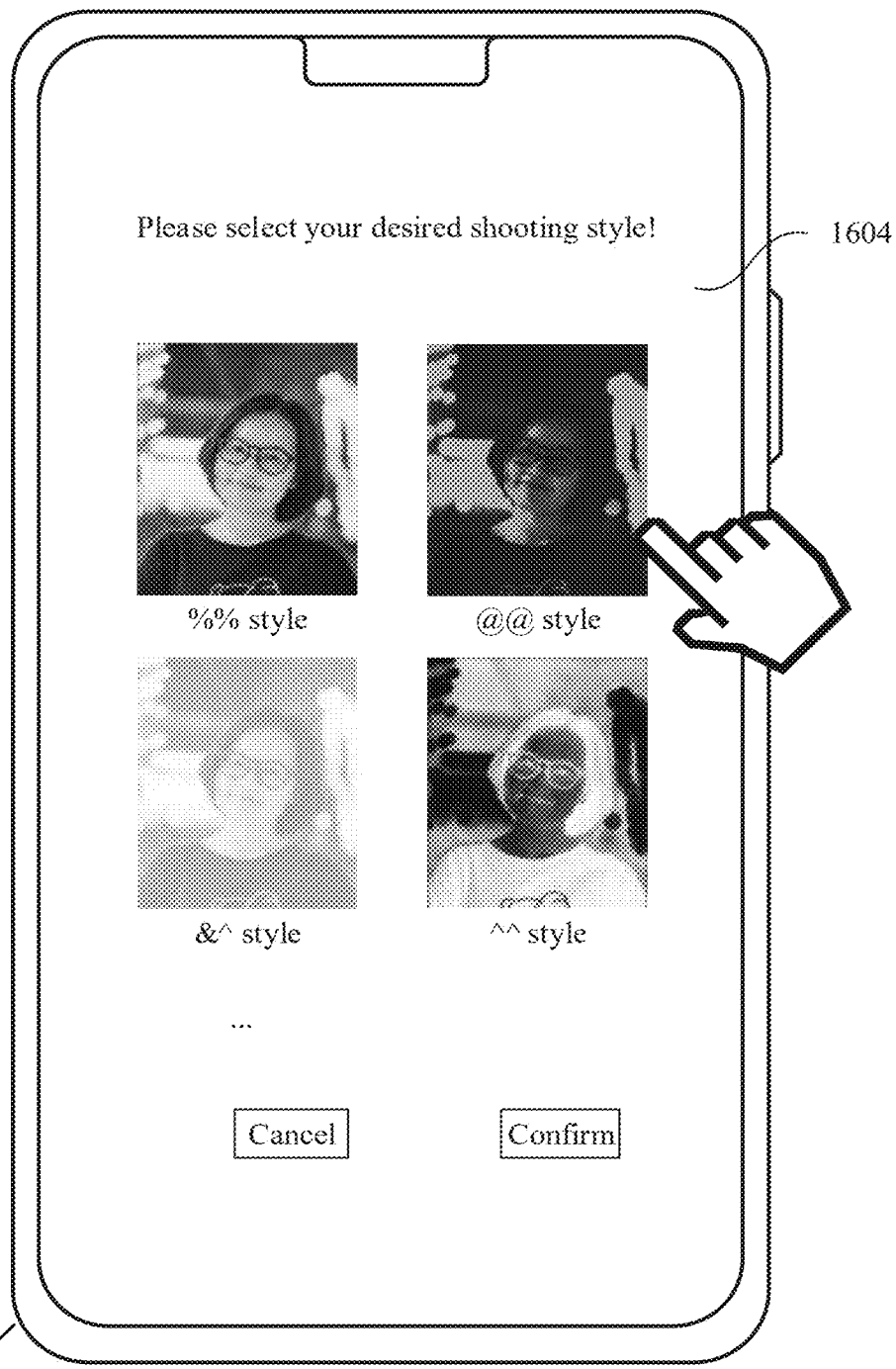
Figure 16A:
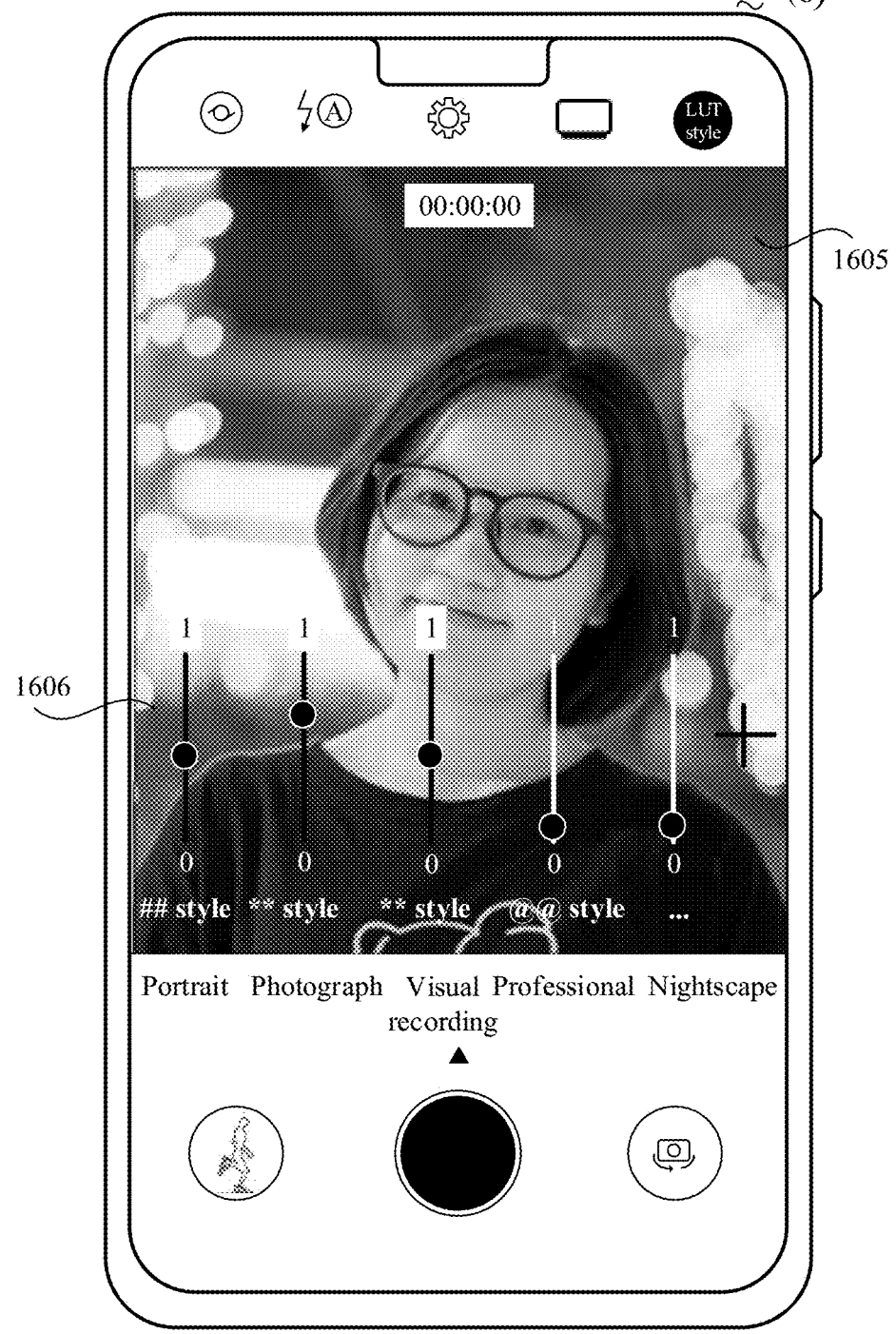

For example, in response to a tap operation of the user on the third preset control 1603 shown in FIG. 16A(a), the mobile phone may display a preview interface 1604 shown in FIG. 16A(b). The preview interface 1604 includes one or more fourth setting items, such as a "%% style" setting item, a "@@ style" setting item, a "&^ style" setting item, and a "^^ style" setting item. Each fourth setting item corresponds to one fifth LUT.

S1603: In response to a selection operation of the user on any fourth setting item, the mobile phone saves the fifth LUT corresponding to the fourth setting item selected by the user.

For example, in response to a selection operation of the user on the "@@ style" setting item shown in FIG. 16A(b), the mobile phone may save the fifth LUT corresponding to the "@@ style" setting item. That is, the fifth LUT corresponding to the "@@ style" setting item may be used as a third LUT, which is used for the mobile phone to perform S503 to determine a first LUT of the $T^{th}$ image frame.

For example, in response to a tap operation of the user on a "Confirm" button shown in FIG. 16A(b), the mobile phone may display a preview interface 1605 shown in FIG. 16A(c). Compared with the preview interface 1601 shown in FIG. 16A(a), the preview interface 1605 shown in FIG. 16A(c) further includes a fourth setting item corresponding to the "@@ style".

In some embodiments, each foregoing fourth setting item further includes a preview image obtained through processing by using a corresponding fifth LUT, which is used to present a display effect corresponding to the fifth LUT. For example, as shown in FIG. 16A(b), the "%% style" setting item, the "@@ style" setting item, the "&^ style" setting item, and the "^^ style" setting item all show the preview image obtained through processing by using the corresponding fifth LUT.

It should be noted that the foregoing fifth LUT may be saved in the mobile phone in advance, but the fifth LUT is not applied to a camera application of the mobile phone. After the mobile phone performs S1601 and S1602, the fifth LUT selected by the user may be applied to the camera application of the mobile phone. For example, the fifth LUT corresponding to the "@@ style" setting item may be used as a third LUT, which is used for the mobile phone to perform S503 to determine a first LUT of the $T^{th}$ image frame.

In some other embodiments, the mobile phone does not provide the foregoing plurality of fifth LUTs for the user to select, but the user sets required LUTs. In this embodiment, the mobile phone may display a fourth interface in response to a tap operation of the user on the third preset control. The fourth interface includes three adjustment options of LUT parameters of RGB, and the three adjustment options are used to set an added LUT. For example, in response to a tap operation of the user on the third preset control 1603 shown in FIG. 16A(a), the mobile phone may display a fourth interface 16007 shown in FIG. 16B(a). The fourth interface 16007 includes three adjustment options 1608.

The mobile phone may receive an adjustment operation of the user on the three adjustment options 1608, and save, in response to the adjustment operation of the user, an added LUT set by the user. For example, the mobile phone may receive an adjustment operation of the user on three adjustment options 1608, and display a fourth interface 1609 shown in FIG. 16B(b). The fourth interface 1609 includes three adjustment options 1610. LUTs corresponding to the three adjustment options 1610 are different from LUTs corresponding to the three adjustment options 1608. In response to a tap operation of the user on a "Confirm" button shown in FIG. 16B(b), the mobile phone may save the LUTs (that is, added LUTs) corresponding to the three adjustment options 1610.

It should be noted that an LUT (also referred to as a 3D LUT) is a relatively complex three-dimensional lookup table. The setting of LUT involves adjustment of many parameters (such as brightness and color). It is difficult to refine the adjustment of each parameter of the LUT through manual setting. Therefore, in this embodiment of this application, a function of adding an LUT may be provided for the user through global adjustment. That is, the three adjustment options 1608 of LUT parameters of the RGB and the three adjustment options 1610 of the LUT parameters of the RGB are separately three LUT adjustment options that support global adjustment.

In this embodiment of this application, the foregoing three LUT adjustment options supporting global adjustment are described herein. An initial LUT may be initialized first. Cube output values and input values of the initial LUT are identical. For example, Table 2 shows an initial LUT. Output values and input values of the initial LUT shown in Table 2 are identical, and are both (10, 20, 30). Then, values of progress bars of the three LUT adjustment options may be normalized. For example, "0"–"+100" may be normalized to [1.1, 10.0], and "–100"–"0" may be normalized to [0.0, 1.0]. Finally, normalized values may be used as a color channel coefficient (for example, represented by Rgain, Ggain, and Bgain), and multiplied by the input values of the initial LUT to obtain output values of an added LUT. In this way, the added LUT shown in Table 3 may be obtained from the initial LUT shown in Table 2.

TABLE 2

| Input value | | | Output value | | |
|---|---|---|---|---|---|
| R | G | B | R | G | B |
| ... | ... | ... | ... | ... | ... |
| 10 | 20 | 30 | 10 | 20 | 30 |
| ... | ... | ... | ... | ... | ... |

TABLE 3

| Input value | | | Output value | | |
|---|---|---|---|---|---|
| R | G | B | R | G | B |
| ... | ... | ... | ... | ... | ... |
| 10 | 20 | 30 | 10*Rgain | 20*Ggain | 30*Bgain |
| ... | ... | ... | ... | ... | ... |

Figure 16B:
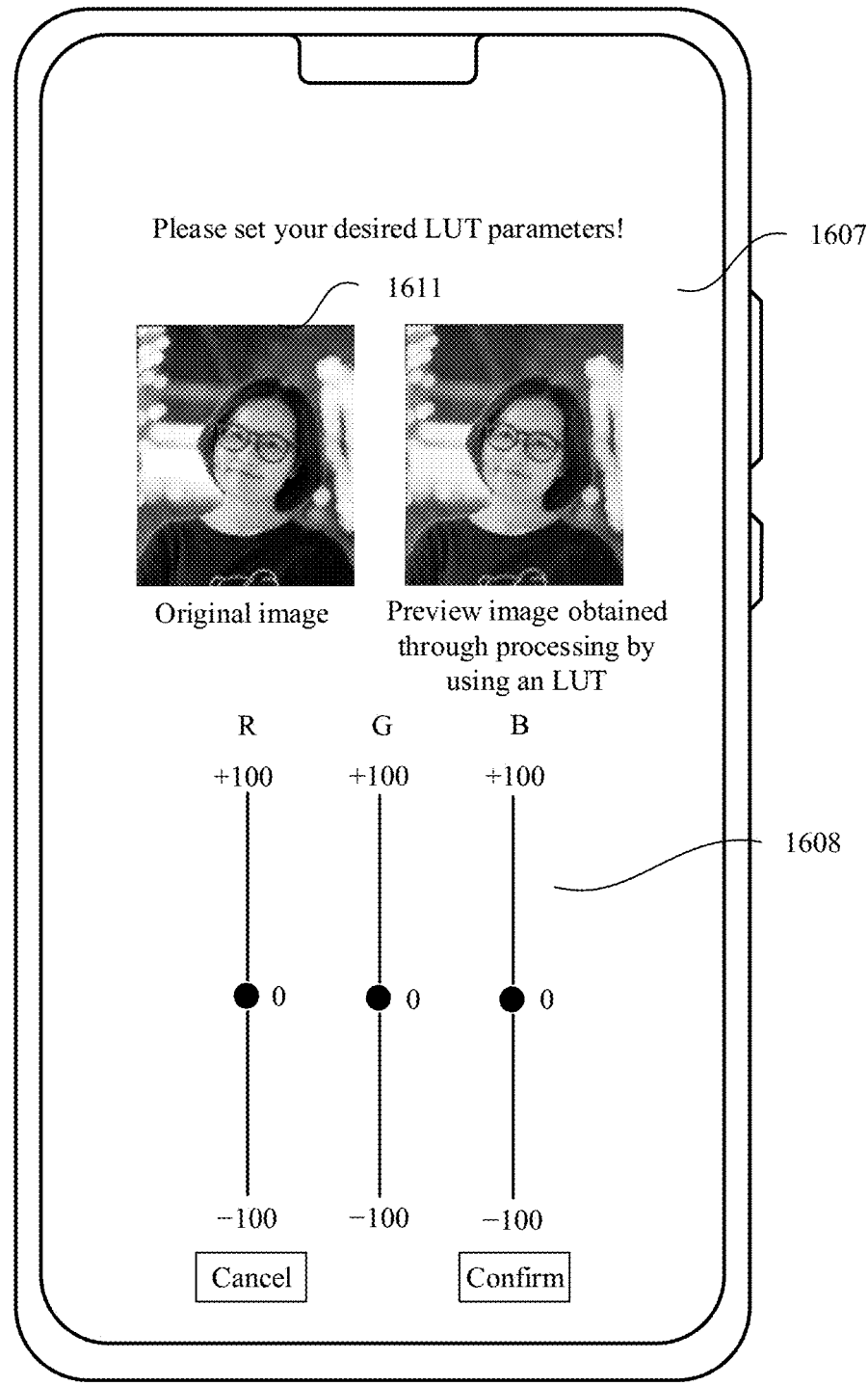
FIG. 16B(a) and FIG. 16B(b) are a schematic diagram of a framing interface for visual recording by another mobile phone according to an embodiment of this application.
Figure 16B:
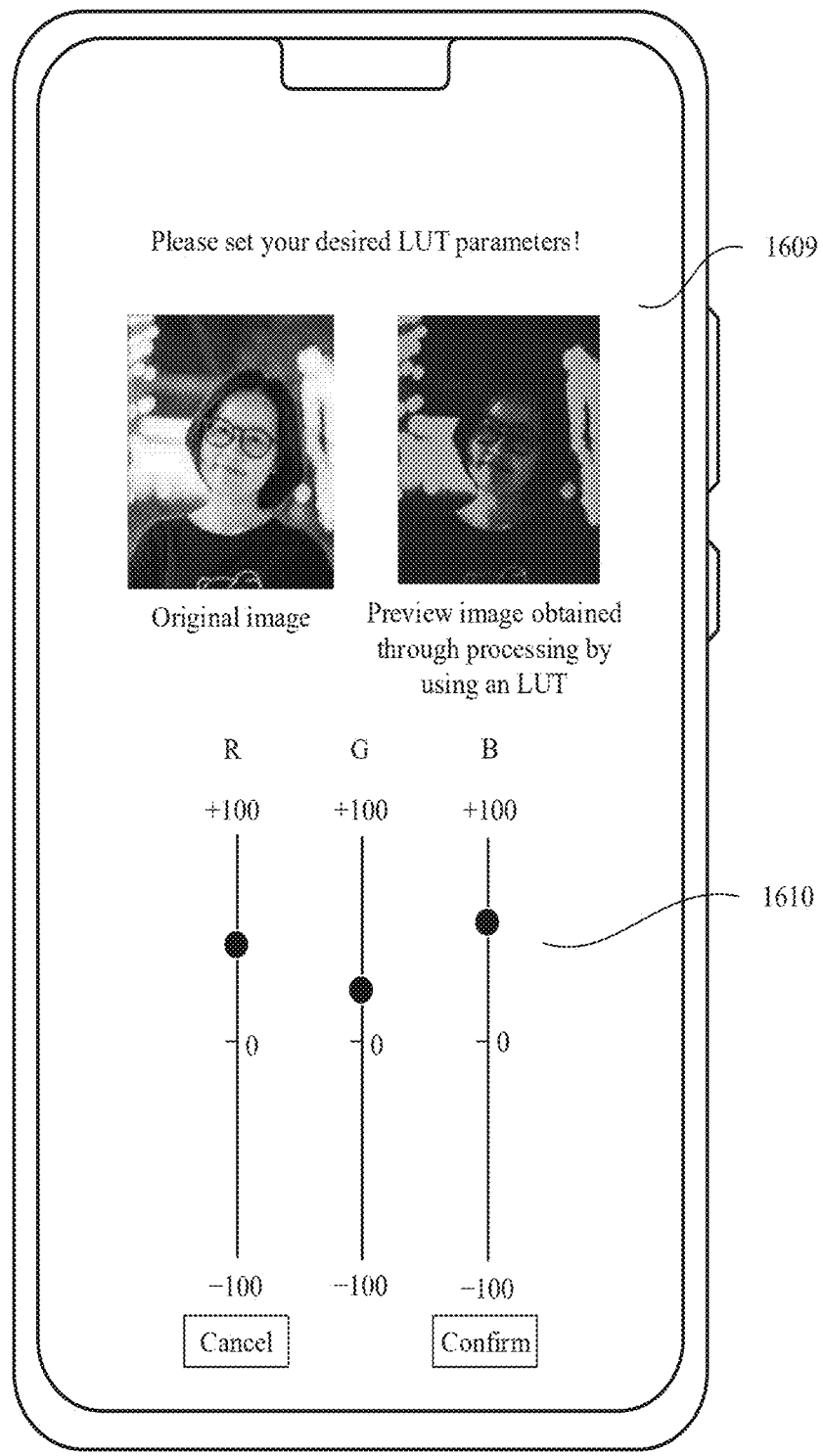

For example, it is assumed that RGB values of a pixel in an original image 1611 shown in FIG. 16B(a) is (10, 20, 30).

It is assumed that values of progress bars corresponding to the three adjustment options 1608 shown in FIG. 16B(b) set by the user are (45, 30, 65). The mobile phone may normalize each value in (45, 30, 65) from "0"–"+100" to [1.1, 10.0] to obtain (5.0, 3.7, 5.8). That is, Rgain=5.0, Ggain=3.7, and Bgain=5.8. Then, the mobile phone may obtain output values of the added LUT by multiplying Rgain, Ggain, and Bgain by the input values of the initial LUT respectively. For example, the mobile phone may calculate a product of RGB values (10, 20, 30) and corresponding gain values in (5.0, 3.7, 5.8) to obtain the output values (50, 74, 174) of GRB of the added LUT shown in Table 4. 50=10*Rgain=10*5.0, and 74=20*Ggain=20*3.7=74, 174=30*Bgain=30*5.8.

TABLE 4

| Input value | | | Output value | | |
|---|---|---|---|---|---|
| R | G | B | R | G | B |
| ... | ... | ... | ... | ... | ... |
| 10 | 20 | 30 | 50 | 74 | 174 |
| ... | ... | ... | ... | ... | ... |

In some other embodiments, the foregoing fourth interface may further include more user setting items such as a brightness coefficient slider, a dark-region brightness coefficient/bright-region brightness coefficient slider, and adjustment of grayscale curves of each channel. Details are not described herein again in this embodiment of this application.

Figure 17A:
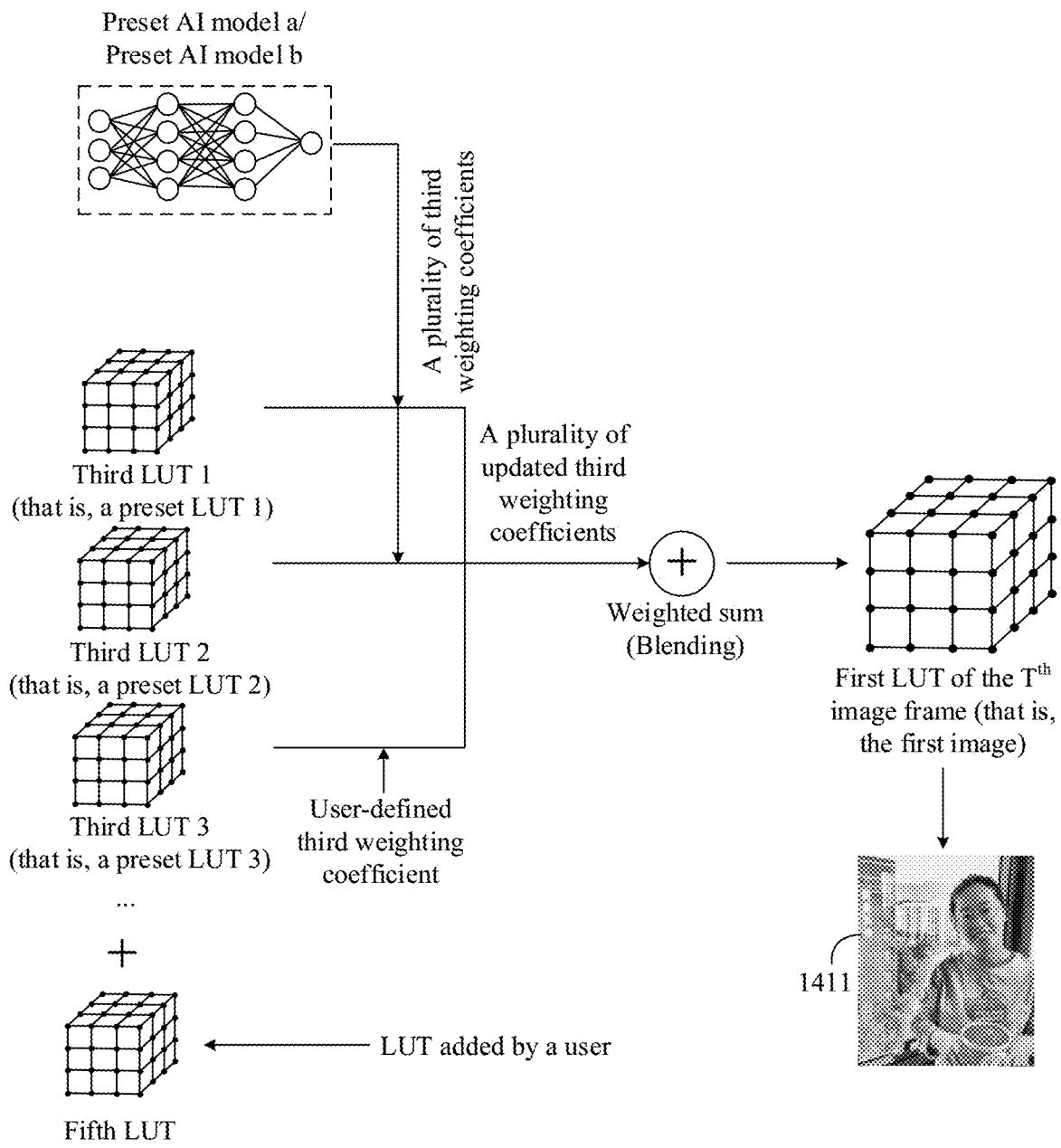
FIG. 17A is a schematic diagram of another principle of determining a final LUT (that is, a fourth LUT) of a $T^{th}$ image frame according to an embodiment of this application.
Figure 17B:
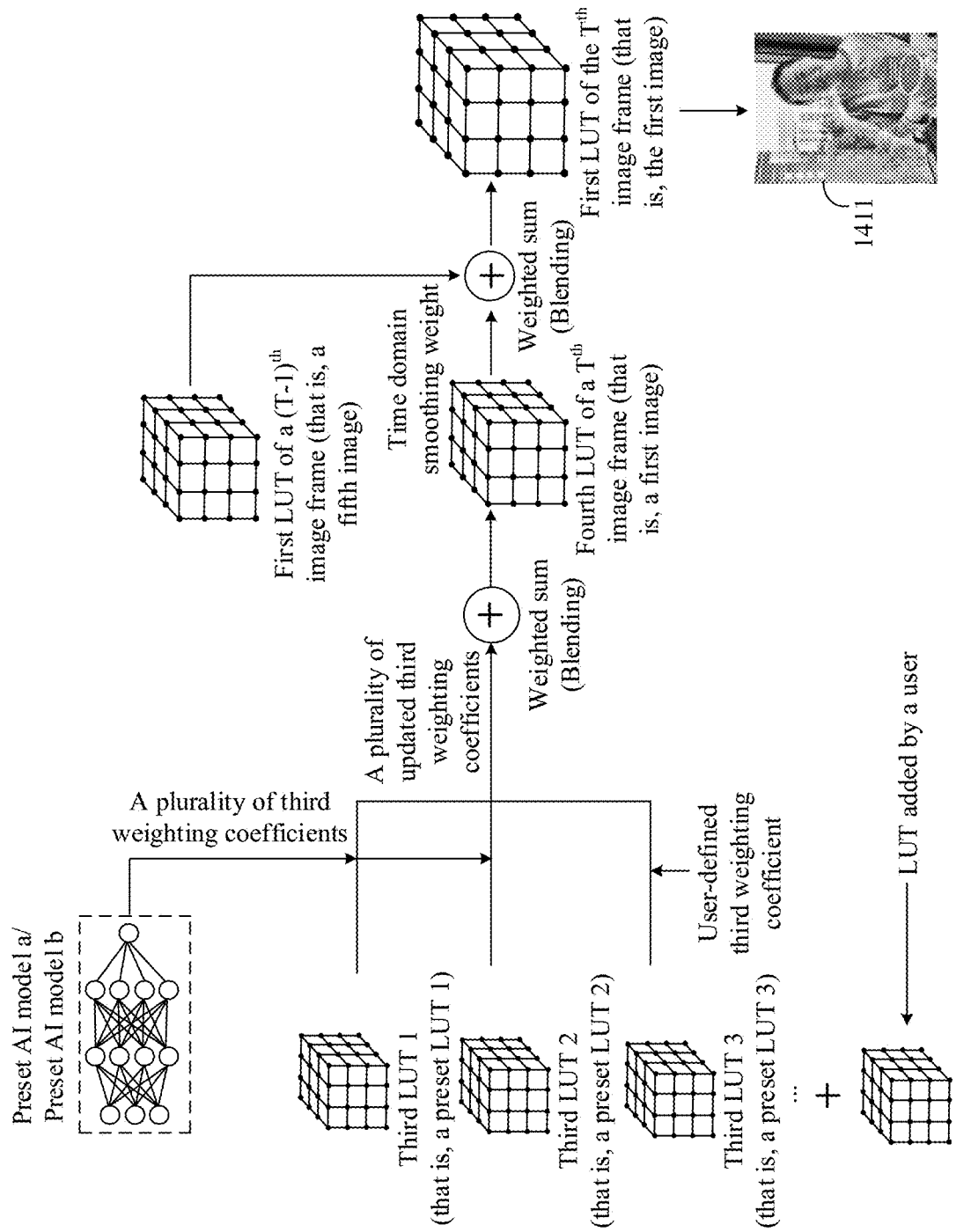
FIG. 17B is a schematic diagram of another principle of determining a final LUT (that is, a fourth LUT) of a $T^{th}$ image frame according to an embodiment of this application.

For example, with reference to FIG. 15A, the mobile phone may further perform S1601 to S1603, as shown in FIG. 17A or FIG. 17B, and add a fifth LUT among a plurality of third LUTs in response to the user's operation of adding an LUT.

In this embodiment of this application, the mobile phone may further add an LUT in the mobile phone in response to an operation of the user. Generally, the added LUT is set by the user based on a user requirement, and the added LUT has a relatively high fit with a shooting requirement of the user. In this way, the mobile phone uses the added LUT to process an image captured by the camera, and may shoot a photo or a video that achieves relatively high user satisfaction, which can improve shooting experience of the user.

In some other embodiments, the method according to this embodiment of this application can be applied to a scenario in which the mobile phone performs image processing on a photo or a video in the mobile phone gallery (or album) (referred to as an image processing scenario after shooting).

In an image processing scenario after shooting, the mobile phone may perform S501 to S504 in response to a preset operation of the user on any photo in the album to obtain and display a second image.

Figure 18A:
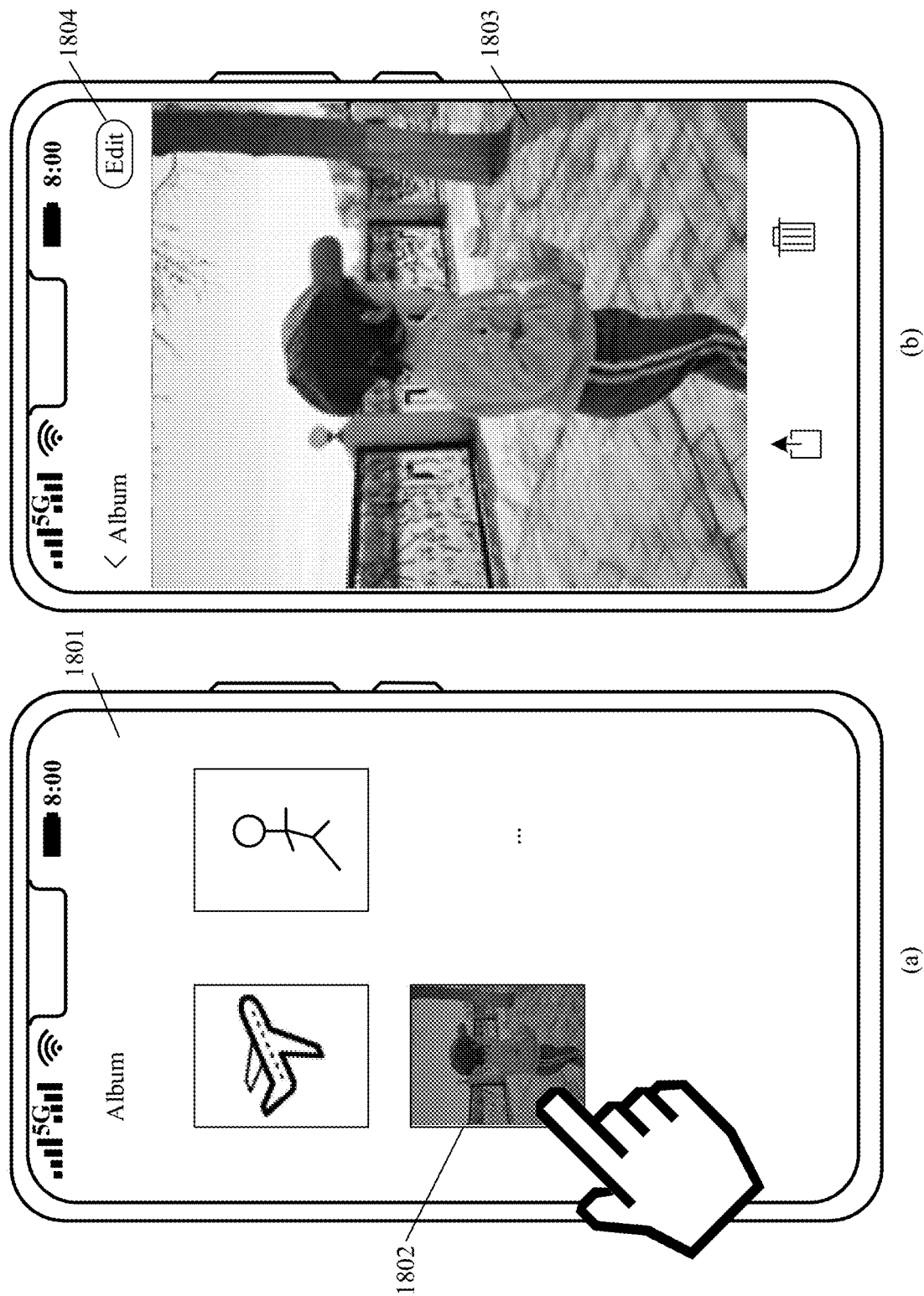
FIG. 18A is a schematic diagram of a framing interface for visual recording by another mobile phone according to an embodiment of this application.

For example, the mobile phone may display an album list interface 1801 shown in FIG. 18A(a). The album list interface 1801 includes preview items of a plurality of photos. Generally, the mobile phone may directly display a "Little girl" photo (equivalent to a first image) corresponding to a preview item 1802 in response to a tap operation of the user on the preview item 1802 of the "Little girl" photo (equivalent to the first image) on the album list interface 1801. In this embodiment of this application, the mobile phone may perform S501 to S504 in response to a tap operation of the user on the preview item 1802 of the "Little girl" photo (equivalent to the first image), to obtain and display a second image 1803 shown in FIG. 18A(b). A detail page of the photo shown in FIG. 18A(b) includes not only the second image 1803, but also an edit button 1804. The edit button 1804 is used to trigger the mobile phone to edit the second image 1803.

Alternatively, in the image processing scenario after shooting, the user may trigger the mobile phone to perform S501 to S504 on an editing interface of a photo to obtain and display a second image.

Figure 18B:
FIG. 18B(a) to FIG. 18(c) are a schematic diagram of a framing interface for visual recording by another mobile phone according to an embodiment of this application.
Figure 18B:
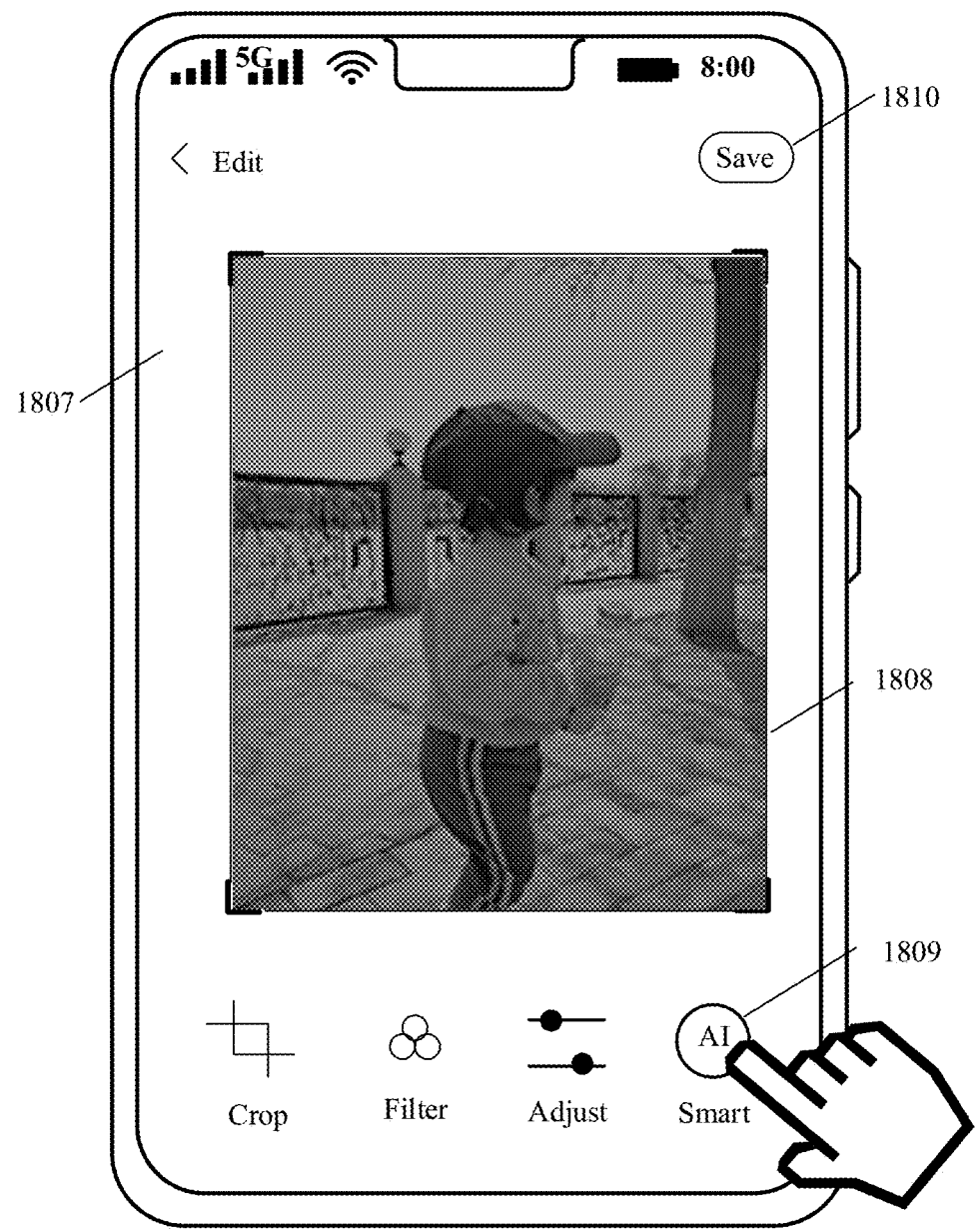
Figure 18B:
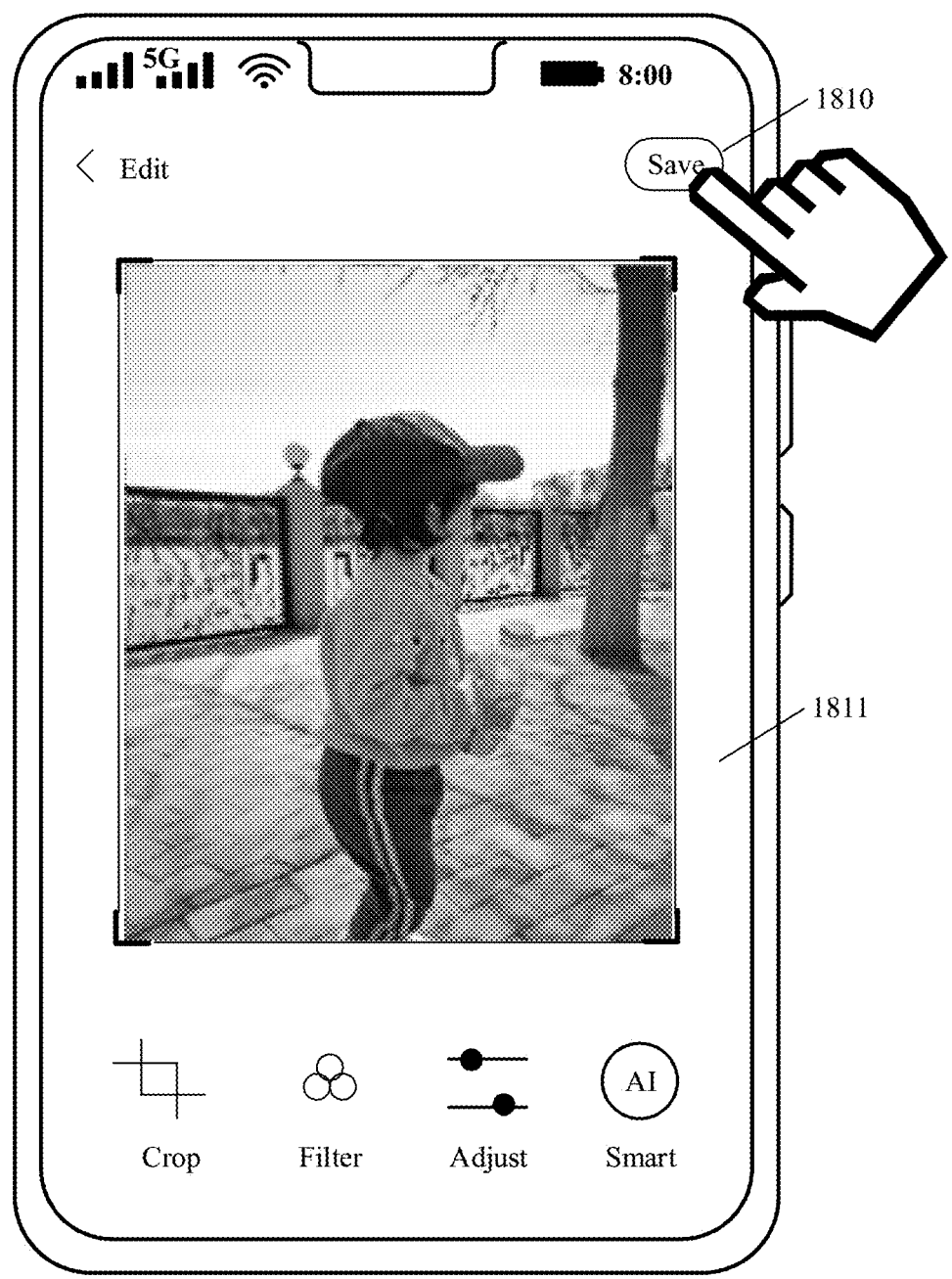

For example, the mobile phone may display a detail page of a photo 1805 (that is, the first image) shown in FIG. 18B(a). In response to a tap operation of the user on an edit button 1806 shown in FIG. 18B(a), the mobile phone may display an editing interface 1807 shown in FIG. 18B(b). The editing interface 1807 includes a "Smart AI" button 1808, a "Crop" button, a "Filter" button, and an "Adjust" button. The "Smart AI" button 1809 is used to trigger the mobile phone to adjust an LUT of the first image. The "Crop" button is used to trigger the mobile phone to crop the first image. The "Filter" button is used to trigger the mobile phone to add a filter effect to the first image. The "Adjust" button is used to trigger the mobile phone to adjust parameters such as contrast, saturation, and brightness of the first image.

Figure 18C:
FIG. 18C is a schematic diagram of a framing interface for visual recording by another mobile phone according to an embodiment of this application.

In response to a tap operation of the user on the "Smart AI" button 1809, the mobile phone may perform S501 to S504 to obtain and display a second image 1811 shown in FIG. 18B(c). An editing interface shown in FIG. 18B(c) includes not only the second image 1811, but also a save button 1810. The save button 1810 is used to trigger the mobile phone to save the second image 1811. In response to a tap operation of the user on the save button 1810, the mobile phone may save a second image 907 and display a photo detail page of a second image 1811 shown in FIG. 18C.

It should be noted that the method in which the mobile phone performs image processing on a video in the mobile phone gallery (or album) is similar to the method in which the mobile phone performs image processing on a photo in the mobile phone gallery. Details are not described herein again in this embodiment of this application. The difference is that the mobile phone needs to process every image frame in the video.

An embodiment of this application provides an electronic device, where the electronic device may include a display (such as a touchscreen), a camera, a memory, and one or more processors. The display, the camera, the memory, and the processor are coupled to each other. The memory is configured to store computer program code, and the computer program code includes computer instructions. When the processor executes the computer instructions, the electronic device can perform each function or step performed by the mobile phone in the foregoing embodiment. For the structure of the electronic device, refer to the structure of the electronic device 400 shown in FIG. 4.

Figure 19:
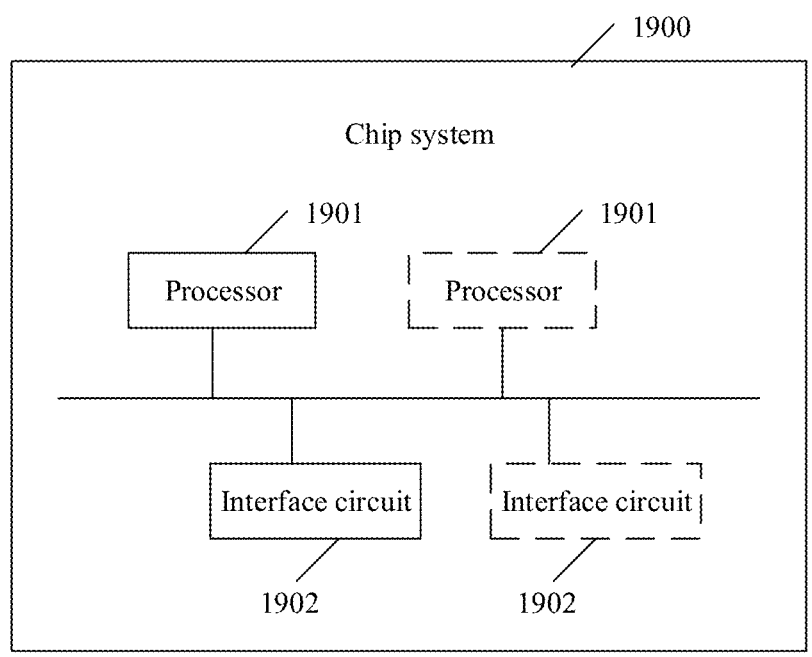
FIG. 19 is a schematic diagram of a structure of a chip system according to an embodiment of this application.

An embodiment of this application further provides a chip system. As shown in FIG. 19, the chip system 1900 includes at least one processor 1901 and at least one interface circuit 1902.

The processor 1901 and the interface circuit 1902 may be interconnected by using a line. For example, the interface circuit 1902 may be configured to receive a signal from another apparatus (such as a memory of an electronic device). For another example, the interface circuit 1902 may be configured to send a signal to another apparatus (such as the processor 1901). For example, the interface circuit 1902 may read instructions stored in the memory, and send the instructions to the processor 1901. When the instructions are executed by the processor 1901, the electronic device is enabled to perform the steps performed by a mobile phone 190 in the foregoing embodiment. Certainly, the chip system may further include other discrete devices. This is not specifically limited in this embodiment of this application.

An embodiment of this application further provides a computer storage medium, where the computer storage medium includes computer instructions, and when the computer instructions are run on an electronic device, the electronic device is enabled to perform each function or step performed by the mobile phone in the foregoing method embodiment.

An embodiment of this application further provides a computer program product, where when the computer program product runs on a computer, the computer is enabled to perform each function or step performed by the mobile phone in the foregoing method embodiment.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above.

In several embodiments of this application, it should be understood that the disclosed apparatus and method may be implemented in another manner. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. An image processing method, wherein the method comprises:
    obtaining, by an electronic device, a first image captured by a camera of the electronic device;
    determining, by the electronic device, a first scenario identifying a scenario corresponding to a first shot object comprised in the first image;
    determining, by the electronic device, a first lookup table (LUT) based on the first scenario, comprising:
        running a preset artificial intelligence (AI) model by using indication information of the first scenario and the first image as inputs, to obtain a plurality of weighting coefficients of a plurality of LUTs, wherein a sum of the plurality of weighting coefficients is 1, and the plurality of LUTs have a one-to-one correspondence with the plurality of weighting coefficients; and
        determining the first LUT based on calculating a weighted sum of the plurality of LUTs by using the plurality of weighting coefficients; and
    processing, by the electronic device, the first image based on the first LUT to obtain a second image, and displaying the second image, wherein a display effect of the second image corresponds to the first LUT.

2. The method according to claim 1, wherein after the displaying the second image, the method further comprises:
    capturing, by the electronic device, a third image, wherein the third image is an image captured by the camera of the electronic device, and the third image comprises a second shot object;
    determining, by the electronic device, a second scenario corresponding to the second image, wherein the second scenario is used to identify a scenario corresponding to the second shot object;
    determining, by the electronic device, a second LUT based on the second scenario, wherein the second LUT is different from the first LUT; and
    processing, by the electronic device, the third image based on the second LUT to obtain a fourth image, and displaying the fourth image, wherein a display effect of the fourth image corresponds to the second LUT.

3. The method according to claim 1, wherein the obtaining, by the electronic device, a first image comprises:
    capturing, by the electronic device, the first image on a preview interface for photographing by the electronic device, a preview interface before visual recording by the electronic device, or a framing interface for visual recording being performed by the electronic device.

4. The method according to claim 1, wherein the first image is an image captured by the camera of the electronic device; or the first image is a preview image obtained from an image captured by the camera of the electronic device.

5. The method according to claim 1, wherein the determining, by the electronic device, a first LUT based on the first scenario comprises:

determining, by the electronic device, a third LUT corresponding to the first scenario among a plurality of third LUTs as a first LUT of the first image, wherein the plurality of third LUTs are pre-configured in the electronic device, and are used to process an image captured by the camera of the electronic device to obtain images with different display effects, and each first LUT corresponds to a display effect in one scenario.

6. The method according to claim 1, wherein the determining, by the electronic device, a first LUT based on the first scenario comprises:
  determining, by the electronic device, a third LUT corresponding to the first scenario among the plurality of third LUTs as a fourth LUT of the first image, wherein the plurality of third LUTs are pre-configured in the electronic device, and are used to process an image captured by the camera of the electronic device to obtain images with different display effects, and each third LUT corresponds to a display effect in one scenario; and
  calculating, by the electronic device, a weighted sum of the fourth LUT of the first image and a first LUT of a fifth image to obtain the first LUT, wherein the fifth image is a previous image frame of the first image, and a third LUT of a previous image frame of a first image frame captured by the electronic device in this shooting process is a preset LUT.

7. The method according to claim 6, wherein the calculating, by the electronic device, a weighted sum of the fourth LUT of the first image and a first LUT of a fifth image to obtain the first LUT comprises:
  calculating, by the electronic device, the weighted sum of the fourth LUT of the first image and the first LUT of the fifth image by using a pre-configured first weighting coefficient and second weighting coefficient, to obtain the first LUT, wherein
  the first weighting coefficient is a weighting coefficient of the fourth LUT of the first image, the second weighting coefficient is a weighting coefficient of the first LUT of the fifth image, and a sum of the first weighting coefficient and the second weighting coefficient is equal to 1; and
  wherein a smaller first weighting coefficient indicates a larger second weighting coefficient and a smoother transition effect of a plurality of second image frames.

8. The method according to claim 7, wherein before the calculating, by the electronic device, the weighted sum of the fourth LUT of the first image and the first LUT of the fifth image by using a pre-configured first weighting coefficient and second weighting coefficient, to obtain the first LUT, the method further comprises:
  displaying, by the electronic device, a first setting item and a second setting item in response to a first preset operation, wherein the first setting item is used to set the first weighting coefficient, and the second setting item is used to set the second weighting coefficient; and
  in response to a setting operation of a user on the first setting item and/or the second setting item, using, by the electronic device, the first weighting coefficient set by the user as a weighting coefficient of the fourth LUT of the first image, and using the second weighting coefficient set by the user as a weighting coefficient of the first LUT of the fifth image, wherein
  the first preset operation is a tap operation on a first preset control displayed by the electronic device, and the first preset control is used to trigger the electronic device to set weights of the fourth LUT of the first image and the first LUT of the fifth image; or the first preset operation is a tap operation of the user on a first physical key of the electronic device.

9. The method according to claim 1, wherein the determining the first LUT based on calculating a weighted sum of the plurality of LUTs by using the plurality of weighting coefficients further comprises:
  determining the first LUT based on calculating a weighted sum of a fourth LUT of the first image and a first LUT of a fifth image, wherein the fifth image is a previous image frame of the first image, and a third LUT of a previous image frame of a first image frame captured by the electronic device in this shooting process is a preset LUT.

10. The method according to claim 9, wherein before the determining, by the electronic device, a first LUT based on the first scenario, the method further comprises:
  obtaining, by the electronic device, a plurality of groups of data pairs, wherein each group of data pairs comprises a sixth image and a seventh image, and the sixth image is an image that is obtained by processing the seventh image and that meets a preset condition;
  recognizing, by the electronic device, the seventh image, and determining a third scenario corresponding to the seventh image; and
  training, by the electronic device, the preset AI model by using the seventh image, the sixth image, and indication information for recognizing the third scenario as input samples, so that the preset AI model is capable of determining a weight that is used to obtain a weighted sum of the plurality of LUTs, so as to obtain an LUT that is used to process the seventh image to obtain a display effect of the sixth image.

11. The method according to claim 1, wherein the method further comprises:
  displaying, by the electronic device, a plurality of third setting items in response to a second preset operation, wherein each third setting item corresponds to one LUT, and is used to set a third weighting coefficient of the LUT; and
  updating, by the electronic device, corresponding third weighting coefficients in response to a setting operation of the user on one or more third setting items among the plurality of third setting items, wherein the electronic device calculates a weighted sum of the plurality of LUTs by using a plurality of updated third weighting coefficients; and
  wherein the second preset operation is a tap operation of the user on a second preset control, and the second preset control is used to trigger the electronic device to set weights of the plurality of LUTs; or the second preset operation is a tap operation of the user on a second physical key in the electronic device.

12. The method according to claim 1, wherein the method further comprises:
  displaying, by the electronic device, one or more fourth setting items in response to a third preset operation, wherein the third preset operation is used to trigger the electronic device to add a display effect, each fourth setting item corresponds to one fifth LUT, each fifth LUT corresponds to a display effect in one shooting scenario; and
  in response to a selection operation of the user on any fourth setting item, saving, by the electronic device, the fifth LUT corresponding to the fourth setting item selected by the user.

13. The method according to claim 12, wherein the fourth setting item comprises a preview image obtained through processing by using a corresponding fifth LUT, which is used to present a display effect corresponding to the fifth LUT.

14. An image processing method, wherein the method comprises:
  obtaining, by an electronic device, a first image, wherein the first image is an image captured by a camera of the electronic device, and the first image comprises a first shot object;
  running, by the electronic device, a preset artificial intelligence (AI) model by using the first image as an input, to obtain a plurality of third weighting coefficients of a plurality of second color lookup tables (LUTs), wherein a sum of the plurality of third weighting coefficients is 1, and the plurality of third LUTs are in a one-to-one correspondence with the plurality of third weighting coefficients; and
  calculating, by the electronic device, a weighted sum of the plurality of third LUTs by using the plurality of third weighting coefficients, to obtain a first LUT; and
  processing, by the electronic device, the first image based on the first LUT to obtain a second image, and displaying the second image, wherein a display effect of the second image corresponds to the first LUT.

15. The method according to claim 14, wherein the calculating, by the electronic device, a weighted sum of the plurality of third LUTs by using the plurality of third weighting coefficients, to obtain a first LUT comprises:
  calculating, by the electronic device, a weighted sum of the plurality of third LUTs by using the plurality of third weighting coefficients, to obtain a fourth LUT of the first LUT; and
  calculating, by the electronic device, a weighted sum of the fourth LUT of the first image and a first LUT of a fifth image to obtain the first LUT, wherein the fifth image is a previous image frame of the first image, and a third LUT of a previous image frame of a first image frame captured by the electronic device in this shooting process is a preset LUT.

16. The method according to claim 14, wherein before the running, by the electronic device, a preset AI model by using the first image as an input, to obtain a plurality of third weighting coefficients of a plurality of third LUTs, the method further comprises:
  obtaining, by the electronic device, a plurality of groups of data pairs, wherein each group of data pairs comprises a sixth image and a seventh image, and the sixth image is an image that is obtained by processing the seventh image and that meets a preset condition; and
  training, by the electronic device, the preset AI model by using the seventh image and the sixth image as input samples, so that the preset AI model is capable of determining a weight that is used to obtain a weighted sum of the plurality of third LUTs, so as to obtain an LUT that is used to process the seventh image to obtain a display effect of the sixth image.

17. An electronic device, wherein the electronic device comprises a memory, a display, one or more cameras, and one or more processors, wherein the memory, the display, and the camera are coupled to the processor; wherein the camera is configured to capture an image, the display is configured to display the image captured by the camera or an image generated by the processor; and the memory stores computer program code, the computer program code comprises computer instructions, and when the computer instructions are executed by the processor, the electronic device is enabled to perform a method comprising:
  obtaining a first image captured by the one or more cameras;
  determining a first scenario identifying a scenario corresponding to a first shot object comprised in the first image;
  determining a first lookup table (LUT) based on the first scenario, comprising:
    running a preset artificial intelligence (AI) model by using indication information of the first scenario and the first image as inputs, to obtain a plurality of weighting coefficients of a plurality of LUTs, wherein a sum of the plurality of weighting coefficients is 1, and the plurality of LUTs have a one-to-one correspondence with the plurality of weighting coefficients; and
    determining the first LUT based on calculating a weighted sum of the plurality of LUTs by using the plurality of weighting coefficients; and
  processing, by the electronic device, the first image based on the first LUT to obtain a second image, and displaying the second image, wherein a display effect of the second image corresponds to the first LUT.

18. The method according to claim 14, the method further comprises: adjusting an output weight of the foregoing preset AI model.

19. The method according to claim 14, wherein obtaining a first image comprises:
  capturing the first image on a preview interface for photographing by the electronic device, a preview interface before visual recording by the electronic device, or a framing interface for visual recording being performed by the electronic device.

* * * * *